US010427254B2

(12) United States Patent
Day et al.

(10) Patent No.: US 10,427,254 B2
(45) Date of Patent: Oct. 1, 2019

(54) FLEXIBLE MANUFACTURING FOR AIRCRAFT STRUCTURES

(71) Applicant: The Boeing Company, Chicago, IL (US)

(72) Inventors: Dan Dresskell Day, Seattle, WA (US); Clayton Lynn Munk, Maple Valley, WA (US); Steven John Schmitt, Snohomish, WA (US); Eric M. Reid, Kenmore, WA (US)

(73) Assignee: The Boeing Company, Chicago, IL (US)

( * ) Notice: Subject to any disclaimer, the term of this patent is extended or adjusted under 35 U.S.C. 154(b) by 760 days.

(21) Appl. No.: 14/558,867

(22) Filed: Dec. 3, 2014

(65) Prior Publication Data

US 2015/0314889 A1 Nov. 5, 2015

Related U.S. Application Data

(60) Provisional application No. 61/986,824, filed on Apr. 30, 2014.

(51) Int. Cl.
| | | |
|---|---|---|
| *B64F 5/00* | (2017.01) | |
| *B23P 21/00* | (2006.01) | |
| *B23B 41/00* | (2006.01) | |
| *B64F 5/10* | (2017.01) | |

(52) U.S. Cl.
CPC ............ *B23P 21/004* (2013.01); *B23B 41/00* (2013.01); *B64F 5/10* (2017.01); *B23B 2215/04* (2013.01); *Y10T 29/50* (2015.01); *Y10T 408/03* (2015.01); *Y10T 408/52* (2015.01)

(58) Field of Classification Search
CPC ....... B64F 5/10; B23B 41/00; B23B 2215/04; B23P 21/004
See application file for complete search history.

(56) References Cited

U.S. PATENT DOCUMENTS

| | | | |
|---|---|---|---|
| 4,006,650 | A | 2/1977 | Elmer |
| 4,108,566 | A | 8/1978 | Jones |
| 4,148,401 | A | 4/1979 | Kautetzky |
| 4,445,588 | A | 5/1984 | Truninger |
| 4,477,216 | A | 10/1984 | Van De Motter et al. |
| 4,483,080 | A | 11/1984 | Knoll |
| 4,599,018 | A | 7/1986 | Woods |

(Continued)

FOREIGN PATENT DOCUMENTS

| | | |
|---|---|---|
| CA | 2497249 A1 | 8/2006 |
| CA | 2793202 A1 | 6/2013 |

(Continued)

OTHER PUBLICATIONS

Canadian Intellectual Property Office Search Report, dated Feb. 24, 2017, regarding Application No. 2,883,614, 17 pages.

(Continued)

*Primary Examiner* — Ryan J. Walters
(74) *Attorney, Agent, or Firm* — Yee & Associates, P.C.

(57) ABSTRACT

A method and apparatus for manufacturing an aircraft structure. A drivable support may be driven from a first location to a second location to bring the drivable support together with at least one other drivable support to form a drivable support system. A structure may be held in a desired position using the drivable support system.

36 Claims, 28 Drawing Sheets

(56) References Cited

U.S. PATENT DOCUMENTS

| | | | |
|---|---|---|---|
| 4,674,949 A | 6/1987 | Kroczynski | |
| 4,710,086 A | 12/1987 | Naaktgeboren et al. | |
| 4,781,517 A | 11/1988 | Pearce et al. | |
| 4,850,763 A | 7/1989 | Jack et al. | |
| 4,885,836 A | 12/1989 | Bonomi et al. | |
| 4,940,382 A | 7/1990 | Castelain et al. | |
| 4,995,146 A | 2/1991 | Woods | |
| 5,022,542 A | 6/1991 | Beier | |
| 5,150,506 A | 9/1992 | Kotake et al. | |
| 5,203,855 A | 4/1993 | Givler et al. | |
| 5,210,935 A | 5/1993 | Givler | |
| 5,213,454 A | 5/1993 | Givler et al. | |
| 5,216,819 A | 6/1993 | Givler | |
| 5,231,747 A | 8/1993 | Clark et al. | |
| 5,231,754 A | 8/1993 | Givler | |
| 5,259,104 A | 11/1993 | Givler | |
| 5,263,236 A | 11/1993 | Givler | |
| 5,326,201 A | 7/1994 | King | |
| 5,351,626 A | 10/1994 | Yanagisawa | |
| 5,390,128 A | 2/1995 | Ryan et al. | |
| 5,407,415 A | 4/1995 | Spishak | |
| 5,419,268 A | 5/1995 | Fyler et al. | |
| 5,468,099 A | 11/1995 | Wheetley et al. | |
| 5,524,180 A | 6/1996 | Wang et al. | |
| 5,526,203 A | 6/1996 | Mohajerani et al. | |
| 5,564,655 A | 10/1996 | Garland et al. | |
| 5,646,870 A | 7/1997 | Krivokapic et al. | |
| 5,653,351 A | 8/1997 | Grout et al. | |
| 5,657,429 A | 8/1997 | Wang et al. | |
| 5,709,026 A | 1/1998 | Veselaski et al. | |
| 5,715,729 A | 2/1998 | Toyama et al. | |
| 5,761,064 A | 6/1998 | La et al. | |
| 5,822,877 A | 10/1998 | Dai | |
| 5,848,859 A | 12/1998 | Clark et al. | |
| 5,910,894 A | 6/1999 | Pryor | |
| 5,920,394 A | 7/1999 | Gelbart et al. | |
| 6,098,260 A | 8/2000 | Sarh | |
| 6,210,084 B1 | 4/2001 | Banks et al. | |
| 6,230,382 B1 | 5/2001 | Cunningham et al. | |
| 6,779,272 B2 | 8/2004 | Day et al. | |
| 6,843,328 B2 | 1/2005 | Boyl-Davis et al. | |
| 6,862,912 B2 | 3/2005 | Olsson | |
| 6,871,524 B2 | 3/2005 | Olsson | |
| 6,926,094 B2 | 8/2005 | Arntson et al. | |
| 6,961,626 B1 | 11/2005 | Paik | |
| 7,168,898 B2 | 1/2007 | Hamann | |
| 7,249,943 B2 | 7/2007 | Benson et al. | |
| 7,273,333 B2 | 9/2007 | Buttrick et al. | |
| 7,406,758 B2 | 8/2008 | Jones et al. | |
| 7,614,154 B2 | 11/2009 | Cobb | |
| 8,005,563 B2 | 8/2011 | Cobb et al. | |
| 8,025,277 B2 | 9/2011 | Lin et al. | |
| 8,299,118 B2 | 10/2012 | Chang et al. | |
| 8,539,658 B2 | 9/2013 | Munk | |
| 8,582,119 B2 * | 11/2013 | Novak | G01B 11/002 356/614 |
| 8,606,388 B2 | 12/2013 | Cobb et al. | |
| 8,620,470 B2 | 12/2013 | Cobb et al. | |
| 8,661,684 B1 | 3/2014 | Boyd et al. | |
| 8,763,953 B2 | 7/2014 | Sakurai et al. | |
| 8,790,050 B2 | 7/2014 | Marguet et al. | |
| 9,014,836 B2 | 4/2015 | Stone et al. | |
| 9,090,357 B2 | 7/2015 | Oberoi et al. | |
| 9,205,933 B2 | 12/2015 | Oberoi et al. | |
| 9,299,118 B1 | 3/2016 | McGraw | |
| 2002/0066192 A1 | 6/2002 | Cunningham et al. | |
| 2002/0136612 A1 | 9/2002 | Martinez et al. | |
| 2003/0043964 A1 | 3/2003 | Sorenson | |
| 2003/0097198 A1 | 5/2003 | Sonderman et al. | |
| 2003/0116331 A1 * | 6/2003 | Boyl-Davis | B23Q 1/26 173/1 |
| 2003/0149502 A1 | 8/2003 | Rebello et al. | |
| 2004/0039465 A1 | 2/2004 | Boyer et al. | |
| 2005/0036879 A1 | 2/2005 | Jhaveri et al. | |
| 2005/0049126 A1 | 3/2005 | Everson et al. | |
| 2005/0172470 A1 | 8/2005 | Cobb et al. | |
| 2005/0223549 A1 | 10/2005 | Braun | |
| 2006/0108470 A1 | 5/2006 | McCrary et al. | |
| 2006/0118235 A1 | 6/2006 | Kum et al. | |
| 2007/0029877 A1 | 2/2007 | Longley | |
| 2007/0036627 A1 * | 2/2007 | Wright | B25H 1/0007 410/49 |
| 2007/0180674 A1 | 8/2007 | Morden et al. | |
| 2008/0077276 A1 | 3/2008 | Sanjuan et al. | |
| 2008/0155807 A1 | 7/2008 | Toh et al. | |
| 2008/0205763 A1 | 8/2008 | Marsh et al. | |
| 2009/0112349 A1 | 4/2009 | Cobb et al. | |
| 2009/0297316 A1 | 12/2009 | Wells et al. | |
| 2010/0025349 A1 | 2/2010 | Khoshnevis | |
| 2010/0151364 A1 | 6/2010 | Ye et al. | |
| 2010/0180711 A1 | 7/2010 | Kilibarda et al. | |
| 2010/0204817 A1 | 8/2010 | Fujita | |
| 2010/0217437 A1 * | 8/2010 | Sarh | B25J 9/0084 700/248 |
| 2011/0010007 A1 | 1/2011 | Sarh et al. | |
| 2011/0054694 A1 | 3/2011 | Munk | |
| 2011/0132548 A1 | 6/2011 | De Mattia | |
| 2011/0178727 A1 | 7/2011 | Hafenrichter et al. | |
| 2011/0214586 A1 | 9/2011 | Wessel et al. | |
| 2012/0014759 A1 | 1/2012 | Sarh et al. | |
| 2012/0210802 A1 | 8/2012 | Sarh et al. | |
| 2013/0014368 A1 | 1/2013 | Woods et al. | |
| 2013/0018525 A1 | 1/2013 | Jang et al. | |
| 2013/0145850 A1 | 6/2013 | Lute, Jr. et al. | |
| 2013/0152397 A1 | 6/2013 | Oberoi et al. | |
| 2013/0158697 A1 * | 6/2013 | Stone | B64F 5/0036 700/114 |
| 2013/0226340 A1 | 8/2013 | Buchstab | |
| 2013/0289766 A1 | 10/2013 | Hafenrichter et al. | |
| 2014/0115860 A1 | 5/2014 | Sarh et al. | |
| 2014/0157588 A1 | 6/2014 | Boyd et al. | |
| 2014/0277717 A1 | 9/2014 | Jung et al. | |
| 2014/0305217 A1 | 10/2014 | Tapia et al. | |
| 2014/0340509 A1 | 11/2014 | Fairbairn | |
| 2015/0023748 A1 | 1/2015 | Carberry et al. | |
| 2015/0135535 A1 | 5/2015 | Hallam et al. | |
| 2015/0266147 A1 | 9/2015 | Reid et al. | |
| 2016/0067792 A1 | 3/2016 | Cardon et al. | |
| 2016/0128656 A1 | 5/2016 | Gregerson et al. | |
| 2016/0334301 A1 | 11/2016 | Hafenrichter et al. | |
| 2017/0197253 A1 | 7/2017 | Cardon et al. | |

FOREIGN PATENT DOCUMENTS

| | | |
|---|---|---|
| CA | 2553747 C | 7/2013 |
| CN | 101583536 A | 11/2009 |
| CN | 101898301 A | 12/2010 |
| CN | 103158889 A | 6/2013 |
| CN | 103274055 A | 9/2013 |
| CN | 103303491 A | 9/2013 |
| CN | 203512057 U | 4/2014 |
| CN | 104281771 A | 1/2015 |
| DE | 102008041190 A1 | 3/2010 |
| EP | 1227316 A2 | 7/2002 |
| EP | 1884453 A2 | 2/2008 |
| EP | 2108515 A1 | 10/2009 |
| EP | 2221151 A2 | 8/2010 |
| EP | 2604524 A2 | 6/2013 |
| EP | 2631041 A2 | 8/2013 |
| EP | 2792431 A1 | 10/2014 |
| GB | 2095215 A | 9/1982 |
| GB | 2329138 A | 3/1993 |
| GB | 2473100 A | 3/2011 |
| GB | 2498977 A | 8/2013 |
| JP | 2000095197 A | 4/2000 |
| JP | 2002283158 A | 10/2002 |
| JP | 2013123794 A | 6/2013 |
| KR | 100999191 B1 | 12/2010 |
| WO | WO2010018340 A2 | 2/2010 |

(56) References Cited

FOREIGN PATENT DOCUMENTS

| WO | WO2013117971 A1 | 8/2013 |
|---|---|---|
| WO | WO2014193602 A2 | 12/2014 |

OTHER PUBLICATIONS

Canadian Intellectual Property Office Search Report, dated Feb. 23, 2017, regarding Application No. 2,896,059, 11 pages.
Canadian Intellectual Property Office Office Action, dated Mar. 1, 2017. regarding Application No. 2,882,420, 7 pages.
Notice of Allowance, dated Apr. 24, 2017, regarding U.S. Appl. No. 14/558,850, 11 pages.
Notice of Allowance, dated Feb. 27, 2017, regarding U.S. Appl. No. 14/558,899, 13 pages.
Office Action, dated May 3, 2017, regarding USPTO U.S. Appl. No. 14/559,034, 55 pages.
Canadian Intellectual Property Office Office Action, dated Mar. 31, 2017, regarding Application No. 2,882,466, 20 pages.
Canadian Intellectual Property Office Office Action, dated Mar. 30, 2017, regarding Application No. 2,882,4485, 17 pages.
Canadian Intellectual Property Office Office Action, dated Apr. 25, 2017, regarding Application No. 2,886,500, 19 pages.
Office Action, dated Jun. 13, 2017, regarding U.S. Appl. No. 14/558,834, 39 pages.
Final Office Action, dated Oct. 2, 2017, regarding U.S. Appl. No. 14/559,034, 21 pages.
Final Office Action, dated Oct. 3, 2017, regarding U.S. Appl. No. 14/558,834, 12 pages.
Office Action, dated Nov. 29, 2017, regarding U.S. Appl. No. 14/558,853, 78 pages.
Canadian Intellectual Property Office Examination Report, dated Dec. 14, 2017, regarding Application No. 2,882,446, 16 pages.
Notice of Allowance, dated Jan. 17, 2018, regarding U.S. Appl. No. 14/559,034, 13 pages.
Spishak et al., "Magnet Sensing Hole Driller and Method Therefor," U.S. Appl. No. 3/931,165, filed Jun. 28, 2013, 33 pages.
Larson et al., "Modular Stanchion System," U.S. Appl. No. 13/926,646, filed Jun. 25, 2013, 31 pages.
Desjardien et al., "Modular and Reconfigurable Support System," U.S. Appl. No. 13/904,789, filed May 29, 2013, 73 pages.
Best et al., "Apparatus and Method for Moving a Structure in a Manufacturing Environment," U.S. Appl. No. 13/940,843, filed Jul. 12, 2013, 45 pages.
Valenzuela et al., "Systems and Methods for Movement of Objects," U.S. Appl. No. 14/189,828, filed Feb. 25, 2014, 41 pages.
Larson et al., "Modular Stanchion System," U.S. Appl. No. 14/265,946, filed Apr. 30, 2014, 34 pages.
Cobb et al., "Metrology System for Positioning Assemblies," U.S. Appl. No. 14/559,034, filed Dec. 3, 2014, 84 pages.
Day et al., "Crawler Robot and Supporting Platform," U.S. Appl. No. 14/558,850, filed Dec. 3, 2014, 78 pages.
Desjardien et al., "Apparatus, System, and Method for Supporting a Wing Assembly," U.S. Appl. No. 14/558,834, filed Dec. 3, 2014, 88 pages.
Reid et al., "System and Method for Positioning an Automated Assembly Tool Relative to a Structure," U.S. Appl. No. 14/558,853, filed Dec. 3, 2014, 128 pages.
Reid et al., "Mobile Automated Assembly Tool for Aircraft Structures," U.S. Appl. No. 14/558,859, filed Dec. 3, 2014, 76 pages.
Desjardien et al., "Mobile Automated Overhead Assembly Tool for Aircraft Structures," U.S. Appl. No. 14/558,899, filed Dec. 3, 2014, 100 pages.

Extended European Search Report, dated Sep. 22, 2015, regarding Application No. EP14196571.5, 8 pages.
Partial European Search Report, dated Sep. 30, 2015, regarding Application No. EP14196480.9, 6 pages.
Extended European Search Report, dated Oct. 2, 2015, regarding Application No. EP14196553.3, 7 pages.
Final Office Action, dated Aug. 2, 2016, regarding U.S. Appl. No. 14/558,850, 33 pages.
Notice of Allowance, dated Jul. 7, 2016, regarding U.S. Appl. No. 14/558,859, 29 pages.
Office Action, dated May 12, 2016, regarding U.S. Appl. No. 14/558,899, 35 pages.
Office Action, dated May 12, 2016, regarding U.S. Appl. No. 14/558,859, 27 pages.
Office Action, dated Nov. 10, 2016, regarding U.S. Appl. No. 14/558,850, 23 pages.
Final Office Action, dated Nov. 17, 2016, regarding U.S. Appl. No. 14/558,899, 36 pages.
Extended European Search Report, dated Apr. 8, 2016, regarding Application No. EP14196494.0, 6 pages.
Extended European Search Report, dated May 2, 2016, regarding Application No. EP14196483.3, 7 pages.
Extended European Search Report, dated May 2, 2016, regarding Application No. EP14196468.4, 7 pages.
Extended European Search Report, dated May 3, 2016, regarding Application No. EP14196548.3, 7 pages.
Office Action, dated Mar. 4, 2016, regarding U.S. Appl. No. 14/558,850, 24 pages.
Extended European Search Report, dated Jan. 27, 2016, regarding Application No. EP14196480.9, 10 pages.
Canadian Intellectual Property Office Office Action, dated Feb. 15, 2018, regarding Application No. 2,883,614, 20 pages.
Japanese Notice of Reasons for Rejection and English Translation, dated Feb. 19, 2019, regarding Application No. 2015082572, 6 pages.
Office Action, dated Mar. 27, 2019, regarding U.S. Appl. No. 15/989,054, 38 pages.
European Patent Office Communication Report, dated Nov. 19, 2018, regarding Application No. 14196553.3, 7 pages.
European Patent Office Communication Report, dated Nov. 20, 2018, regarding Application No. 14196494.0, 4 pages.
State Intellectual Property Office of PRC Notification of Second Office Action with English Translation, dated Oct. 18, 2018, regarding Application No. 2015102135559, 10 pages.
Canadian Intellectual Property Office Canadian Office Action, dated Dec. 3, 2018, regarding Application No. CA2883614, 6 pages.
Japanese Notice of Reasons for Rejection and English Translation, dated Jan. 29, 2019, regarding Application No. 2015052833, 8 pages.
Japanese Notice of Reasons for Rejection and English Translation, dated Jan. 29, 2019, regarding Application No. 2015059895, 8 pages.
Chinese Intellectual Property Office, Notification of First Office Action and English Translation, dated Apr. 24, 2018, regarding Application No. 201510213555.9, 11 pages.
State Intellectual Property Office of PRC, Notification of First Office Action, Search Report, and English Translation, dated May 29, 2018, regarding Application No. 201510206735.4, 11 pages.
State Intellectual Property Office of PRC, Notification of First Office Action, Search Report, and English Translation, dated May 31, 2018, regarding Application No. 201510179806.6, 20 pages.
State Intellectual Property Office of PRC, Notification of First Office Action, Search Report, and English Translation, dated Jun. 21, 2018, regarding Application No. 201510210496.X, 20 pages.

* cited by examiner

FLEXIBLE MANUFACTURING FOR AIRCRAFT STRUCTURES

RELATED PROVISIONAL APPLICATION

This application claims the benefit of U.S. Provisional Patent Application Ser. No. 61/986,824, filed Apr. 30, 2014, and entitled "Flexible Manufacturing System for Aircraft Structures."

CROSS-REFERENCE TO RELATED APPLICATIONS

This application is related to the following patent applications: entitled "Crawler Robot and Supporting Platform," Ser. No. 14/558.850, now U.S. Pat. No. 9,776,330; entitled "System and Method for Positioning an Automated Assembly Tool Relative to a Structure," Ser. No. 14/558,853, now U.S. Pat. No. 10,118,714; entitled "Metrology System for Positioning Assemblies," Ser. No. 14/559,034, now U.S. Pat. No. 10,000,298; entitled "Mobile Automated Assembly Tool for Aircraft Structures," Ser. No. 14/558,859, now U.S. Pat. No. 9,486,917; entitled "Mobile Automated Overhead Assembly Tool for Aircraft Structures," Ser. No. 14/,558, 899, now U.S. Pat. No. 9,708,079; and entitled "Apparatus, System, and Method for Supporting a Wing Assembly," Ser. No. 14/558,834, now U.S. Pat. No. 10,017,277, filed of even date herewith, each assigned to the same assignee, and each incorporated herein by reference in its entirety.

BACKGROUND INFORMATION

1. Field

The present disclosure relates generally to aircraft and, in particular, to manufacturing aircraft structures. Still more particularly, the present disclosure relates to a method and apparatus for performing operations to manufacture aircraft structures using an automated drivable assembly system.

2. Background

Manufacturing aircraft structures may be a complex and time-consuming process. Thousands of parts may be designed and assembled to complete an aircraft structure. Progressive assembly of these parts may be completed by moving the aircraft structure to different locations in the manufacturing facility. Various operations are performed on the aircraft structure in each of the locations.

Existing assembly systems for aircraft structures use fixed monument fixtures arranged throughout the manufacturing facility. In this illustrative example, a "fixed monument fixture" is a structure that is immovably connected to the facility floor, wall, or other portion of the manufacturing facility. For example, without limitation, a fixed monument fixture that is bolted to the facility floor may be used to hold an aircraft structure in a desired position while it is being assembled.

Human operators and their tools maneuver about these fixed monument fixtures to perform operations on the aircraft structure. For instance, human operators may bring various parts to the fixed monument fixture, position those parts relative to the aircraft structure held by the fixed monument fixture, and perform operations such as drilling, fastening, coating, and inspecting, among others. Countless labor hours are needed for human operators to assemble and inspect the aircraft structure.

Once a certain point in assembly is reached, the aircraft structure may be removed from the fixed monument fixture and moved to a new location within the manufacturing facility. In the new location, the structure may again be secured to a fixed monument fixture, recalibrated, and assembled. The movement and repositioning of the aircraft structure may cause undesired delays in the manufacturing process, which increase the production time for the aircraft structure.

In addition, the process of using fixed monument fixtures may take up more room than desired in the manufacturing facility, allow limited access to the aircraft structure for human operators, or both. The need for human operators to transport parts to fixed monument fixtures and maneuver within and around these fixed monument fixtures also may increase the time, complexity, and cost of assembling the aircraft more than desired.

Additionally, fixed monument fixtures may be difficult to modify or move since fixed monument fixtures are heavy, secured to the floor, or both. Therefore, fixed monument fixtures may be inflexible and may be useful for only one assembly build configuration. Accordingly, there is a need for a method and apparatus that provides a more efficient, flexible, higher production rate process for assembling aircraft without the use of fixed monument fixtures attached to the manufacturing facility floor.

SUMMARY

In one illustrative embodiment, a flexible manufacturing system for an aircraft structure may comprise a drivable support. The drivable support may be driven from a first location and brought together with at least one other drivable support to form a drivable support system at a second location on a floor of a manufacturing environment. The drivable support system may be configured to hold a structure in a desired position.

In another illustrative embodiment, a method for manufacturing an aircraft structure may be provided. A drivable support may be driven from a first location to a second location to bring the drivable support together with at least one other drivable support to form a drivable support system. A structure may be held in a desired position using the drivable support system.

In another illustrative embodiment, a flexible manufacturing system may comprise a drivable support, a plurality of autonomous tool systems, a metrology system, and a controller in communication with the metrology system, the drivable support system, and the plurality of autonomous tool systems. The drivable support may be configured to be driven from a first location and brought together with at least one other drivable support to form a drivable support system at a second location on a floor of a manufacturing environment. The drivable support system may be configured to hold the structure in a desired position. The drivable support system and the structure may be configured to drive to a third location while operations are being performed on the structure. The plurality of autonomous tool systems may be configured to perform the operations on the structure. The plurality of autonomous tool systems may be further configured to drive across the floor of the manufacturing environment. The metrology system may be configured to determine a current position for at least one of the drivable support system, the plurality of autonomous tool systems, or the structure. The controller may be configured to control operation of at least one of the drivable support system or the plurality of autonomous tool systems.

In yet another illustrative embodiment, a system for manufacturing an aircraft structure may comprise a group of crawler robots and a mobile platform. The group of crawler robots may be positioned on a structure. The group of crawler robots may be configured to move along a surface of the structure to install fasteners in the structure. The mobile platform may be configured to drive across a floor of a manufacturing environment. The mobile platform may be further configured to place the group of crawler robots on the surface of the structure.

In still another illustrative embodiment, a method for manufacturing an aircraft structure may be provided. A drivable platform may be driven across a floor of a manufacturing environment to place a group of crawler robots on a structure. The group of crawler robots may be positioned relative to a surface of the structure to install fasteners in the structure.

In another illustrative embodiment, a system for manufacturing an aircraft structure may comprise a hexapod and a movement system associated with the hexapod. The hexapod may be positioned relative to a surface of a structure. The hexapod may be configured to move relative to the surface of the structure to install a fastener in the structure. The movement system may be configured to drive the hexapod across a floor of a manufacturing environment to position the hexapod relative to the structure.

In yet another illustrative embodiment, a method for manufacturing an aircraft structure may be provided. A hexapod may be driven across a floor of a manufacturing environment to position the hexapod relative to a structure using a movement system associated with the hexapod. The hexapod may be positioned relative to a surface of the structure to install a fastener in the structure.

In still another illustrative embodiment, a flexible manufacturing system for a structure may comprise a mobile support system, a plurality of autonomous tool systems, a metrology system, and a controller in communication with the metrology system and the plurality of autonomous tool systems. The mobile support system may be configured to hold the structure in a desired position. The mobile support system may be further configured to carry the structure between a plurality of work cells during a performance of operations for manufacturing the structure. The plurality of autonomous tool systems may be configured to perform the operations on the structure. The plurality of autonomous tool systems may be further configured to move with the mobile support system. The metrology system may be configured to generate metrology data for at least one of the mobile support system, the plurality of autonomous tool systems, or the structure. The controller may be configured to control operation of the plurality of autonomous tool systems using the metrology data.

In another illustrative embodiment, a flexible manufacturing system for a structure may comprise a translatable support system, a plurality of autonomous tool systems, a metrology system, and a controller in communication with the metrology system and the plurality of autonomous tool systems. The translatable support system may be configured to hold the structure in a desired position. The translatable support system may be further configured to move with the structure from a first location to a second location during a performance of operations for manufacturing the structure. The plurality of autonomous tool systems may be configured to perform the operations on the structure. The plurality of autonomous tool systems may be further configured to move with the translatable support system. The metrology system may be configured to generate metrology data for at least one of the translatable support system, the plurality of autonomous tool systems, or the structure. The controller may be configured to control operation of the plurality of autonomous tool systems using the metrology data.

In yet another illustrative embodiment, a method for positioning a tool on a surface may be provided. The tool may be moved relative to the surface to roughly position the tool within a selected region on the surface using a first movement system. The tool may be further moved relative to the surface with at least one degree of freedom to precisely position the tool at a selected position within the selected region on the surface using a second movement system.

In still another illustrative embodiment, a method for positioning a tool on a surface may be provided. The tool may be moved relative to the surface to roughly position the tool within a selected region on the surface using a first movement system. The tool may be further moved relative to the surface with at least one degree of freedom to precisely position the tool at a selected position within the selected region on the surface using a second movement system. An element associated with the tool may be aligned for performing an operation at the selected position relative to the selected position using a third movement system.

In another illustrative embodiment, a flexible manufacturing system for an aircraft structure may comprise a first group of drivable supports, a second group of drivable supports, a first elongate platform and a second elongate platform. The first group of drivable supports may be driven from a first location and brought together with the second group of drivable supports at a second location on a floor of a manufacturing environment. The first elongate platform may be connected to the first group of drivable supports. The first group of drivable supports may drive the first elongate platform to the second location. The second elongate platform may be connected to the second group of drivable supports. The second group of drivable supports may drive the second elongate platform to the second location. The first elongate platform and the second elongate platform may hold a structure in a desired location and may carry the structure through the manufacturing environment.

In yet another illustrative embodiment, a method for manufacturing an aircraft structure may be presented. A first group of drivable supports, connected to a first elongate platform, may be driven from a first location to a second location on a floor of a manufacturing environment. A second group of drivable supports, connected to a second elongate platform, may be driven to position the second elongate platform relative to the first elongate platform. A structure used to form the aircraft structure may be connected to the first elongate platform and the second elongate platform. The structure may be held in a desired position using the first elongate platform and the second elongate platform.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
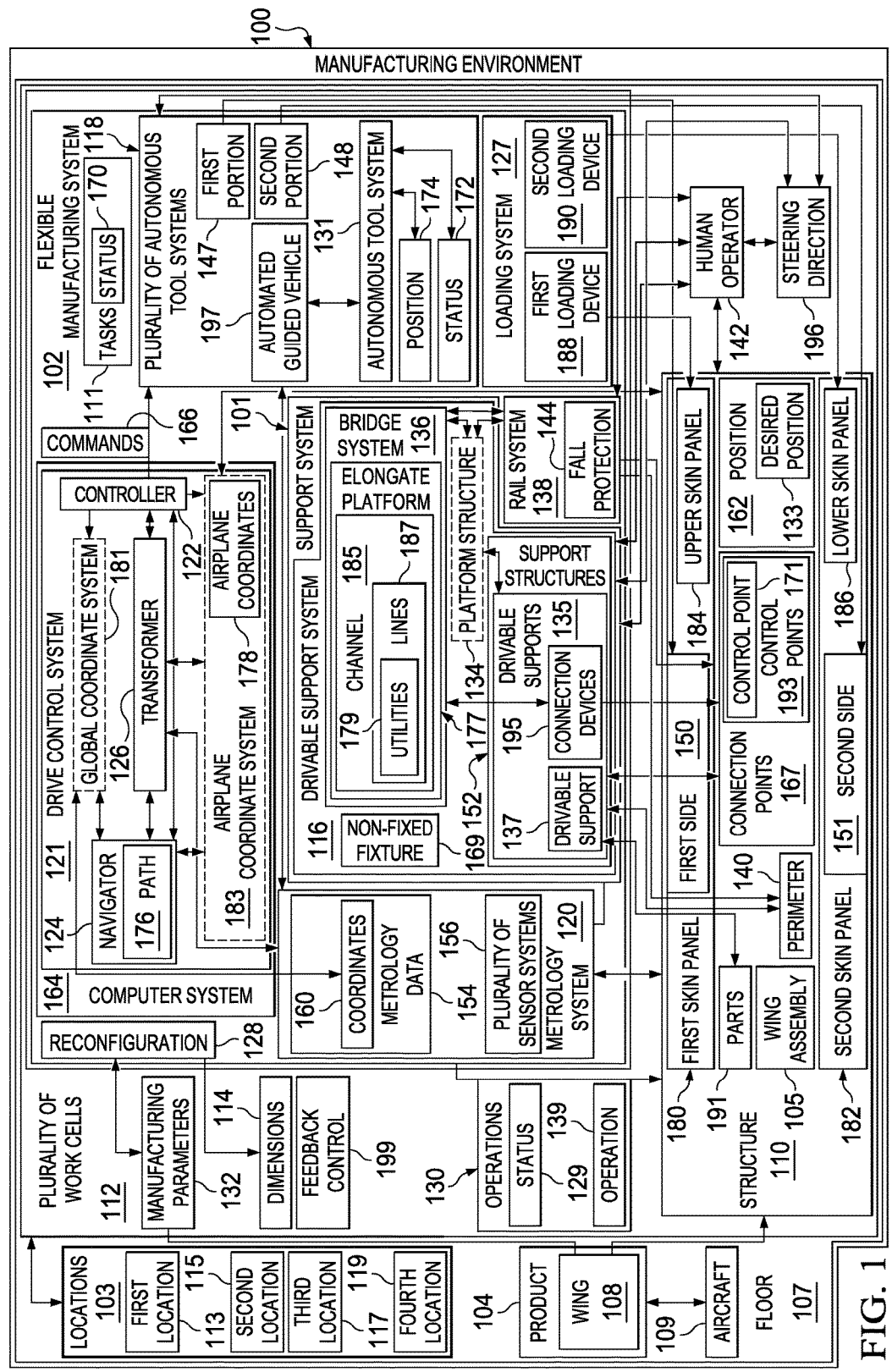
FIG. 1 is an illustration of a block diagram of a manufacturing environment in accordance with an illustrative embodiment.

The illustrative embodiments recognize and take into account one or more different considerations. For example, without limitation, the illustrative embodiments recognize and take into account that it may be desirable to assemble an aircraft structure without the use of fixed monument fixtures at different locations within the manufacturing facility. These fixed monument fixtures may be large, bulky, structures that take up significant amounts of space in the manufacturing facility. As a result, the number of work cells available in the manufacturing facility may be limited, which reduces the number of aircraft structures that may be assembled at the same time.

Additionally, the illustrative embodiments recognize and take into account that when maintenance or rework needs to be performed on the fixed monument fixtures, production of aircraft structures may be slowed until the fixed monument fixture is repaired. Fixed monument fixtures are not easily replaceable without significantly reducing the production rate of aircraft structures within the manufacturing facility.

The illustrative embodiments also recognize and take into account that it may be desirable to reconfigure devices in an assembly system based on the layout of the manufacturing facility being used, the type of aircraft structure being built, or a combination thereof. For instance, it may be desirable to a manufacturer to bring a number of devices to an empty manufacturing environment, where no fixed monument fixtures or other structures are present. The manufacturer may then arrange or assemble the devices as needed to promote efficient manufacturing of the aircraft structure. After initially arranging such devices, the illustrative embodiments recognize and take into account that it may be desirable to rearrange the devices, change the configuration of the devices, modify the length of the assembly line, perform more operations at a single location, or make some other change or adjustment. In other words, it may be desirable for the devices to be arranged and rearranged to form many different non-fixed fixtures.

The illustrative embodiments further recognize and take into account that it may be desirable to increase the speed at which an aircraft structure is assembled. For example, without limitation, it may be desirable to automate various operations using robotic devices. As another example, it may be desirable to move the aircraft structure between locations in the manufacturing facility without disconnecting the aircraft structure from the fixture holding the aircraft structure. It also may be desirable to move the aircraft structure to another location without having to place the aircraft structure back onto another set of fixed monument fixtures before performing additional operations. All of these actions require reconfiguration of the aircraft structure which may increase the time, complexity, and cost of manufacturing the aircraft structure.

Thus, the illustrative embodiments may provide a method and apparatus for performing operations on an aircraft structure. This aircraft structure may take the form of a wing, a fuselage, a stabilizer, a flap, a door, a slat, an aileron, a spoiler, or other component for an aircraft or some other non-aircraft structure. A flexible manufacturing system may include a drivable support driven from a first location and brought together with at least one other drivable support to form a drivable support system, or non-fixed fixture, at a second location on a floor of a manufacturing environment. The drivable support system may be configured to hold a structure in a desired position and drive the drivable support system carrying the assembly to a third location while operations are being performed on the assembly.

Referring now to the figures and, in particular, with reference to FIG. 1, an illustration of a block diagram of a manufacturing environment is depicted in accordance with an illustrative embodiment. In this illustrative example, manufacturing environment 100 is an environment in which flexible manufacturing system 102 may be used to manufacture product 104.

In an illustrative example, manufacturing environment 100 may be empty before flexible manufacturing system 102 is initially arranged within manufacturing environment 100. In other words, manufacturing environment 100 may be an empty manufacturing facility, building, unit, or other suitable location used to manufacture product 104. Flexible manufacturing system 102 may be moved into manufacturing environment 100, arranged, and reconfigured as needed to promote efficient manufacturing of product 104. Flexible manufacturing system 102 may be a manufacturing system having the flexibility to change to produce new product types, the ability to change the order of operations executed on a part for product 104, the ability to use multiple devices to perform the same operation on a part, the ability to handle large-scale changes in volume, capacity, or capability, or some combination thereof.

In this illustrative example, flexible manufacturing system 102 may be a manufacturing system that is at least partially automated. In one illustrative example, flexible manufacturing system 102 is a substantially fully automated system for manufacturing product 104. When flexible manufacturing system 102 is fully automated, it may take the form of an autonomous flexible manufacturing system.

Flexible manufacturing system 102 may be movable and reconfigurable in this illustrative example. In particular, one or more components in flexible manufacturing system 102 may be movable to various locations 103 in manufacturing environment 100. None of the components in flexible manufacturing system 102 are fixed in a specified location.

As used herein, a device that is "movable" may mean that the item can move or be moved. In some cases, a movable device may take the form of a mobile device.

A device that is "mobile" may be able to move from one location in three-dimensional space to another location in three-dimensional space. In particular, an entirety of the device, which may include all of the components that make up the device, may be capable of moving or being moved from one location in three-dimensional space to another location in three-dimensional space. In this manner, the device is not fixed to a particular location.

When flexible manufacturing system 102 includes mobile devices, flexible manufacturing system may be referred to as a mobile assembly system. Flexible manufacturing system 102 does not include a fixed monument fixture in this illustrative example. In some cases, a mobile device may take the form of a drivable device.

A device that is "drivable" may be able to move from one location in three-dimensional space to another location in three-dimensional space as described above. Movement of a drivable device may be controlled using, for example, without limitation, a controller for the device, a system controller for flexible manufacturing system 102, or some other type of controller.

Depending on the implementation, movement of a drivable device may be controlled at least one of electronically, mechanically, electromechanically, or manually. In this manner, a drivable device may be capable of moving or being moved in its entirety in a number of different ways. In some cases, movement of a drivable device may be both electronically and manually controlled. For example, the device may be drivable across floor 107 of manufacturing environment 100 to assemble product 104.

In this depicted example, product 104 is a physical object that is comprised of any number of parts, components, sub-assemblies, assemblies, or systems. These items may be assembled to form product 104. In some cases, product 104 may be partially assembled in manufacturing environment 100 and then moved to another location for additional assembly. Product 104 may be referred to as a structure, an aircraft structure, a part, or an aircraft part in some instances.

In one illustrative example, product 104 may take the form of wing 108 for aircraft 109. In other illustrative examples, product 104 may take the form of an aircraft structure selected from one of a fuselage, a vertical stabilizer, a control surface, a horizontal stabilizer and other suitable structures. Further, product 104 may be an automobile, an aircraft, a ship, a satellite, an engine, a building, or other types of structures in some cases.

Structure 110 may correspond to product 104 during manufacturing of product 104. Specifically, structure 110 may be product 104 during various stages of manufacturing. In this manner, structure 110 may be one or more components used to form product 104, a partially completed product 104, or a fully completed product 104. In some illustrative examples, structure 110 may be referred to as an assembly for product 104.

When structure 110 corresponds to wing 108, structure 110 may be referred to as wing assembly 105. In this depicted example, components may be added to structure 110 as structure 110 moves about manufacturing environment 100.

As depicted, manufacturing environment 100 may include locations 103. In particular, manufacturing environment 100 may include first location 113, second location 115, third location 117, and fourth location 119. In this illustrative example, locations 103 may be different physical positions within manufacturing environment 100.

Manufacturing environment 100 may include plurality of work cells 112. Plurality of work cells 112 are areas in manufacturing environment 100 where flexible manufacturing system 102 works on structure 110. A location in locations 103 may correspond to a work cell in work cells 112 in some cases. For instance, one or more of locations 103 may be in one of plurality of work cells 112.

Various tasks 111 may be performed in each work cell in plurality of work cells 112. For example, without limitation, in one work cell, spars and ribs may be connected to each other to form a framework for wing 108. In another work cell, skin panels may be attached to the framework. In yet another work cell, a sealant, paint, or other materials may be applied to wing 108.

In this depicted example, each work cell in plurality of work cells 112 may have dimensions 114. Dimensions 114 may represent measurements of the size of each of the different work cells in plurality of work cells 112. For instance, dimensions 114 may include a length, a width, a height, and other suitable dimensions for each work cell in plurality of work cells 112.

Dimensions 114 for each work cell in plurality of work cells 112 may be the same or different in this illustrative example. In some cases, dimensions 114 may change as structure 110 moves through plurality of work cells 112. In other cases, dimensions 114 may change based on at least one of a size or a layout of manufacturing environment 100.

As used herein, the phrase "at least one of," when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required.

For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

As illustrated, flexible manufacturing system 102 may comprise a number of different components. As used herein, a "number of" items may be one or more items. For instance, a number of components may be one more components.

In this illustrative example, flexible manufacturing system 102 may include support system 101, plurality of autonomous tool systems 118, drive control system 121, navigator 124, transformer 126, and loading system 127. These systems may be referred to collectively as "components" in flexible manufacturing system 102.

At least one of the components in flexible manufacturing system 102 may be reconfigurable. In this illustrative example, substantially all of the components in flexible manufacturing system 102 are reconfigurable depending on the particular implementation of flexible manufacturing system 102.

As used herein, "reconfigurable" may refer to the ability of components within a system to be rearranged. This rearrangement may be in terms of a change in position of one component relative to another component. The position may be the location of the component using three-dimensional coordinates, the orientation of the component, or both.

The position of components within flexible manufacturing system 102 may be "dynamically reconfigured." In other words, components within support system 101 may be rearranged in real-time as structure 110 is moved through manufacturing environment 100.

In another illustrative example, each component within support system 101 also may be independently reconfigurable. In other words, devices within each component may be rearranged, recalibrated, or otherwise changed during manufacturing of wing 108.

As an example, when a component has three devices, one or more of those devices may be reconfigured within the component without rearranging the position of the component relative to other components in flexible manufacturing system 102. In this manner, flexible manufacturing system 102 as a whole, as well as each component within flexible manufacturing system 102, may be dynamically reconfigured as needed. When one or more of the components in flexible manufacturing system 102 are reconfigured, reconfiguration 128 of those components has occurred.

In this illustrative example, reconfiguration 128 of components within flexible manufacturing system 102 may occur during manufacturing of product 104. In particular, reconfiguration 128 of at least one of the components within flexible manufacturing system 102 may be performed based on changes in at least one of dimensions 114 in different work cells in plurality of work cells 112, status 129 of operations 130 for structure 110, or a status of any one of the components in flexible manufacturing system 102.

As an example, when an autonomous tool system in plurality of autonomous tool systems 118 goes offline, another autonomous tool system in plurality of autonomous tool systems 118 may take over for the offline device. This action results in reconfiguration 128 of plurality of autonomous tool systems 118. In another illustrative example, when dimensions 114 in plurality of work cells 112 are limited, more of operations 130 may be performed in a single work cell.

In still other illustrative examples, reconfiguration 128 may include changing the order of operations 130. In this case, because each of the components within flexible manufacturing system 102 can move relative to other components in flexible manufacturing system 102, these components are moved to a desired position within manufacturing environment 100.

As another example, reconfiguration 128 may occur based on manufacturing parameters 132 for wing 108. Manufacturing parameters 132 may include size of product 104 being manufactured, the type of plurality of autonomous tool systems 118 needed, a production rate, the materials used, safety considerations, airline regulations, other suitable parameters, or a combination thereof.

In this depicted example, support system 101 may be used to support and hold structure 110 as structure 110 moves through manufacturing environment 100. In this manner, support system 101 carries structure 110 through manufacturing environment 100.

Support system 101 may include a number of components that drive across floor 107 in manufacturing environment 100. When support system 101 includes drivable components, support system 101 takes the form of drivable support system 116.

Drivable support system 116 may take the form of a rapid autonomous barge intelligent tool (RABIT) in some cases. Drivable support system 116 may be referred to as a translatable support system or a mobile support system.

Drivable support system 116 may be configured to hold structure 110 in desired position 133 as it drives across floor 107. In this illustrative example, drivable support system 116 may carry structure 110 between plurality of work cells 112 during performance of operations 130.

As illustrated, drivable support system 116 may comprise support structures 152 and bridge system 136. Drivable support system 116 also may be physically associated with rail system 138. As used herein, a first component, such as drivable support system 116, may be considered to be associated with a second component, such as rail system 138, by being secured to the second component, bonded to the second component, mounted to the second component, welded to the second component, fastened to the second component, connected to the second component in some other suitable manner, or a combination thereof. The first component also may be connected to the second component using a third component. Further, the first component may be considered to be associated with the second component by being formed as part of, as an extension of the second component, or a combination thereof.

In this illustrative example, support structures 152 each may be individually drivable. When support structures 152 are drivable, support structures 152 take the form of drivable supports 135. Drivable support 137 is one of drivable supports 135 in this illustrative example. Drivable support 137 may be a device configured to be driven from first location 113 and brought together with at least one other drivable support in drivable supports 135 to form drivable support system 116 at second location 115 on floor 107 of manufacturing environment 100.

Drivable support system 116 may take the form of non-fixed fixture 169. In this manner, drivable support system 116 may function as a monument that is drivable, movable, translatable, or otherwise configured to be moved in its entirety between locations 103 in manufacturing environment 100. Once drivable support system 116 is formed, drivable support system 116 may be configured to carry structure 110 to third location 117 while operations 130 are being performed on structure 110. As an example, third location 117 may be a location in one of plurality of work cells 112. Drivable support system 116 also may carry structure 110 between a number of additional locations in manufacturing environment 100.

Each one of drivable supports 135 may be configured to hold one of parts 191 for structure 110 and drive across floor 107 of manufacturing environment 100 to position each respective part relative to one another under the command of controller 122 in drive control system 121. For instance, drivable support 137 may carry a spar across floor 107 to position the spar relative to structure 110. As another example, drivable support 137 may bring a group of ribs to structure 110.

Each of drivable supports 135 may be connected to structure 110 at different connection points 167 on structure 110 in this illustrative example. Connection points 167 are physical locations on structure 110 to which drivable supports 135 connect.

In this depicted example, each of drivable supports 135 may be a module that can be moved away from drivable support system 116 and replaced with another. In this manner, drivable support system 116 may be reconfigured for a different sized wing. As another example, a new drivable support may be used to replace one of drivable supports 135 that may malfunction or need maintenance, for some other reason, or a combination thereof.

Drivable supports 135 may be mechanical stanchions, upright supports, automated guided vehicles, pillars, or may take other forms in this illustrative example. Each of drivable supports 135 may be equipped with various mechanical and electrical components such as, for example, without limitation, a controller, an actuator, a clamping device, a pneumatic tool, a hydraulic tool, and other suitable devices configured to hold structure 110 in desired position 133.

In some illustrative examples, each of drivable supports 135 may be associated with its own movement system. When drivable supports 135 are brought together to form drivable support system 116, the individual movement systems corresponding to drivable supports 135 may move collectively between locations 103.

In other illustrative examples, a collective movement system may be configured to move drivable support system 116 in its entirety. For instance, a tug or other type of movement system may be connected to one or more of drivable supports 135 to move or propel drivable support system 116 from one location to another location in manufacturing environment 100.

As depicted, desired position 133 may be a configuration for structure 110 in three-dimensional space. For example, without limitation, desired position 133 may include a location, an orientation, a height above floor 107, or some other suitable configuration in manufacturing environment 100. Desired position 133 may be selected based on the size of structure 110, the type of operations 130 being performed on structure 110, and other suitable parameters.

Drivable supports 135 may be associated with connection devices 195. Connection devices 195 may be referred to as fixturing devices, fixturing points, connection points, or connection tools in some illustrative examples.

Connection devices 195 each may connect to a different one of connection points 167 on structure 110. Connection devices 195 may be configured to connect to structure 110 at connection points 167 to hold at least a portion of structure 110 above floor 107. Connection devices 195 may move vertically, tilt, or otherwise position the different parts 191 on structure 110.

Controller 122 may be configured to control each of connection devices 195 individually, to change its height, angle, length, or other parameters. Controller 122 also may be configured to control the collective of connection devices 195 corresponding to drivable supports 135 forming drivable support system 116.

In addition, controller 122 may be configured to extend or retract each of connection devices 195. In this manner, precise positioning of parts 191 of structure 110 may be completed to achieve desired position 133 for structure 110.

In some illustrative examples, one or more of connection devices 195 may be configured to connect to structure 110 at control points 193. Control points 193 are connection points 167 with additional functions.

Control point 171 may be one of control points 193. Control point 171 may be a location on structure 110 that may be controllable such that control point 171 may be brought into alignment with a reference coordinate system for structure 110 or for product 104 being manufactured.

For example, without limitation, the reference coordinate system may be a reference coordinate system based on product 104 or the object or platform for which product 104 is being manufactured. When product 104 being assembled is, for example, without limitation, wing 108 for aircraft 109, the reference coordinate system may be airplane coordinate system 183. In such a case, control point 171 may be at a known location on structure 110 with respect to airplane coordinate system 183.

Control point 171 may be used to transition between airplane coordinate system 183 and global coordinate system 181 for manufacturing environment 100. Global coordinate system 181 may be identified using metrology system 120. Global coordinate system 181 may be a shop or manufacturing coordinate system.

The location of control point 171 in global coordinate system 181 may correspond with the location of control point 171 in airplane coordinate system 183. In this manner, for example, without limitation, locations within airplane coordinate system 183 at which particular operations are to be performed may be transformed into locations within global coordinate system 181. Further, locations within global coordinate system 181 at which particular operations are being performed may be transformed into locations within airplane coordinate system 183. These transformations may occur using transformer 126.

For example, control point 171 may be used to transition between global coordinate system 181 for manufacturing environment 100 and a wing coordinate system for wing 108 or airplane coordinate system 183 for aircraft 109. In this manner, control point 171 may be used to locate structure 110 with respect to airplane coordinate system 183.

The collective of connection devices 195 corresponding to drivable supports 135 may be attached to the parts used to assemble a product, such as wing 108, at connection points 167. This collective of connection devices 195 may hold parts 191 at connection points 167 to restrain assembly dimensional shape within tolerances. The collective of connection devices 195 also may hold the parts in the desired position for assembly of wing 108. Connection points 167 may be attachment points on the structure. For instance, connection points 167 may be leading or trailing edge attachment points or control surface hinge points for structures such as slats, spoilers, rudders, flaps, control surfaces, or other points where something can be attached to the structure during the build process.

In this illustrative example, drivable supports 135 may substantially prevent structure 110 from moving in an undesired manner. Structure 110 may move in an undesired manner when structure 110 moves outside of selected tolerances. For instance, structure 110 may move in an undesired manner when structure 110 tilts, sways, rotates, vibrates, or moves in some other manner outside of desired position 133.

In some cases, drivable supports 135 may be connected to one another by platform structure 134. In this illustrative example, platform structure 134 may be an object positioned under structure 110. Platform structure 134 may comprise a number of platforms that connect drivable supports 135 to one another. In this manner, platform structure 134 may temporarily connect drivable supports 135. Platform structure 134 and drivable supports 135 may then collectively carry structure 110 throughout plurality of work cells 112 from location to location. When platform structure 134 drives across floor 107, platform structure 134 may be referred to as a drivable platform structure.

As depicted, bridge system 136 may be a structure connected to drivable supports 135. For instance, drivable supports 135 may hold bridge system 136. As another example, bridge system 136 may connect two or more drivable supports 135. In another illustrative example, bridge system 136 may be connected to drivable supports 135 in some other manner.

In this depicted example, bridge system 136 may be configured to provide access to structure 110 by human operator 142. For example, without limitation, bridge system 136 may allow access for human operator 142 to a portion of structure 110 that would not otherwise be accessed from floor 107 of manufacturing environment 100. As another example, bridge system 136 may provide a walkway over structure 110.

In one illustrative example, bridge system 136 may be connected to drivable supports 135. In this case, drivable supports 135 drive bridge system 136 from one location to another location in manufacturing environment 100. In the illustrative example, a group of drivable supports 135 may move bridge system 136. For example, without limitation, three supports, four supports, seven supports, or some other suitable number of drivable supports 135 may move bridge system 136 into place.

When bridge system 136 is connected to drivable supports 135, connection devices 195 may be located on bridge system 136 instead of being located on each of drivable supports 135. For instance, bridge system 136 may comprise elongate platform 177 on which connection devices 195 are positioned. Depending on the implementation, connection devices 195 may be equally spaced at fixed intervals along elongate platform 177 or spaced at intervals that may change by moving one or more of connection devices 195.

Elongate platform 177 is an elevated platform in this illustrative example. When elongate platform 177 is used, structure 110 is connected to connection devices 195 positioned along elongate platform 177.

In an illustrative example, elongate platform 177 may take the form of a beam. In other illustrative examples, elongate platform 177 may take the form of any physical structure having a shape and size configured to hold and support structure 110.

In some instances, more than one elongate platform is used. When more than one elongate platform is used, connection devices 195 may be positioned on each platform in various configurations.

In an illustrative example, connection devices 195 may be positioned along the length of elongate platform 177. For instance, connection devices 195 may be positioned adjacent to one another along the entire length of elongate platform 177. In this manner, more of connection devices 195 may be implemented in an illustrative embodiment without increasing the number of drivable supports 135 used. Each of connection devices 195 positioned along elongate platform 177 correspond to one or more of connection points 167 of structure 110.

In this depicted example, each of drivable supports 135 may move a portion of elongate platform 177. For instance, each of drivable supports 135 oriented underneath elongate platform 177 may move a point on elongate platform 177 in at least one of the x-direction, the y-direction, or the z-direction. Drivable supports 135 also may rotate a point on elongate platform 177 about the x-axis, the y-axis, or the z-axis to position elongate platform 177 as desired.

As an example, drivable support 137 may use a z-ram or other lift device to lift a portion of elongate platform 177 higher above the ground to compensate for uneven areas of floor 107. In this manner, drivable support 137 may move to control the flatness of elongate platform 177 and accordingly, control the position of corresponding portions of structure 110. As another example, drivable support 137 may tilt elongate platform 177 such that connection devices 195 connected to elongate platform 177 bring control points 193 on structure 110 into alignment.

The movement of elongate platform 177 may occur in addition to, or in place of, movement of connection devices 195 individually to reposition part of structure 110. In this manner, select connection devices 195, drivable supports 135, portions of elongate platform 177, or some combination thereof may move to precisely position part of structure 110.

In some cases, connection devices 195 may be fixed on elongate platform 177. In such a case, connection devices 195 may not move individually. Instead, drivable supports 135 move elongate platform 177 to properly position structure 110. In other examples, however, one or more of connection devices 195 may move as well.

In an illustrative example, bridge system 136 also may be used to supply a number of utilities 179 to one or more devices in flexible manufacturing system 102. Utilities 179 may include at least one of electricity, water, air, communications, or other utilities.

For example, without limitation, elongate platform 177 may include channel 185. A number of lines 187 may run through channel 185. In an illustrative example, lines 187 may be structures through which utilities 179 run. For instance, some of lines 187 may take the form of cables carrying electricity or communications. In other illustrative examples, lines 187 carry air. In some cases, lines 187 may be deposited within elongate platform 177, attached underneath elongate platform 177, oriented along elongate platform 177 in some other manner, or a combination thereof.

In this depicted example, portions of bridge system 136 may come together to support structure 110 using drivable supports 135. For example, without limitation, a first group of drivable supports 135 may move elongate platform 177 into manufacturing environment 100 to support a leading edge of structure 110. In a similar fashion, a second group of drivable supports 135 may move a second elongate platform into manufacturing environment 100 to support a trailing edge of structure 110. In some illustrative examples, the first elongate platform and the second elongate platform may be connected using various end supports, latches, locks, mechanical structures, electrical structures, structural members, or other suitable devices.

Elongate platform 177 may balance a number of loads applied to connection devices 195 by structure 110 being connected to connection devices 195. In particular, elongate platform 177 may distribute the number of loads along elongate platform 177 to drivable supports 135. In this manner, elongate platform 177 may be referred to as a load-balancing structure.

As drivable supports 135 move bridge system 136 into place, drivable supports 135 may be adjusted to provide desired load handling. For instance, when traveling at an incline in manufacturing environment 100, drivable supports 135 under elongate platform 177 may move elongate platform 177 up or down to compensate for the load of structure 110. As a result, elongate platform 177 may balance the load applied by structure 110 to connection devices 195. Load balancing helps to reduce or eliminate undesired encounters with other objects, inconsistencies forming in floor 107 due to the unbalanced load of structure 110, or other undesired events.

As illustrated, rail system 138 may be associated with bridge system 136 and portions of structure 110. Rail system 138 may be configured to provide fall protection 144 for human operator 142. As an example, rail system 138 may provide a barrier such that human operator 142 does not fall off elongate platform 177 in bridge system 136.

In another illustrative example, rail system 138 may be arranged on structure 110 to provide separation between plurality of autonomous tool systems 118 and human operator 142. For example, without limitation, rail system 138 may be positioned about perimeter 140 of structure 110 to separate plurality of autonomous tool systems 118 from human operator 142. Rail system 138 may be used in addition to, or in place of, other fall protection devices such as cables, grips, ties, suspension devices, and slip protection, among others.

In this depicted example, drivable support system 116 may carry structure 110 through manufacturing environment 100. In this manner, drivable supports 135 remain connected to structure 110 as structure 110 moves between plurality of work cells 112. No fixed monument structures are needed to hold structure 110 in place within any of plurality of work cells 112. Structure 110 is driven from location to location without detaching structure 110 from drivable support system 116.

Because drivable support system 116 may move with structure 110, each of drivable supports 135 may be dynamically adjusted to compensate for various differences in plurality of work cells 112. For instance, one or more of drivable supports 135 may be adjusted to compensate for conditions such as, for example, without limitation, uneven floors, platform deflections, debris, and access requirements for plurality of autonomous tool systems 118, among others. Adjustments may be made to connection devices 195 as well.

As depicted, plurality of autonomous tool systems 118 may be drivable devices configured to perform operations 130 on structure 110. In an illustrative example, plurality of autonomous tool systems 118 may move freely within manufacturing environment 100 between locations 103 to perform operations 130.

Each of plurality of autonomous tool systems 118 may be referred to as mobile tools or automated tools in some cases. Plurality of autonomous tool systems 118 may comprise at least one of a crawler robot, a tack driller, a hexapod, a lower panel driller, an upper panel driller, or some other suitable device.

Plurality of autonomous tool systems 118 also may be configured to drive from location to location with drivable support system 116. In this illustrative example, plurality of autonomous tool systems 118 may drive between plurality of work cells 112 as drivable support system 116 also drives between plurality of work cells 112.

In this depicted example, plurality of autonomous tool systems 118 includes autonomous tool system 131. Autonomous tool system 131 may have a number of different components in this illustrative example. For instance, autonomous tool system 131 may include at least one of a drilling system, a fastening system, a loading system, a measurement device, a coating system, an inspection system, a sealing system, a cleaning system, or other suitable types of devices configured to perform operations 130 on structure 110. Autonomous tool system 131 may take the form of automated guided vehicle 197 (AGV) in some illustrative examples.

In this illustrative example, plurality of autonomous tool systems 118 may be configured to move between plurality of work cells 112 without human intervention. For example, each of plurality of autonomous tool systems 118 may be capable of communicating with controller 122, navigating through manufacturing environment 100, and performing operations 130 without instructions from human operator 142. Each of plurality of autonomous tool systems 118 may know its position in manufacturing environment 100 relative to other tools, drivable support system 116, structure 110, and other objects.

In this illustrative example, plurality of autonomous tool systems 118 may include first portion 147 and second portion 148. A "portion" of plurality of autonomous tool systems 118 may comprise one or more tools in this illustrative example.

As depicted, operations 130 may be performed on structure 110 in manufacturing environment 100. Operation 139 may be one of operations 130. Operation 139 may be selected from one of a drilling operation, a fastening operation, an inspecting operation, a sealing operation, a measurement operation, a leveling operation, a cleaning operation, and other suitable types of operations. When operations 130 are performed during assembly of structure 110, operations 130 may be referred to as assembly operations.

Each of plurality of autonomous tool systems 118 may perform one or more of operations 130. In this illustrative example, a number of operations 130 may be performed in each of plurality of work cells 112.

As depicted, plurality of autonomous tool systems 118 may be configured to operate simultaneously to perform operations 130 on structure 110. As used herein, when plurality of autonomous tool systems 118 perform operations "simultaneously," two or more tools perform operations at substantially the same time.

For example, without limitation, autonomous tool system 131 may drill holes in one portion of structure 110, while another one of plurality of autonomous tool systems 118 may drill holes in a different portion of structure 110. In another illustrative example, first portion 147 of plurality of autonomous tool systems 118 may perform drilling, measuring, and fastening operations, while second portion 148 of plurality of autonomous tool systems 118 may perform sealing and coating operations.

In yet another illustrative example, first portion 147 of plurality of autonomous tool systems 118 may be positioned relative to first side 150 of structure 110 to perform drilling operations. At the same time, second portion 148 of plurality of autonomous tool systems 118 may be positioned relative to second side 151 of structure 110 to perform drilling operations.

As illustrated, metrology system 120 may include one or more measurement devices. Metrology system 120 may be configured to generate metrology data 154 for at least one of drivable support system 116, plurality of autonomous tool systems 118, structure 110, or other components within manufacturing environment 100. Metrology data 154 may be referred to as position data or position information in some examples.

In this depicted example, metrology system 120 may take the form of a photogrammetry system, a laser tracker system, an indoor global positioning system (iGPS), or other suitable types of measurement systems. Metrology system 120 may include plurality of sensor systems 156 in some illustrative examples. A sensor system in plurality of sensor systems 156 may have a number of sensors and other components. Plurality of sensor systems 156 may comprise targets, target systems, transmitters, receivers, transceivers, or other suitable components.

In this illustrative example, some of plurality of sensor systems 156 in metrology system 120 may be connected to drivable supports 135 in drivable support system 116. For example, without limitation, one of plurality of sensor systems 156 may be mounted on each of drivable supports 135 or secured to drivable supports 135 in some other manner. When some of plurality of sensor systems 156 are connected to drivable supports 135, metrology system 120 may track drivable support system 116 as drivable support system 116 moves.

When elongate platform 177 in bridge system 136 is implemented in an illustrative embodiment, some of plurality of sensor systems 156 are connected to elongate platform 177. These sensors may be used to determine the flatness of elongate platform 177.

Plurality of sensor systems 156 also may be connected to structure 110 in this illustrative example. For instance, some of plurality of sensor systems 156 may be positioned on first side 150 or second side 151 of structure 110 to serve as reference locations for metrology system 120. In other examples, one or more of plurality of sensor systems 156 are positioned at each of control points 193 on structure 110.

In an illustrative example, some of plurality of sensor systems 156 also may be positioned on each of plurality of autonomous tool systems 118. Metrology system 120 may scan plurality of sensor systems 156 using at least one of a laser, a camera, or some other suitable device to generate metrology data 154.

As illustrated, metrology data 154 may include data that indicates the location and orientation of an object in three-dimensional space. For instance, metrology data 154 may include coordinates 160 of an object associated with one of plurality of sensor systems 156. Coordinates 160 may include Cartesian coordinates for the object in global coordinate system 181.

As an example, metrology system 120 may generate coordinates 160 for autonomous tool system 131. In another illustrative example, metrology system 120 may generate coordinates 160 for a point on the surface of elongate platform 177. In still another illustrative example, metrology system 120 may generate coordinates 160 for a portion of structure 110. From coordinates 160, as well as any orientation information contained in metrology data 154, position 162 of structure 110 may be adjusted to desired position 133.

Metrology system 120 may provide feedback control 199 for flexible manufacturing system 102 based on metrology data 154. For instance, metrology system 120 may locate at least one of drivable supports 135, points on elongate platform 177, plurality of autonomous tool systems 118, control points 193 of structure 110, or other components. After locating these components, drive control system 121 may reconfigure one or more of these components as desired.

In this illustrative example, drive control system 121 comprises various components used to control movement and may include controller 122, navigator 124, and transformer 126. Controller 122, navigator 124, and transformer 126 each may be implemented in software, hardware, firmware, or a combination thereof.

When software is used, the operations performed by any one of controller 122, navigator 124, or transformer 126 may be implemented using, for example, without limitation, program code configured to run on a processor unit. When firmware is used, the operations performed by any one of controller 122, navigator 124, or transformer 126 may be implemented using, for example, without limitation, program code and data and stored in persistent memory to run on a processor unit.

When hardware is employed, the hardware may include one or more circuits that operate to perform the operations performed by any one of controller 122, navigator 124, or transformer 126. Depending on the implementation, the hardware may take the form of a circuit system, an integrated circuit, an application specific integrated circuit (ASIC), a programmable logic device, or some other suitable type of hardware device configured to perform any number of operations.

With a programmable logic device, the device may be configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. Additionally, the processes may be implemented in organic components integrated with inorganic components and may be comprised entirely of organic components excluding a human being. For example, the processes may be implemented as circuits in organic semiconductors.

In some illustrative examples, the operations, processes or both performed by controller 122, navigator 124, or transformer 126 may be performed using organic components integrated with inorganic components. In some cases, the operations, processes, or both may be performed entirely by organic components, excluding a human being. As one illustrative example, circuits in organic semiconductors may be used to perform these operations, processes, or both.

In an illustrative example, controller 122 may be implemented in computer system 164. Navigator 124, transformer 126, or both also may be implemented in computer system 164. Computer system 164 may be one or more computers. When more than one computer is present in computer system 164, the computers may communicate with each other over a communications medium such as a network. In some cases, each of controller 122, navigator 124, and transformer 126 are implemented in separate computer systems.

As depicted, controller 122 may be a device configured to control operation of plurality of autonomous tool systems 118 using metrology data 154. Controller 122 may be in communication with metrology system 120, plurality of autonomous tool systems 118, and other components within flexible manufacturing system 102.

When one component is "in communication" with another component, the two components may be configured to send signals back and forth over a communications medium. For example, without limitation, controller 122 may communicate with metrology system 120 wirelessly over a network. In another illustrative example, controller 122 may communicate with other components via a wired connection.

In this depicted example, controller 122 may be configured to send commands 166 to various components within flexible manufacturing system 102. In this illustrative example, commands 166 may include navigation instructions, operation instructions, steering, position instructions, and other suitable types of instructions.

As depicted, controller 122 may send commands 166 to drivable support system 116 to change position 162 of structure 110 based on metrology data 154 generated by metrology system 120. For instance, commands 166 may be sent to drivable support system 116 when position 162 of structure 110 has deviated from desired position 133. In this case, one or more of drivable supports 135, connection devices 195, or both may actuate to move structure 110 to desired position 133 based on commands 166. After structure 110 is moved, metrology system 120 may again determine position 162 of structure 110 to provide feedback control 199.

Controller 122 also may be configured to send commands 166 to plurality of autonomous tool systems 118 in this illustrative example. For example, without limitation, controller 122 may be configured to assign tasks 111 to plurality of autonomous tool systems 118 in commands 166 sent to plurality of autonomous tool systems 118. Each of tasks 111 may include one or more operations 130.

Further, controller 122 may be configured to monitor status 170 of tasks 111 assigned to plurality of autonomous tool systems 118 and status 172 of plurality of autonomous tool systems 118. In this illustrative example, status 170 of tasks 111 may be a state of tasks 111. For example, without limitation, status 170 may represent the number of tasks 111 that have been completed by plurality of autonomous tool systems 118. Status 170 also may include an indication of a level of completion for tasks 111. In some cases, some of tasks 111 may be performed substantially concurrently or may overlap in time.

Status 170 may include a numerical value in some illustrative examples. For instance, status 170 may indicate that fifty percent of tasks 111 are complete. In another example, status 170 may indicate the number of holes left to be drilled. In still another illustrative example, status 170 may be at least one of "complete," "in-progress," or other suitable states of tasks 111.

In this depicted example, status 172 may be an indicator of the state of each of plurality of autonomous tool systems 118. For example, without limitation, status 172 may indicate whether each one of plurality of autonomous tool systems 118 is online, offline, in a standby mode, in-route, or in other states of operation.

In other illustrative examples, status 172 may indicate which one of operations 130 is being performed. As an example, status 172 may indicate that inspection of a hole is being performed. In another example, status 172 may indicate that a fastener is being installed. In still another illustrative example, status 172 may indicate that autonomous tool system 131 is currently changing tools.

In this illustrative example, controller 122 may be configured to reassign tasks 111 between plurality of autonomous tool systems 118 based on at least one of status 170 of tasks 111 or status 172 of plurality of autonomous tool systems 118. As an example, controller 122 may reassign tasks 111 when autonomous tool system 131 goes offline. In this manner, assembly of wing 108 is not interrupted by autonomous tool system 131 going offline.

In another illustrative example, controller 122 may reassign tasks 111 when some of tasks 111 are complete. As a result, controller 122 may efficiently allocate resources within flexible manufacturing system 102. In assigning and reassigning tasks 111 to plurality of autonomous tool systems 118, controller 122 may be configured to change position 174 of each of plurality of autonomous tool systems 118 based on metrology data 154 generated by metrology system 120. In particular, path 176 may be generated for each of plurality of autonomous tool systems 118 based on metrology data 154.

As depicted, navigator 124 is a component in drive control system 121 that may be configured to generate path 176 for each of plurality of autonomous tool systems 118 to perform operations 130. Navigator 124 may be referred to as a navigation system in some instances.

In this illustrative example, path 176 may be a route through manufacturing environment 100. For example, without limitation, path 176 may be a route for autonomous tool system 131 to get from second location 115 to third location 117 to perform operations 130.

Path 176 may be generated and modified for each of plurality of autonomous tool systems 118 in real-time. Path 176 may change as metrology system 120 continuously locates the components in manufacturing environment 100 to provide feedback control 199.

For instance, path 176 may be generated to avoid undesired encounters between autonomous tool system 131 and other objects in manufacturing environment 100, falls from structure 110, or other undesired events. In this illustrative example, navigator 124 may generate path 176 in the form of a set of instructions, waypoints, or other information usable by autonomous tool system 131.

As depicted, transformer 126 may be in communication with navigator 124, metrology system 120, and controller 122. In some cases, such as when transformer 126 is implemented in hardware, transformer 126 may be referred to as a transformation device.

Transformer 126 may be configured to transform metrology data 154 generated by metrology system 120 to airplane coordinates 178 in airplane coordinate system 183. In this manner, transformer 126 transforms coordinates 160 to airplane coordinates 178 usable to move plurality of autonomous tool systems 118 relative to structure 110.

Airplane coordinate system 183 may represent a reference coordinate system in which airplane parts are located in three-dimensional space. Airplane coordinate system 183 may be based on an origin or reference point in aircraft 109.

In this depicted example, transformation from coordinates 160 to airplane coordinates 178 is desirable as part of positioning the plurality of autonomous tool systems with respect to structure 110. Path 176 may be generated by navigator 124 based on airplane coordinates 178 received from transformer 126 such that autonomous tool system 131 moves to a desired location relative to structure 110.

In some cases, one or more components in drive control system 121 may be remote to one another. In still other illustrative examples, controller 122 may be remote to flexible manufacturing system 102.

As depicted, loading system 127 may be a structure configured to position at least one of first skin panel 180 or second skin panel 182 relative to structure 110. In this illustrative example, first skin panel 180 may take the form of upper skin panel 184 for wing 108. Second skin panel 182 may take the form of lower skin panel 186 for wing 108.

In this depicted example, loading system 127 may comprise first loading device 188 and second loading device 190. First loading device 188, second loading device 190, or both may be selected from one of a loading platform, an elevator, a track system, a robotic arm, a gantry, and other suitable types of devices. Metrology system 120 may locate first loading device 188 and second loading device 190 to provide feedback control 199 as these devices are moved from location to location.

As depicted, first loading device 188 may be configured to position upper skin panel 184 relative to structure 110. For instance, first loading device 188 may place upper skin panel 184 on first side 150 of structure 110. Operations 130 may then be performed on upper skin panel 184 by plurality of autonomous tool systems 118.

In a similar fashion, second loading device 190 may be configured to position lower skin panel 186 relative to structure 110. As an example, second loading device 190 may place lower skin panel 186 on second side 151 of structure 110. Operations 130 may be performed on lower skin panel 186 by plurality of autonomous tool systems 118.

In this illustrative example, steering direction 196 may be provided for various components in flexible manufacturing system 102. As an example, steering direction 196 may be provided for plurality of autonomous tool systems 118, drivable support system 116, each of drivable supports 135, and other devices moving from location to location in manufacturing environment 100. Steering direction 196 may take the form of commands, instructions, path generation, physically changing the direction of movement of the device, and other methods of guidance. In this illustrative example, steering direction 196 may dynamically change as conditions within manufacturing environment 100 change.

Steering direction 196 may be provided by at least one of controller 122, human operator 142, or some other suitable device. In other illustrative examples, each steerable device may steer itself, not under the direction of a controller.

As an example, controller 122 may send commands 166 to steer autonomous tool system 131. In yet another example, human operator 142 may steer drivable support 137 by physically changing its direction.

The reconfigurability of flexible manufacturing system 102 may allow operations 130 to be performed in an efficient manner, without undesired intervention by human operators. Controller 122 may control operation of all of the components in flexible manufacturing system 102 at the same time, taking into account the position and status of one another. Feedback control 199 provided by metrology system 120 allows for coordinated control of flexible manufacturing system 102. As a result, plurality of autonomous tool systems 118 may work simultaneously to assemble wing 108.

Moreover, each of the components within flexible manufacturing system 102 may be reconfigured depending on the size of manufacturing environment 100. Without the use of fixed monument fixtures, flexible manufacturing system 102 may provide a more efficient way of assembling wing 108 than some currently used systems.

In addition, because accuracy in performing operations 130 comes from a combination of functions provided by metrology system 120, navigator 124, and controller 122, instead of the structural rigidity of a fixed monument fixture, drivable supports 135 may comprise lighter materials or fewer materials than a fixed monument fixture. As a result, drivable supports 135 may be lighter and cost less.

As another desirable feature, the use of elongate platform 177 may require fewer sensors to accurately locate and adjust the position of structure 110. For example, without limitation, instead of positioning one of plurality of sensor systems 156 on each of control points 193, connection devices 195, or both, several sensors can be placed on the surface of elongate platform 177 to determine its flatness. One or more portions of elongate platform 177 is then adjusted to bring structure 110 into alignment. The use of fewer sensors may further reduce up-front set up costs.

The illustration of flexible manufacturing system 102 in FIG. 1 is not meant to imply physical or architectural limitations to the manner in which an illustrative embodiment may be implemented. Other components in addition to or in place of the ones illustrated may be used. Some components may be optional. Also, the blocks are presented to illustrate some functional components. One or more of these blocks may be combined, divided, or combined and divided into different blocks when implemented in an illustrative embodiment.

For example, without limitation, more than one of structure 110 may be present in manufacturing environment 100 at the same time. When more than one of structure 110 is present in manufacturing environment 100, components may be added to each structure 110 simultaneously to form multiple wings. The ability to reconfigure plurality of autonomous tool systems 118 may allow the same set of tools to be used on multiple wing assemblies at the same time, increasing the rate of production of wings for aircraft.

In another illustrative example, additional sensor systems may be implemented in the components in flexible manufacturing system 102. For instance, each of plurality of autonomous tool systems 118 may include a sensor system configured to generate position information, measure depth of holes, or perform other processes.

As yet another illustrative example, each of the components within flexible manufacturing system 102 may comprise a separate controller configured to control operations of that particular device. Each of these controllers may communicate with controller 122.

In still another illustrative example, plurality of autonomous tool systems 118 work in tandem with human operators within manufacturing environment 100. As an example, a number of human operators may be present in plurality of work cells 112 to oversee progress of flexible manufacturing system 102, perform additional operations 130, or for some other reason.

As another example, flexible manufacturing system 102 may include a movement system. This movement system may be configured to move drivable support system 116 between plurality of work cells 112. In this case, the movement system may include a track system, wheels, a tug, an automated guided vehicle (AGV), or some other suitable type of movement device. In another illustrative example, the movement system may be integrated in drivable support system 116 and retract when drivable support system 116 reaches its destination within a work cell.

In another illustrative example, additional sensor systems may be employed to generate various types of information with respect to the components in flexible manufacturing system 102, structure 110, or both. For example, without limitation, force sensors, also referred to as load sensors, may be used in load balancing. These load sensors may be implemented at various points along the length of elongate platform 177 to determine loads applied to elongate platform 177 by structure 110. From this sensor feedback, elongate platform 177 may be moved such that overloading does not occur.

Figure 2:
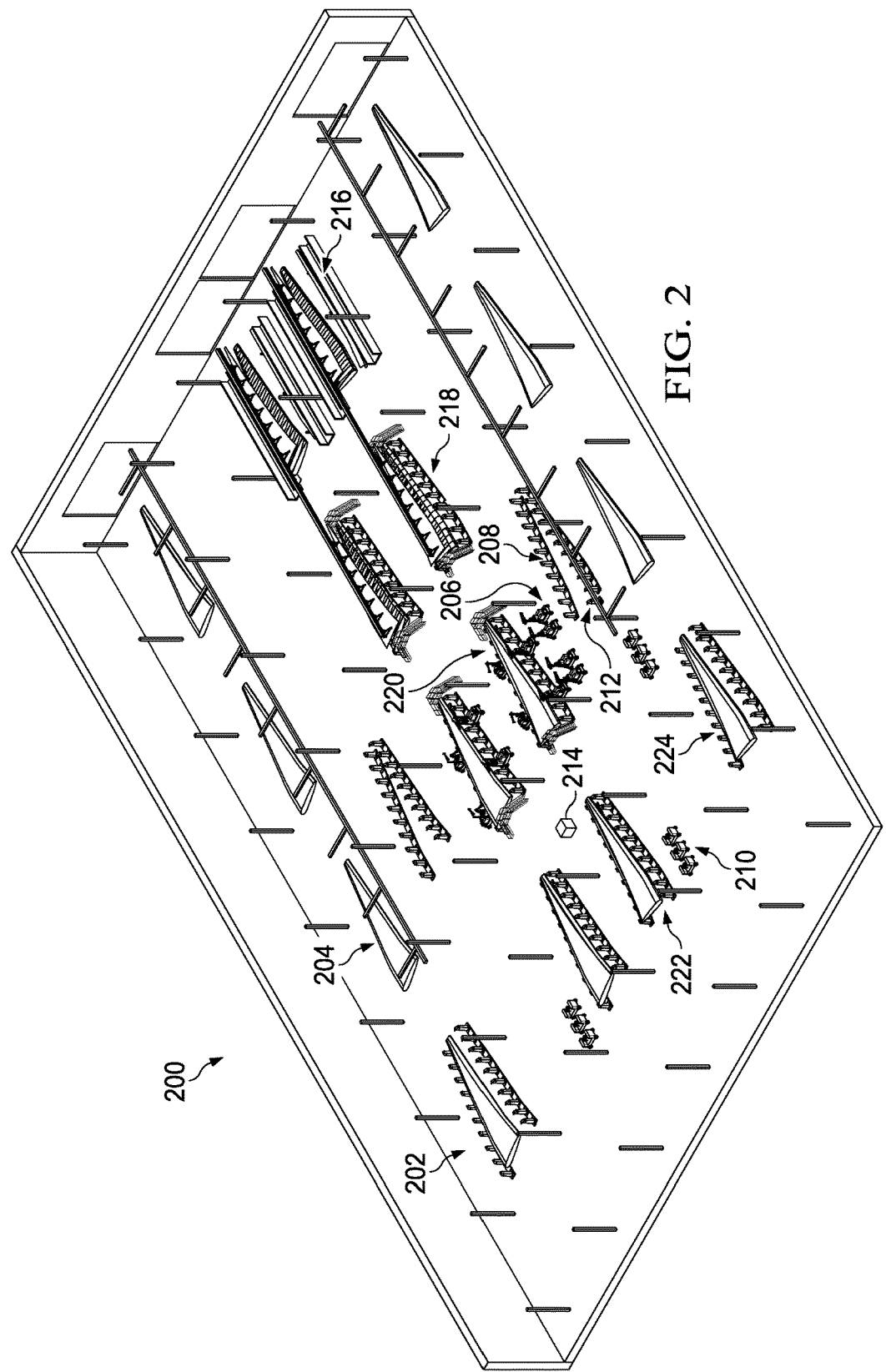
FIG. 2 is an illustration of an isometric view of a manufacturing environment in accordance with an illustrative embodiment.

With reference now to FIG. 2, an illustration of an isometric view of a manufacturing environment is depicted in accordance with an illustrative embodiment. In this depicted example, manufacturing environment 200 with work cells 202 may be an example of a physical implementation for manufacturing environment 100 with plurality of work cells 112 shown in block form in FIG. 1.

As illustrated, wing assemblies 204 may move through work cells 202. Each of wing assemblies 204 may be an example of a physical implementation for structure 110 in FIG. 1. In each of work cells 202, operations may be performed on wing assemblies 204 to form wings for an aircraft (not shown in this view).

As illustrated, manufacturing environment 200 may include flexible manufacturing system 206 to perform operations on wing assemblies 204. Flexible manufacturing system 206 may provide pulsed continuous movement of wing assemblies 204. Pulsed continuous movement may be movement from one of work cells 202 to another one of work cells 202, stopping within each work cell temporarily for operations to be performed.

Flexible manufacturing system 206 may include drivable support system 208, autonomous tool systems 210, metrology system 212, and system controller 214. Drivable support system 208, autonomous tool systems 210, metrology system 212, and system controller 214 may be examples of physical implementations for drivable support system 116, plurality of autonomous tool systems 118, metrology system 120, and controller 122 shown in block form in FIG. 1.

All of the components within flexible manufacturing system 206 may move throughout manufacturing environment 200 between work cells 202. In this manner, components may move from location to location in work cells 202 to perform operations on any one of wing assemblies 204.

Flexible manufacturing system 206 also may be reconfigurable based on the layout and size of manufacturing environment 200, the size and manufacturing needs of wing assemblies 204, and other suitable parameters.

In this illustrative example, a wing assembly (not shown in this view) may move between work cell 216, work cell 218, work cell 220, work cell 222, and work cell 224 as operations are being performed. The wing assembly may be carried between these work cells by various components in flexible manufacturing system 206. In addition, components within flexible manufacturing system 206 drive from work cell to work cell to move with the wing assembly in this illustrative example.

FIGS. 3-16 show the progression of an assembly process using flexible manufacturing system 206 in manufacturing environment 200 from FIG. 2. FIGS. 3-16 show a wing assembly moving through various work cells 202.

Figure 3:
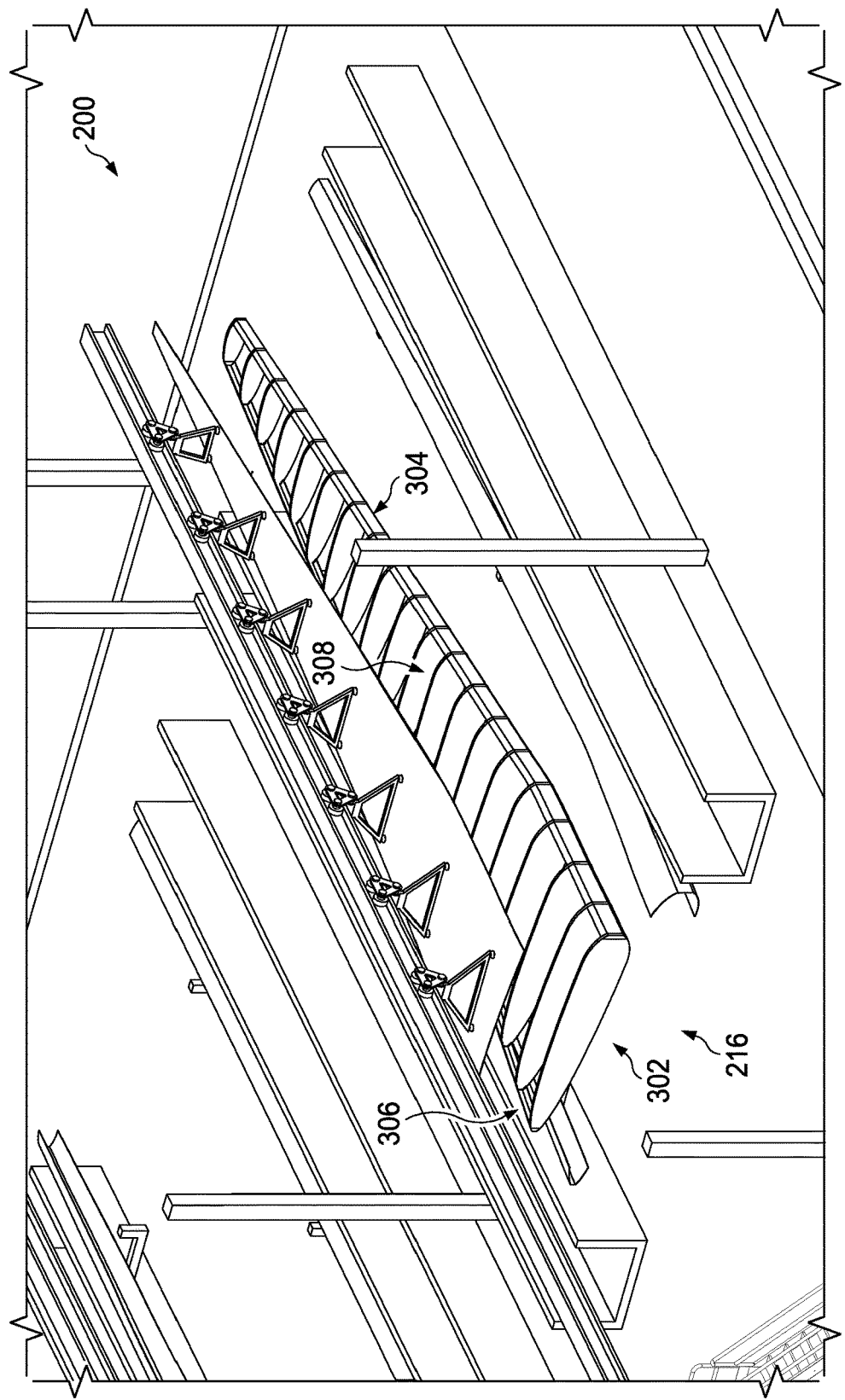
FIG. 3 is an illustration of a work cell with wing assembly components staged for installation in accordance with an illustrative embodiment.

Turning to FIG. 3, an illustration of a work cell with wing assembly components staged for installation is depicted in accordance with an illustrative embodiment. In this depicted example, work cell 216 is shown.

As depicted, components for wing assembly 302 may be present in work cell 216. In particular, structural members 304 for wing assembly 302 may be present in work cell 216. Wing assembly 302 may be an example of a physical implementation for structure 110 shown in FIG. 1.

In work cell 216, structural members 304 may be staged. Structural members 304 may be units that provide structural support and load handling capability for a wing (not shown).

Structural members 304 may include spars 306 and ribs 308 in this illustrative example. Additionally, a number of adapter fittings, hinges, and other components may be staged in work cell 216.

Figure 4:
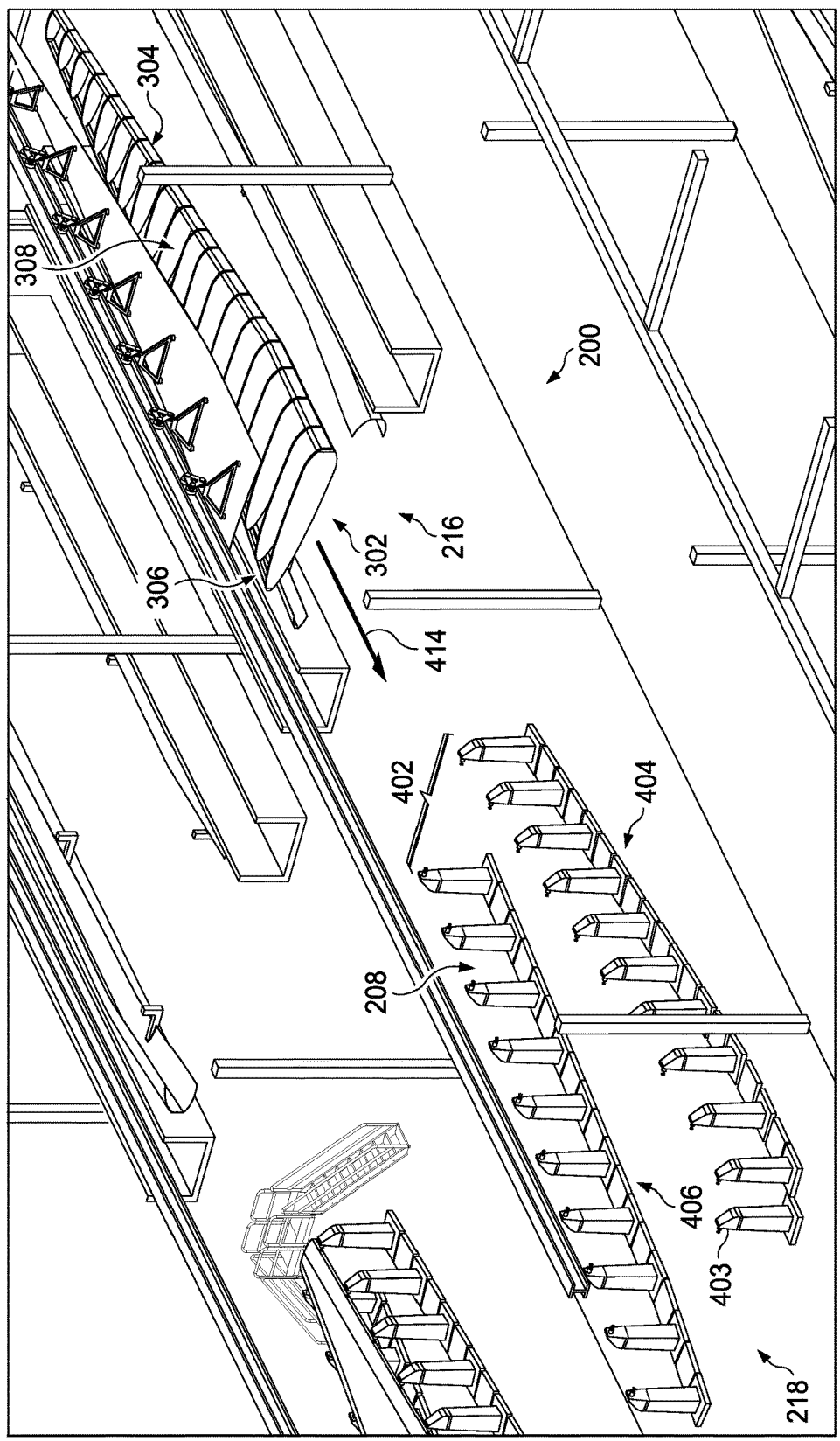
FIG. 4 is an illustration of a drivable support system positioned in a work cell in accordance with an illustrative embodiment.

In FIG. 4, an illustration of drivable support system 208 from FIG. 2 positioned in a work cell is depicted in accordance with an illustrative embodiment. In this depicted example, drivable support system 208 is positioned in work cell 218.

As depicted, drivable support system 208 may include supports 402. Supports 402 may be an example of a physical implementation for drivable supports 135 shown in block form in FIG. 1. Each of supports 402 drives from location to location within manufacturing environment 200. When supports 402 come together to form drivable support system 208, supports 402 move collectively from work cell to work cell as operations are performed on wing assembly 302.

In this illustrative example, each of supports 402 may be moved from another location in manufacturing environment 200 to reach work cell 218. As an example, each of supports 402 may be moved and arranged relative to one another to form drivable support system 208, a non-fixed fixture. A platform (not shown in this view) may connect supports 402 to one another in some illustrative examples.

In an illustrative example, each of supports 402 may be interchangeable. In other words, supports 402 may be capable of being used in place of one another. In this manner, reconfiguring supports 402 may be done more quickly than if supports 402 had to be arranged in a particular order.

Supports 402 bring parts (not shown) of wing assembly 302 together from various locations in manufacturing environment 200. As an example, one of supports 402 may bring a portion of wing assembly 302 from work cell 216, while another one of supports 402 may bring a different portion of wing assembly 302 from work cell 216. In another illustrative example, supports 402 may be arranged first and then wing assembly 302 may be connected to supports 402 thereafter. Each of supports 402 may have connection devices (not shown) that are connected to a different portion of wing assembly 302 at different control points (not shown).

In some illustrative examples, some of supports 402 may be brought together to form drivable support system 208 and carry wing assembly 302 from one location to a second location in manufacturing environment 200. At the same time, other supports 402 may be brought together into another type of non-fixed fixture, or second drivable support system, to carry another portion of wing assembly 302 from yet another location in manufacturing environment 200 to the second location or some other location.

In this case, drivable support system 208 and the second drivable support system may combine into a new collective to form a new non-fixed fixture. Subsequently, additional supports 402 may be added or removed as desired, bringing parts to wing assembly 302 at various locations. In this manner, the illustrative embodiments allow several collectives of supports 402 to come together at different points and times during the assembly process to form new non-fixed fixtures bringing the assemblies they carry into inclusion in a larger overarching assembly.

Support 403 may be an example of one of supports 402. Support 403 may be a module that is interchangeable with other supports 402 in this illustrative example.

In this depicted example, supports 402 may be arranged adjacent to one another within work cell 218. First portion 404 of supports 402 may be positioned opposite second portion 406 of supports 402 to hold wing assembly 302 in a horizontal configuration.

As illustrated, wing assembly 302 may be received by drivable support system 208. Wing assembly 302 may be moved in the direction of arrow 414 to be received by drivable support system 208. In other illustrative examples, a group of supports 402 may pick up a portion of wing assembly 302 and bring it to work cell 218, much like a human operator would bring different parts to the assembly to facilitate attachment of those parts.

Figure 5:
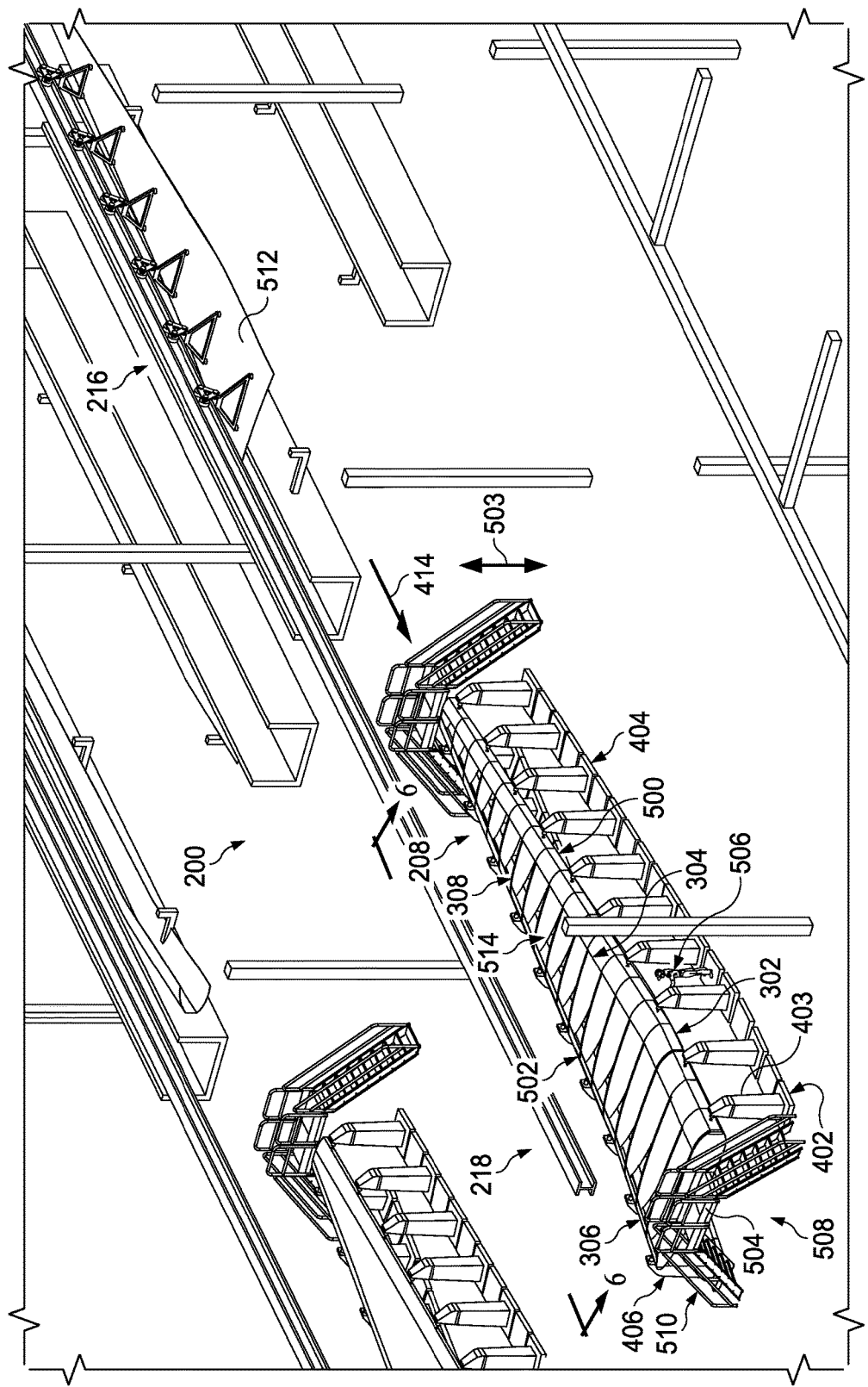
FIG. 5 is an illustration of a drivable support system with a wing assembly in accordance with an illustrative embodiment.

Referring next to FIG. 5, an illustration of drivable support system 208 with wing assembly 302 from FIG. 4 is depicted in accordance with an illustrative embodiment. Wing assembly 302 has been driven in the direction of arrow 414.

In this depicted example, first portion 404 of supports 402 may hold side 500 of wing assembly 302. In a similar fashion, second portion 406 may hold side 502 of wing assembly 302. Supports 402 may be adjusted vertically in the direction of arrow 503 to accommodate a desired height for wing assembly 302. The desired height may change between work cells 202, depending on the type of operations being performed.

As depicted, each of supports 402 may be secured to wing assembly 302 at different points along side 500 and side 502 of wing assembly 302. Supports 402 may be connected to wing assembly 302 using any mechanical method configured to hold wing assembly 302 in a desired manner. For example, without limitation, supports 402 may clamp wing assembly 302 in position using connection devices (not shown).

In this illustrative example, bridge system 504 has been connected to drivable support system 208. Human operators 506 may use bridge system 504 to access and view wing assembly 302. Bridge system 504 and human operators 506 may be examples of physical implementations for bridge system 136 and human operator 142 shown in block form in FIG. 1.

As depicted, rail system 508 may be associated with bridge system 504. Rail system 508 may be an example of a physical implementation for rail system 138 shown in block form in FIG. 1.

Rail system 508 may include rails 510 on bridge system 504. Rails 510 may reduce the risk of human operators 506 falling off bridge system 504. In this manner, rail system 508 may provide fall protection for human operators 506.

Various operations may be performed while wing assembly 302 is in work cell 218. For example, without limitation, ribs 308 may be drilled and fastened.

Additionally, wing assembly 302 may be scanned by metrology system 212 to analyze the position of structural members 304 in wing assembly 302. Metrology system 212 relies on various sensors (not shown in this view) to determine the position of structural members 304. System controller 214 may be in communication with metrology system 212 and compare the position of structural members 304 to a desired position. Adjustments may be made in response to this comparison. Metrology system 212 may provide feedback control as the adjustments are made until a desired position is reached.

In yet another illustrative example, wing assembly 302 may be leveled and a front spar hinge line may be set. Panel 512 may then be positioned relative to side 514 of wing assembly 302. Panel 512 may be an example of a physical implementation for upper skin panel 184 shown in FIG. 1. Panel 512 is moved in the direction of arrow 414 to be placed on top of wing assembly 302 in this illustrative example.

Figure 6:
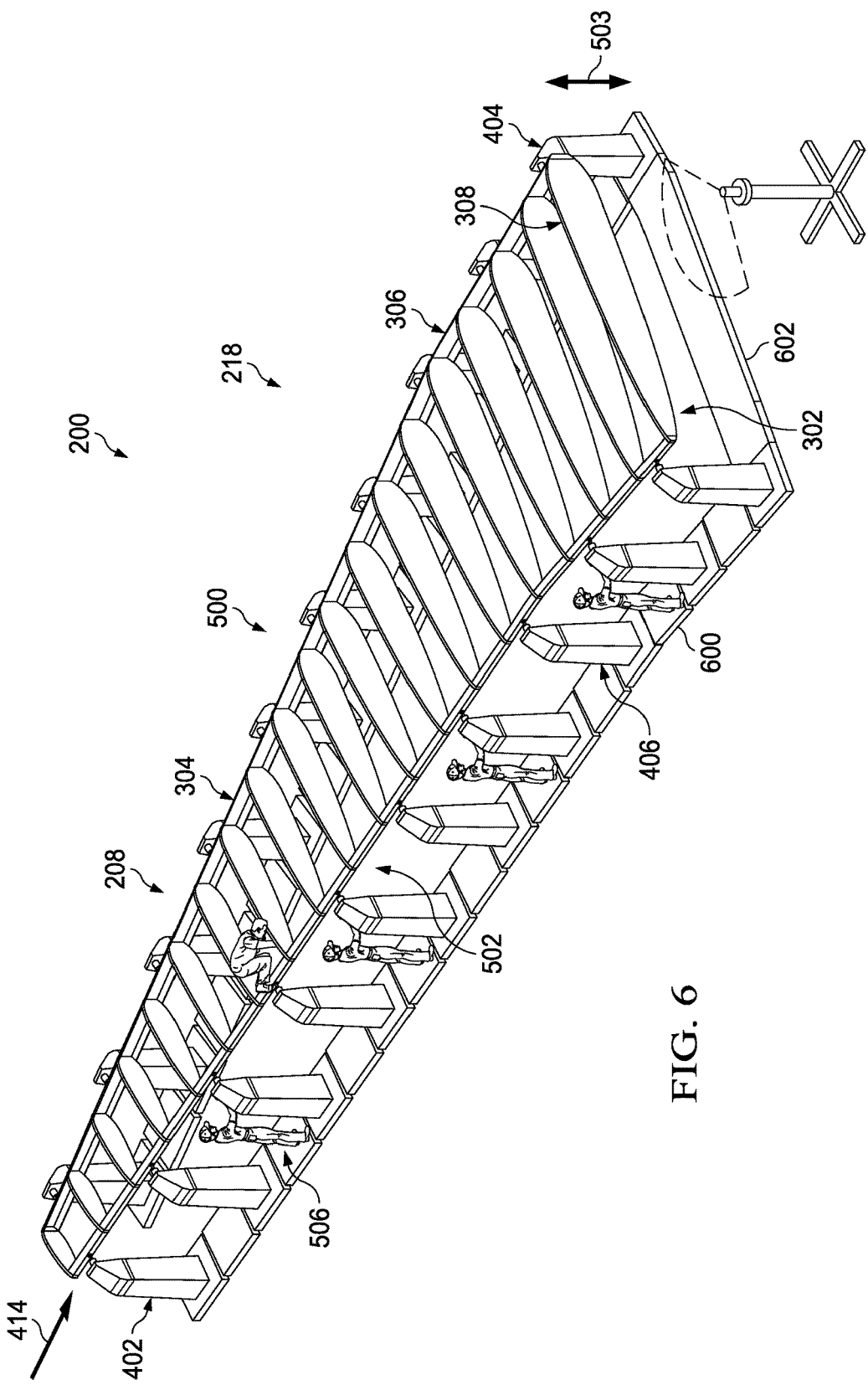
FIG. 6 is an illustration of a wing assembly and a drivable support system in accordance with an illustrative embodiment.

In FIG. 6, an illustration of wing assembly 302 and drivable support system 208 shown in the direction of lines 6-6 in FIG. 5 is depicted in accordance with an illustrative embodiment. Bridge system 508 has been removed such that components within drivable support system 208 may be seen in greater detail.

In this illustrative example, various support structures may be placed between each of supports 402 to create platform 600. Platform 600 may be a continuous platform in this illustrative example. Tow gate 602 also may be added to connect first portion 404 of supports 402 with second portion 406 of supports 402. Tow gate 602 may be configured to connect to a tug or other movement system to move drivable support system 208 between work cells 202 shown in FIG. 2.

In this depicted example, human operators 506 may move about work cell 218. Human operators 506 may monitor the assembly process for wing assembly 302, perform operations, or both. In this illustrative example, human operators 506 may have access to all portions of wing assembly 302.

Figure 7:
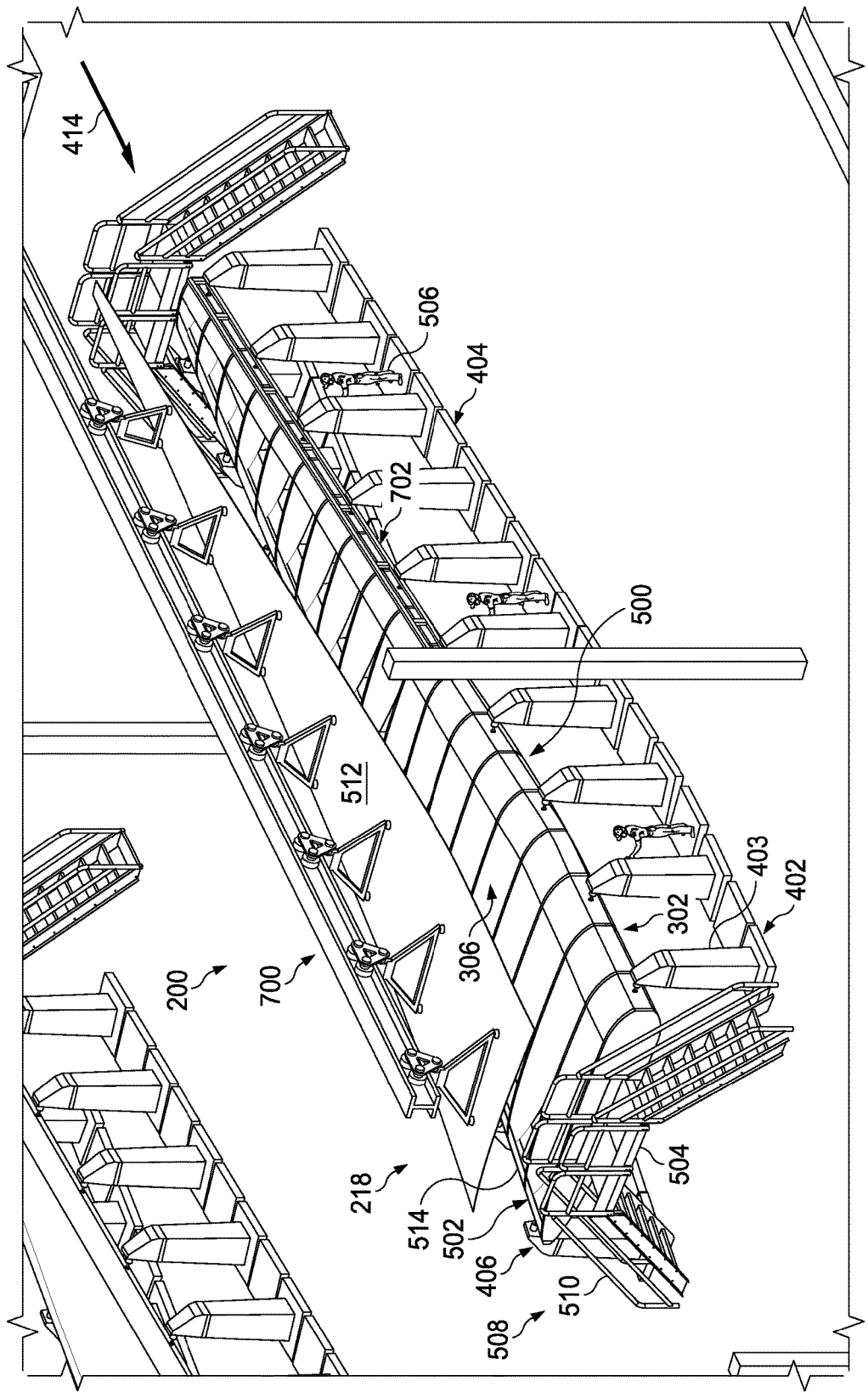
FIG. 7 is an illustration of a loading device loading a panel on a wing assembly in accordance with an illustrative embodiment.

With reference next to FIG. 7, an illustration of a loading device loading a panel on wing assembly 302 from FIG. 6 is depicted in accordance with an illustrative embodiment. In this depicted example, loading device 700 has moved panel 512 in the direction of arrow 414 in FIG. 6. Loading device 700 may be an example of a physical implementation for first loading device 188 shown in block form in FIG. 1.

Loading device 700 may place panel 512 on side 514 of wing assembly 302 in this illustrative example. Operations may then be performed on panel 512.

In this depicted example, rails 702 may be positioned on panel 512 of wing assembly 302. Rails 702 may be part of rail system 508 and may be configured to reduce the risk of human operators 506 falling from wing assembly 302. Rails 702 also may separate human operators 506 from undesired encounters with autonomous tool systems 210 shown in FIG. 2.

Figure 8:
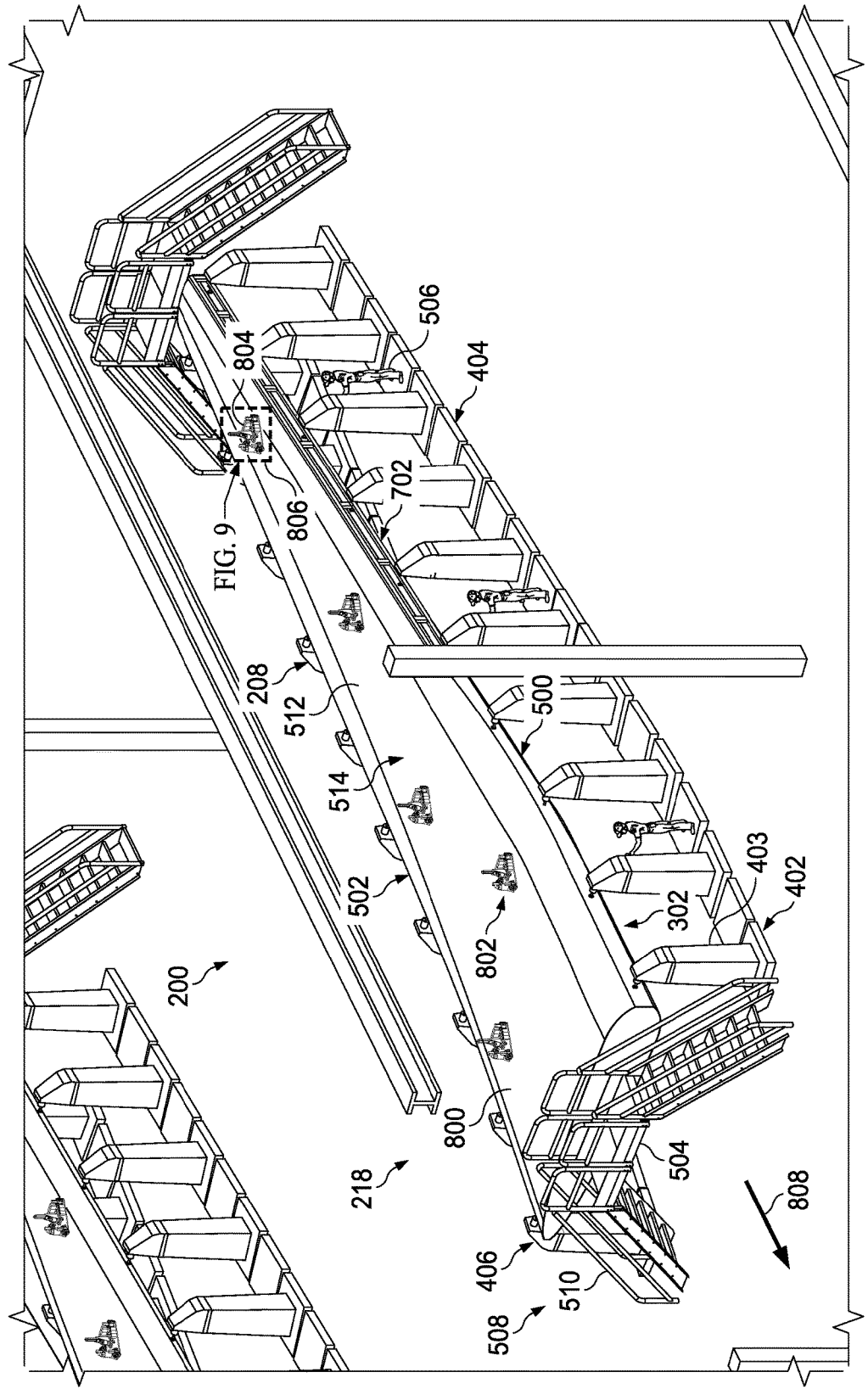
FIG. 8 is an illustration of autonomous tool systems performing operations on a panel in accordance with an illustrative embodiment.

In FIG. 8, an illustration of a portion of autonomous tool systems 210 from FIG. 2 performing operations on panel 512 from FIG. 7 is depicted in accordance with an illustrative embodiment. In this depicted example, a portion of autonomous tool systems 210 may be deployed onto surface 800 of panel 512.

As illustrated, drilling devices 802 may be deployed on surface 800 of panel 512. Drilling devices 802 may be examples of physical implementations for plurality of autonomous tool systems 118 shown in block form in FIG. 1. Drilling devices 802 may take the form of tack drillers in this illustrative example.

In this illustrative example, drilling devices 802 may be autonomous devices configured to drill holes in panel 512 and install tack fasteners (not shown in this view). These tack fasteners provide clamp up at select locations to help mitigate shimming, misalignment, or other issues for structural members 304 shown in FIGS. 3-6. Tack driller 804 shown in section 806 of wing assembly 302 may be one of drilling devices 802.

In this depicted example, drilling devices 802 may move about surface 800 of panel 512 at the same time, performing drilling and fastening operations simultaneously at different locations on panel 512. Drilling devices 802 communicate with system controller 214 shown in FIG. 2. Specifically, drilling devices 802 may receive instructions from system controller 214. These instructions may include a path of movement and the different operations to be performed.

Position feedback may be generated about each of drilling devices 802. This feedback may be generated by metrology system 212, active components on drilling devices 802, or a combination thereof. For instance, as drilling devices 802 move about panel 512, drilling devices 802 may continuously provide feedback to system controller 214. This feedback may include position information, status, results of an inspection performed on panel 512, and other suitable information.

System controller 214 then uses this feedback to reposition drilling devices 802, to ensure holes are drilled in the correct location, to avoid collisions between drilling devices 802, and to more efficiently assign tasks between drilling devices 802. As a result, each of drilling devices 802 may move along surface 800 of panel 512 without undesired encounters with one another or human operators 506, falling off wing assembly 302, drilling holes in undesired locations, or a combination thereof.

In some illustrative examples, after drilling devices 802 have completed their drilling and fastening operations, human operators 506 may perform additional operations on panel 512. For example, without limitation, human operators 506 may locate, drill, and install components on the underside (not shown) of panel 512. These components may include shear ties, stringer end fittings, disbond arrest fasteners, and other suitable components. In other illustrative examples, other autonomous tool systems 210 may install these components.

In some illustrative examples, additional components may be included in work cell 218. For instance, a counterbalance system (not shown in this view) may be connected to each of drilling devices 802. In this illustrative example, the counterbalance system may be configured to offset the weight of one of drilling devices 802. For instance, the counterbalance system may be removably attached to tack driller 804 and may include pulleys, weights, connectors, cables, and other components.

Subsequent to the tack drilling process, drilling devices 802 may be removed from surface 800 of panel 512. Panel 512 may then be unloaded by loading device 700 for deburring, cleaning, and sealing (removal not shown in this view).

Figure 10:
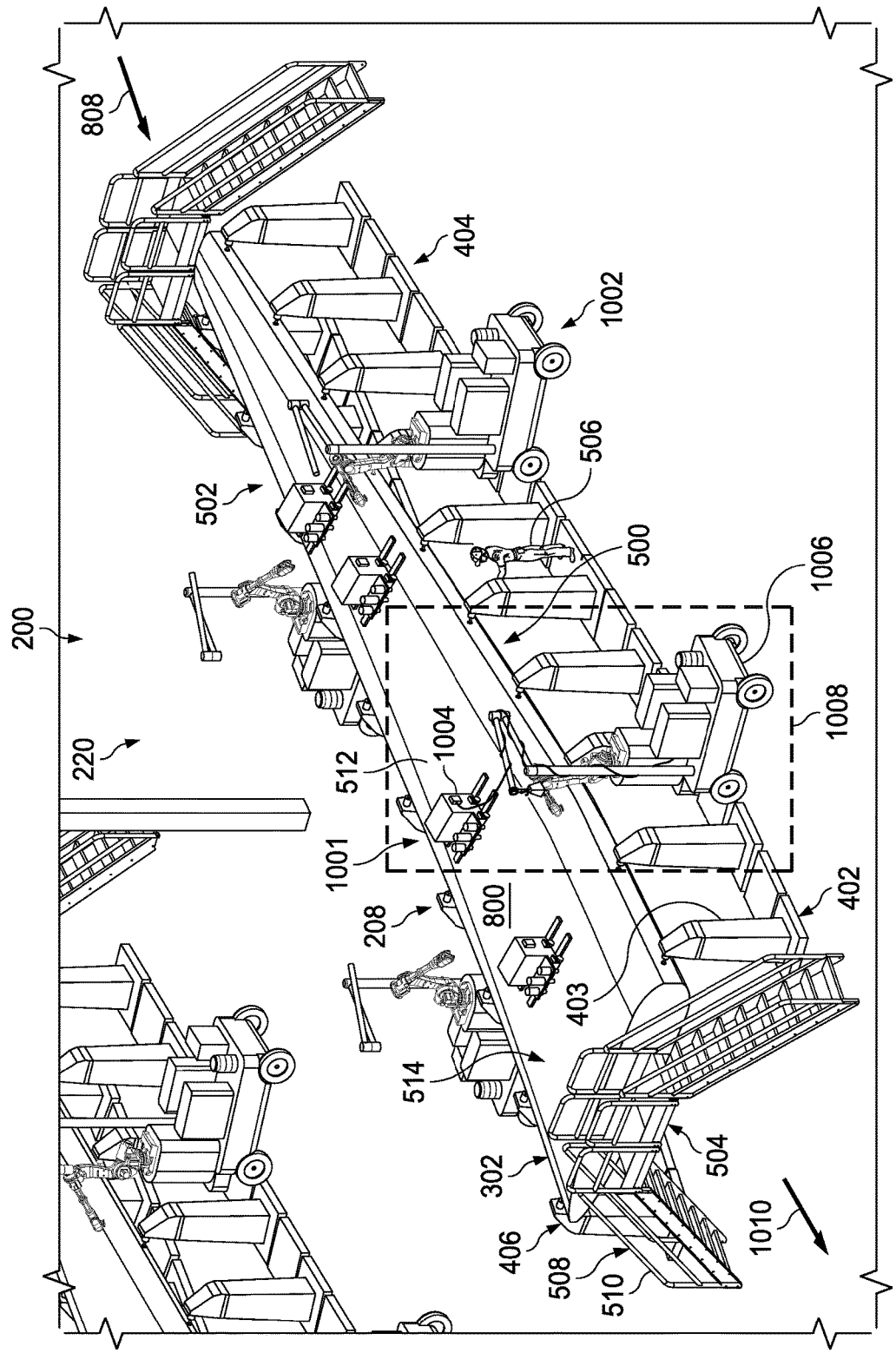
FIG. 10 is an illustration of autonomous tool systems performing operations on a panel in accordance with an illustrative embodiment.

In this illustrative example, drivable support system 208 with wing assembly 302 may be moved to work cell 220 as shown in FIG. 10. Drivable support system 208 with wing assembly 302 may be moved in the direction of arrow 808 to work cell 220.

Figure 9:
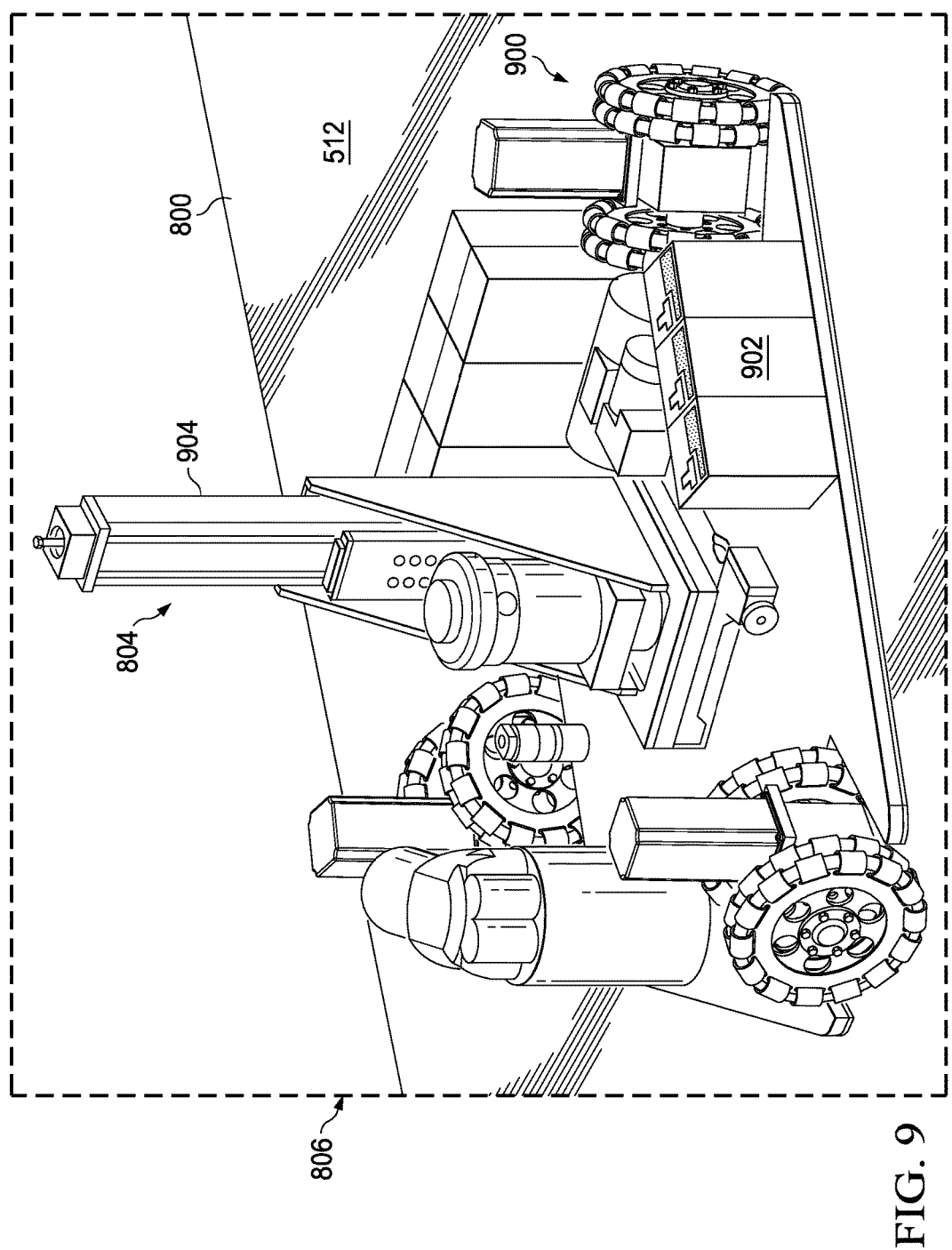
FIG. 9 is an illustration of a section of a wing assembly with a tack driller in accordance with an illustrative embodiment.

Referring now to FIG. 9, an illustration of section 806 of wing assembly 302 from FIG. 8 with tack driller 804 is depicted in accordance with an illustrative embodiment. In this depicted example, tack driller 804 may move along surface 800 of panel 512 using movement system 900.

Tack driller 804 may have on-board controller 902. On-board controller 902 communicates with system controller 214 shown in FIG. 2 and receives instructions to navigate surface 800 of panel 512. On-board controller 902 for tack driller 804 may establish a local coordinate system by synchronizing on magnets that are pre-installed in wing assembly 302.

Tool 904 on tack driller 804 may be used to drill holes and insert the tack fasteners. Human operators 506 may manually install a nut on each tack fastener and tighten within selected tolerances.

To protect the safety of human operators 506, system controller 214 may control movement of drilling devices 802, including tack driller 804, to avoid human operators 506. In some examples, drilling devices 802 are taken offline completely. In other illustrative examples, rail system 508 is modified to separate drilling devices 802 from human operators 506. In still other illustrative examples, other safety measures may be provided. For instance, a group of proximity sensors may be used to sense human operators 506 and adjust the behavior of drilling devices 802 accordingly.

In FIG. 10, an illustration of autonomous tool systems 210 performing operations on panel 512 from FIG. 8 is depicted in accordance with an illustrative embodiment. Drivable support system 208 with wing assembly 302 has been moved in the direction of arrow 808 to work cell 220. Work cell 220 may be an example of a physical implementation for one of plurality of work cells 112 shown in FIG. 1.

As depicted, crawler robots 1001 may be placed on surface 800 of panel 512 by crawler support 1002. Crawler support 1002 may include drivable platforms in this illustrative examples. In other cases, when used with autonomous tool systems other than crawler robots 1001, crawler support 1002 may be referred to as autonomous tool system support. These drivable platforms may be configured to drive across the floor of manufacturing environment 200 and place the group of crawler robots 1001 on surface 800 of the structure, in this case, panel 512.

Crawler robots 1001 with crawler support 1002 may be examples of physical implementations for plurality of autonomous tool systems 118 in FIG. 1. Each of crawler robots 1001 may include a flextrack system in this illustrative example.

One of crawler robots 1001 may correspond to one of crawler support 1002 in this illustrative example. In addition to placing crawler robots 1001 on surface 800 of panel 512, crawler support 1002 may provide power, move utility cables, or assist crawler robots 1001 with other processes. Crawler robot 1004 and drivable platform 1006 are shown in section 1008 of wing assembly 302.

In this depicted example, crawler robots 1001 may be autonomous devices configured to drill countersunk holes in panel 512, inspect the holes and the countersink depth of those holes, install fasteners (not shown in this view), and inspect the installed fasteners. These fasteners may be interference fit fasteners in this illustrative example.

In an illustrative example, an "interference fit" fastener may have a shank with a diameter that is greater than the diameter of the cylindrical portion of the hole in which it is installed. Friction between the post and the cylindrical portion of the hole holds the fastener in place. The interference fit of the fastener may increase the fatigue life of the parts that the fastener is connecting, namely, panel 512 and its substructure. The interference fit fastener also may substantially prevent fastener movement relative to the hole.

In this depicted example, crawler robots 1001 may move about surface 800 of panel 512 at the same time, performing drilling and fastening operations simultaneously at different locations on panel 512. Crawler robots 1001 may communicate with system controller 214 shown in FIG. 2.

In particular, crawler robots 1001 may receive instructions from system controller 214. These instructions may include a path of movement and the different operations to be performed. Throughout movement, crawler robots 1001 may continuously provide feedback to system controller 214. This feedback may include position information, status, results of inspection performed on panel 512, and other suitable information.

System controller 214 then uses this feedback to reposition crawler robots 1001, to ensure holes are drilled in the correct location, to avoid collisions between crawler robots 1001, and to more efficiently assign tasks between crawler robots 1001. As a result, each of crawler robots 1001 may move along surface 800 of panel 512 without undesired encounters with one another or human operators 506, falling off wing assembly 302, or both. Additionally, the feedback increases accuracy of operations performed by crawler robots 1001. Feedback also may be provided by metrology system 212 as metrology system 212 scans manufacturing environment 200, as described above.

Crawler robots 1001 may be configured to provide "one-up assembly" of fasteners in panel 512. In this illustrative example, "one-up" assembly may refer to the process of drilling and fastening joints without having to disassemble parts for cleaning or deburring. One-up assembly may increase the speed at which wings are manufactured. In this illustrative example, crawler robots 1001 include crawler robot 1004.

Figure 12:
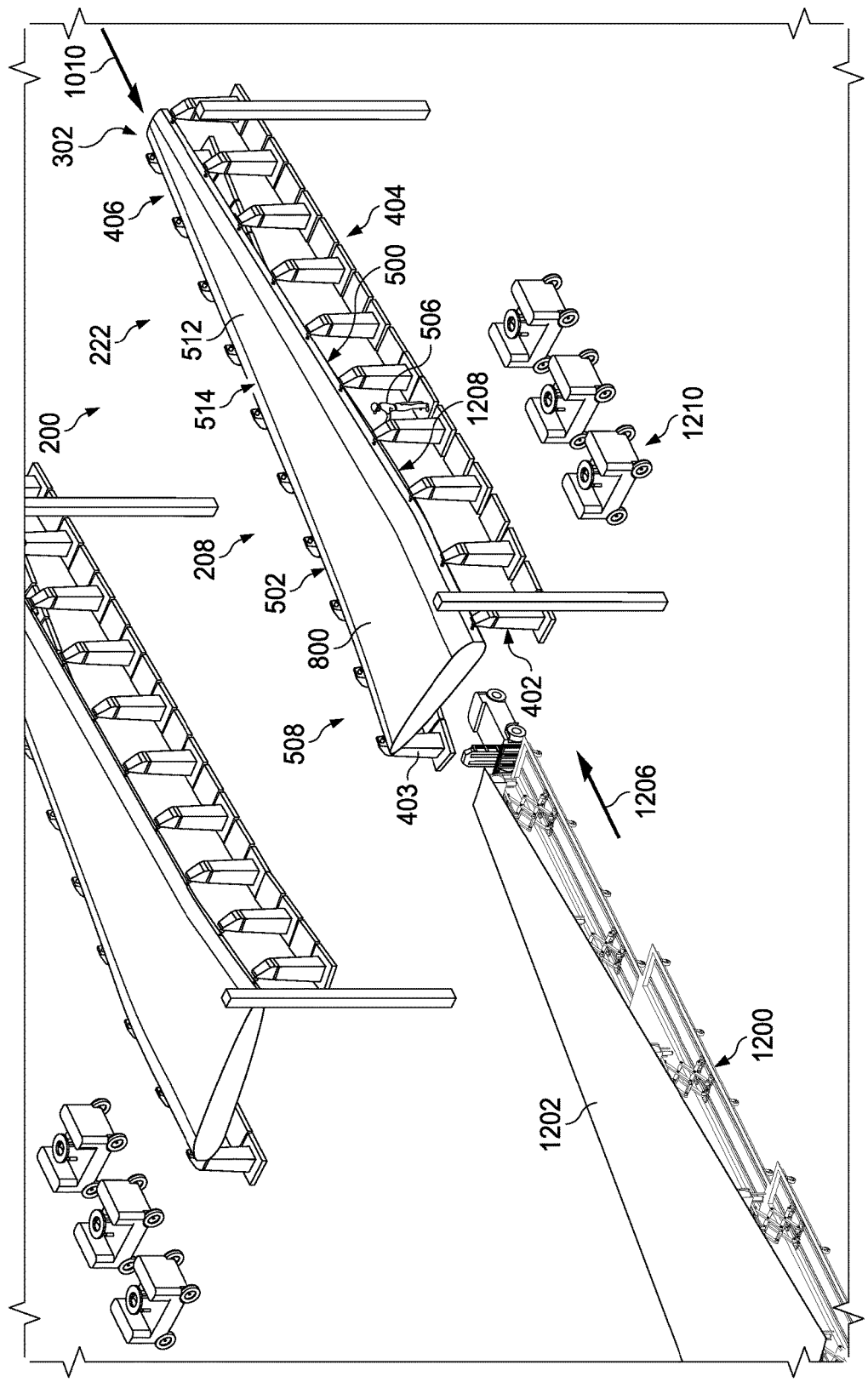
FIG. 12 is an illustration of a loading device with a panel in accordance with an illustrative embodiment.

After one-up assembly is performed using crawler robot 1004, crawler robot 1004 may be removed using drivable platform 1006. Wing assembly 302 with drivable support system 208 may be moved in the direction of arrow 1010 to work cell 222 as shown in FIG. 12.

Figure 11:
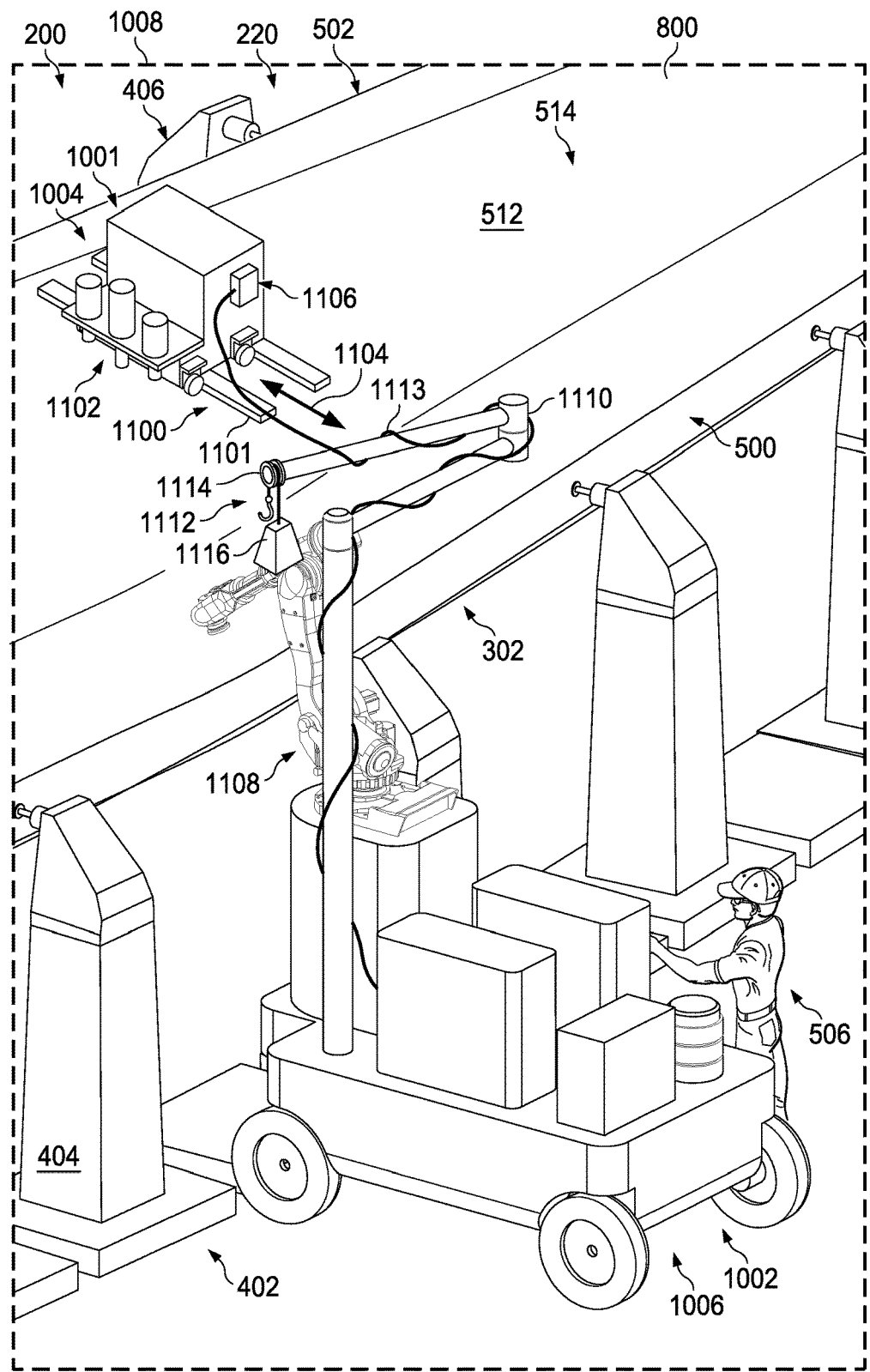
FIG. 11 is an illustration of a section of a wing assembly with a crawler robot and a drivable platform in accordance with an illustrative embodiment.

FIG. 11 shows an illustration of section 1008 of wing assembly 302 with crawler robot 1004 and drivable platform 1006 from FIG. 10 in accordance with an illustrative embodiment. In this illustrative example, crawler robot 1004 may be equipped with movement system 1100, movement system 1101, and tools 1102.

As depicted, movement system 1100 may comprise wheels that move crawler robot 1004 along surface 800 of panel 512. These wheels may be retractable in some illustrative examples.

Movement system 1101 may include a track system in this illustrative example. Movement system 1101 may be configured to move crawler robot 1004 back and forth in the direction of arrow 1104.

As illustrated, tools 1102 may include at least one of an inspection system, a fastener system, a drilling system, a positioning system, or other suitable tools. Crawler robot 1004 also may include on-board controller 1106 in communication with system controller 214 in FIG. 2.

Drivable platform 1006 may have pick and place arm 1108 and utility arm 1110 in this illustrative example. Pick and place arm 1108 may place crawler robot 1004 onto surface 800 of wing assembly 302. Utility arm 1110 may move utility cables (not shown in this view) that may be attached to crawler robot 1004. These utility cables may supply tools 1102 with at least one of electricity, air supply, communications, or other desirable utilities.

In this illustrative example, counterbalance system 1112 may be associated with utility arm 1110 and connected to crawler robot 1004. Counterbalance system 1112 may be configured to offset the weight of crawler robot 1004 on panel 512. Counterbalance system 1112 may be removably attached to crawler robot 1004 in this illustrative example.

In an illustrative example, counterbalance system 1112 may comprise cable 1113, pulley 1114 attached to utility arm 1110 and weight 1116. Weight 1116 may be less than or equal to the weight of crawler robot 1004. Counterbalance system 1112 with weight 1116 reduces the risk of inconsistencies forming in panel 512 that could be caused by the weight of crawler robot 1004. In other illustrative examples, other counterbalance systems may be possible.

Turning next to FIG. 12, an illustration of a loading device with a panel is depicted in accordance with an illustrative embodiment. In this depicted example, loading device 1200 is shown carrying panel 1202 for wing assembly 302.

Wing assembly 302 and drivable support system 208 have been moved in the direction of arrow 1010 to work cell 222. Loading device 1200, panel 1202, and work cell 222 may be examples of physical implementations for second loading device 190, lower skin panel 186, and one of plurality of work cells 112, respectively, shown in block form in FIG. 1.

As depicted, loading device 1200 may move panel 1202 in the direction of arrow 1206 to position panel 1202 under wing assembly 302. Loading device 1200 may then lift panel 1202 into a desired position relative to side 1208 of wing assembly 302.

Operations may be performed on panel 1202 by assembly systems 1210. Assembly systems 1210 may include a lower panel tool system in this illustrative example. This lower panel tool system may take the form of a lower panel driller.

Figure 13:
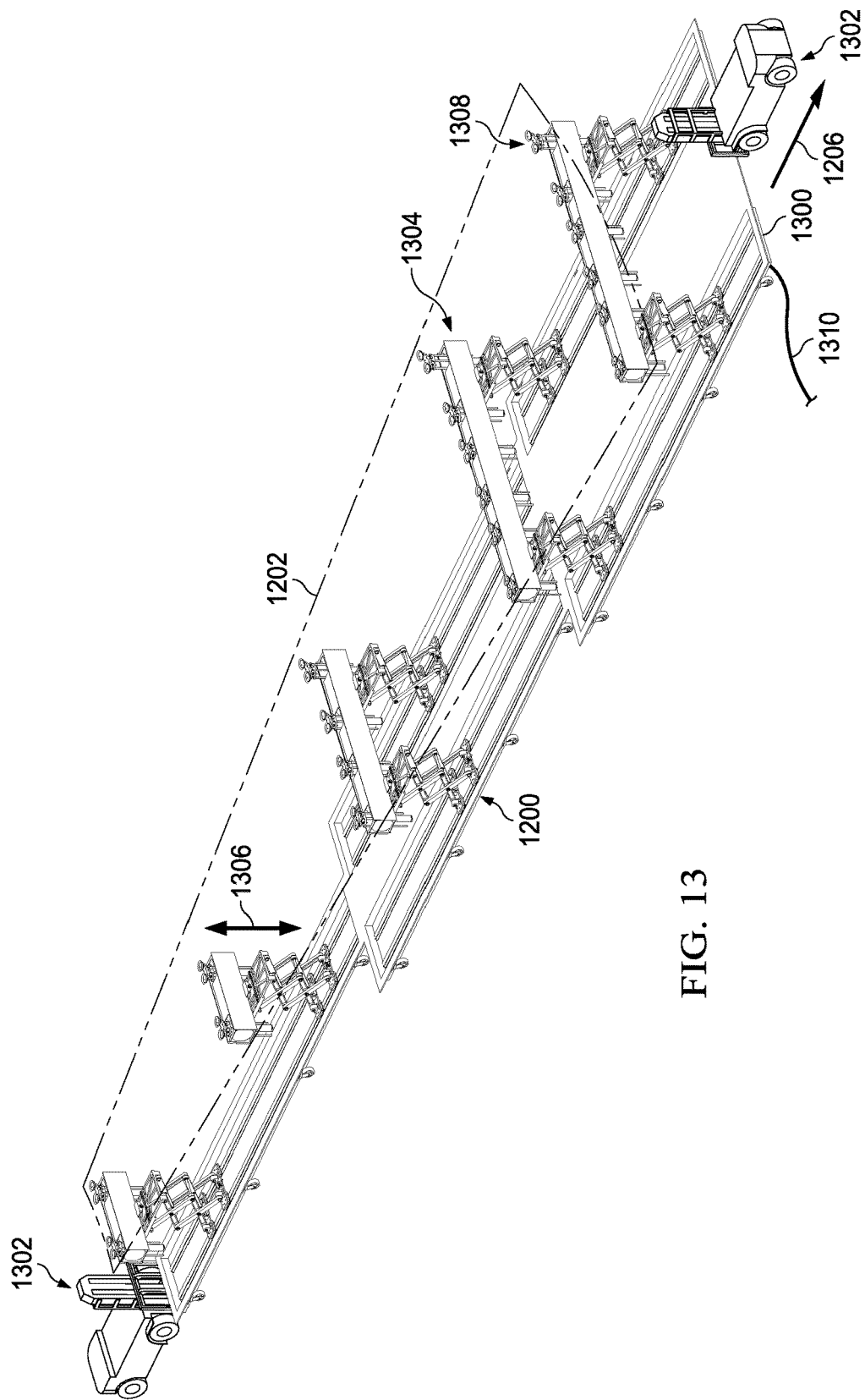
FIG. 13 is an illustration of a loading device with a panel in accordance with an illustrative embodiment.

In FIG. 13, an illustration of loading device 1200 with panel 1202 from FIG. 12 is depicted in accordance with an illustrative embodiment. In this illustrative example, loading device 1200 may comprise platform 1300, movement system 1302, and movement system 1304.

As depicted, platform 1300 may be a structure configured to provide support for movement system 1304 and panel 1202. Movement system 1302 may be a number of components configured to move loading device 1200 with panel 1202 about manufacturing environment 200. In this depicted example, movement system 1302 may include at least one of a track system, mecanum wheels, omni wheels and other types of omni-directional wheels, retractable wheels, a gantry system, a tug, or some other suitable movement device.

In this illustrative example, movement system 1304 may be a group of devices configured to move panel 1202 up and down in the direction of arrow 1306. As used herein, a "group of" items may be one or more items. In this illustrative example, a group of devices may include one or more devices.

In this manner, movement system 1304 may position panel 1202 relative to side 1208 of wing assembly 302 in FIG. 12. Position feedback may be generated for the components within loading device 1200, panel 1202, or both, as described above.

Movement system 1304 may be a lift in this illustrative example. This lift may be a hydraulic lift, a pneumatic lift, or some other suitable type of lift. In particular, movement system 1304 may employ a scissor jack, a bottle jack, and other suitable types of lifts. In some cases, movement system 1304 also may be configured to tilt panel 1202 as needed. Movement system 1304 may provide crude positioning of panel 1202 relative to wing assembly 302 (not shown in this view).

In this depicted example, movement system 1304 may include repositionable headers 1308. Repositionable headers 1308 may contact panel 1202. In this illustrative example, repositionable headers 1308 may be structures configured to position panel 1202 in a desired manner. Repositionable headers 1308 may provide more precise positioning for panel 1202 relative to wing assembly 302.

As illustrated, utility cable 1310 may be used to connect loading device 1200 with various utilities. For example, without limitation, utility cable 1310 may be used to provide electricity to loading device 1200. Utility cable 1310 also may provide a communications link between system controller 214 and loading device 1200 for command and control of loading device 1200.

Figure 14:
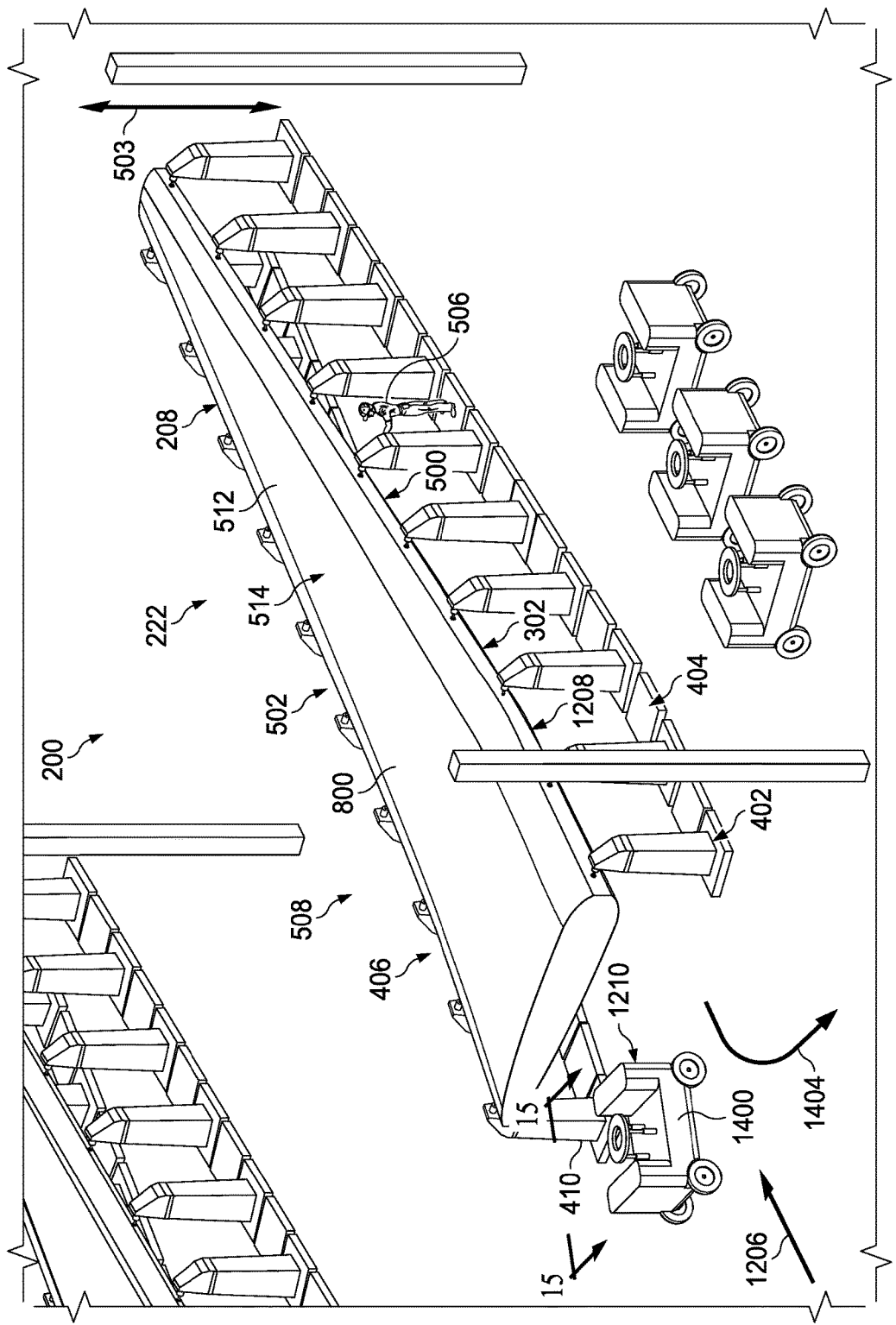
FIG. 14 is an illustration of assembly systems performing operations on a panel in accordance with an illustrative embodiment.

With reference next to FIG. 14, an illustration of assembly systems 1210 performing operations on panel 1202 from FIG. 12 is depicted in accordance with an illustrative embodiment. In this depicted example, loading device 1200 has moved panel 1202 in the direction of arrow 1206.

In this depicted example, operations may have been performed on panel 1202 to secure panel 1202 to side 1208 of wing assembly 302. For instance, tack drilling and fastening may have been performed to hold panel 1202 in place relative to side 1208 of wing assembly 302.

In this depicted example, assembly systems 1210 may be deployed under panel 1202. Assembly systems 1210 may be an example of a physical implementation for plurality of autonomous tool systems 118 shown in block form in FIG. 1. Assembly systems 1210 may include a hexapod in this illustrative example.

As depicted, assembly systems 1210 may be autonomous devices configured to perform operations on panel 1202. For example, without limitation, assembly systems 1210 may clamp structures, drill holes, measure holes, install fasteners, seal fasteners, and perform other types of operations on panel 1202. In an illustrative example, assembly systems 1210 may move under panel 1202 in the direction of arrow 1206 to perform these operations. In this illustrative example, assembly system 1400 and one of assembly systems 1210 moves under panel 1202 in the direction of arrow 1206 to perform such operations.

In some cases, the position of wing assembly 302 may need to be adjusted to accommodate assembly systems 1210. In an illustrative example, system controller 214 communicates with drivable support system 208 to move wing assembly 302 vertically in the direction of arrow 503 as needed.

In this depicted example, each of assembly systems 1210 may move under panel 1202 at the same time, performing drilling and fastening operations simultaneously at different locations along panel 1202. Assembly systems 1210 may communicate with system controller 214 shown in FIG. 2.

Assembly systems 1210 may receive instructions from system controller 214 and provide feedback to system controller 214. Metrology system 212 also may provide feedback to locate each of assembly systems 1210. In this manner, system controller 214 may tightly control the operations of assembly systems 1210. Each of assembly systems 1210 may move under panel 1202 without undesired encounters with one another or human operators, movement beyond the work area, or both.

In some illustrative examples, assembly systems 1210 may perform drilling and fastening operations in more than one of work cells 202. For instance, assembly systems 1210 may drill a first portion of the holes needed in panel 1202 (not shown). After the first portion is drilled, panel 1202 may need to be lowered from side 1208 of wing assembly 302 to be cleaned and deburred.

In this case, panel 1202 may then be reattached to wing assembly 302 and a second portion of the holes may be drilled in panel 1202. Assembly systems 1210 may perform one-up assembly on the remaining fasteners for the second portion of the holes. In other cases, operations may be performed by assembly systems 1210 in some other manner, depending on the particular implementation.

Figure 16:
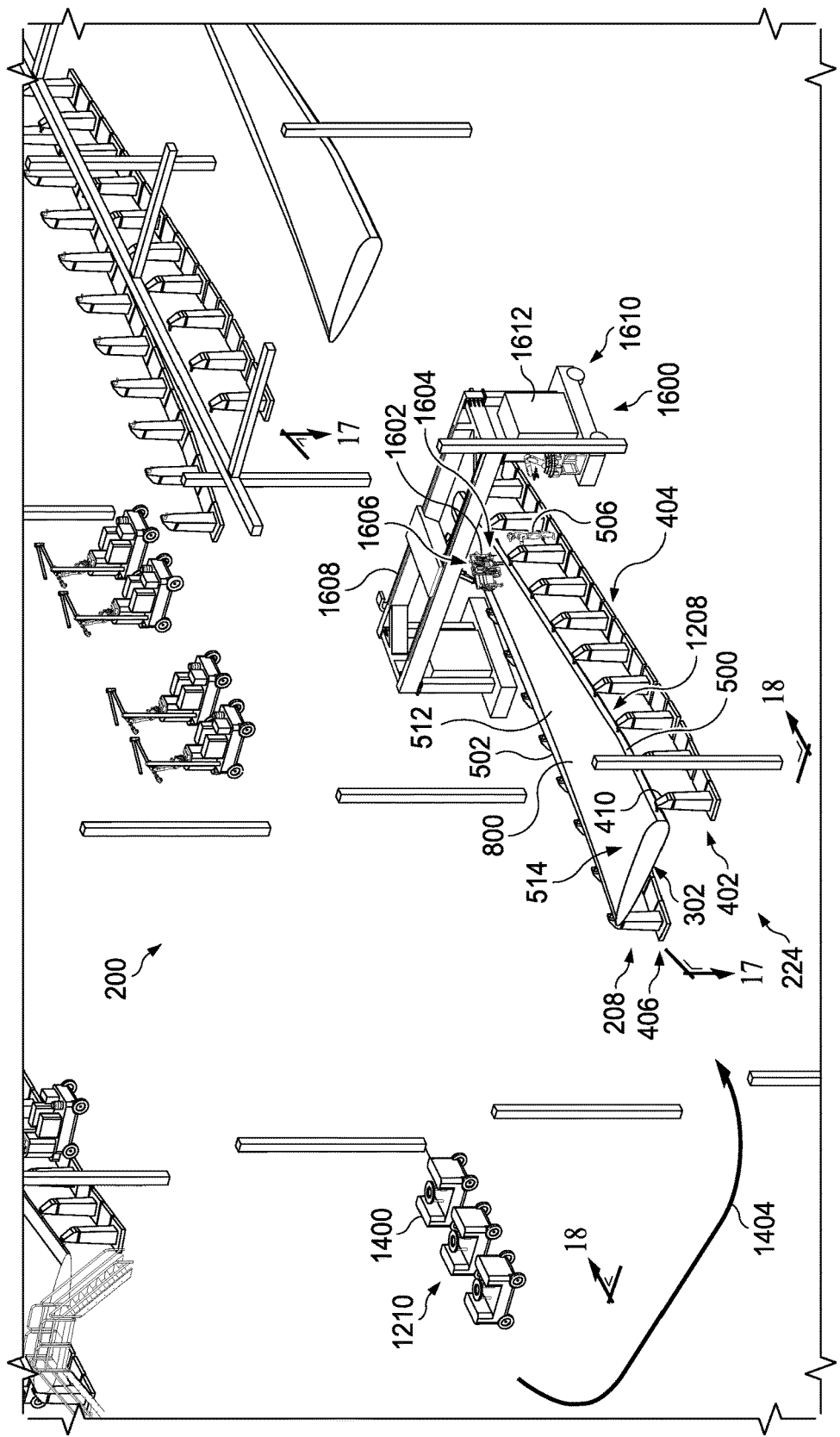
FIG. 16 is an illustration of a wing in a work cell in accordance with an illustrative embodiment.

After operations in work cell 222 are completed, drivable support system 208 with wing assembly 302 may move to work cell 224 shown in FIG. 16. Drivable support system 208 with wing assembly 302 may move in the direction of arrow 1404 to work cell 224 in this illustrative example.

Figure 15:
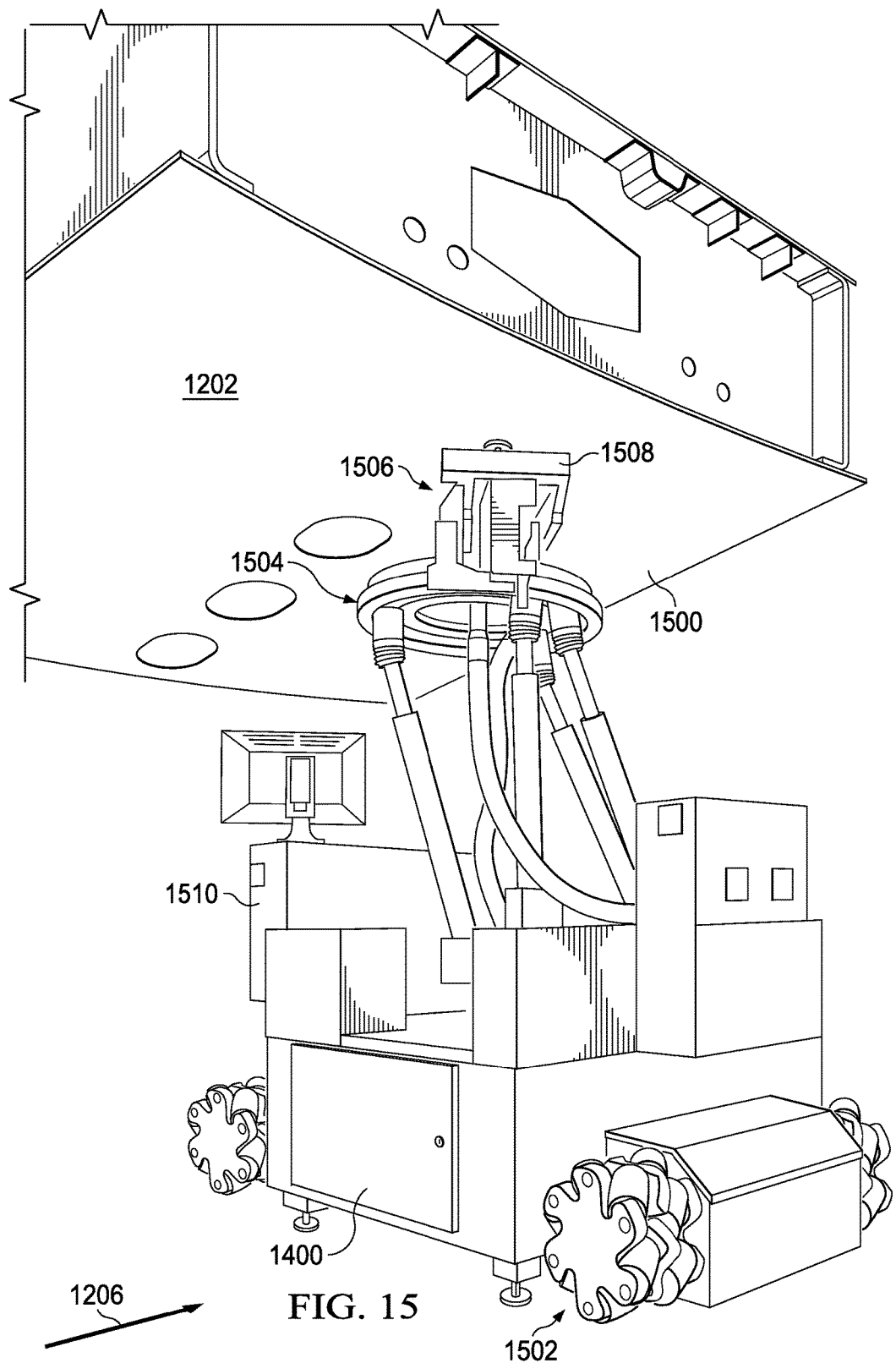
FIG. 15 is an illustration of an assembly system performing operations on a surface of a wing assembly in accordance with an illustrative embodiment.

Turning now to FIG. 15, an illustration of assembly system 1400 performing operations on a surface of wing assembly 302, shown in the direction of lines 15-15 in FIG. 14, is depicted in accordance with an illustrative embodiment. In this depicted example, assembly system 1400 has moved in the direction of arrow 1206 in FIG. 14 to be positioned relative to surface 1500 of panel 1202.

As depicted, assembly system 1400 may be equipped with movement system 1502, motion platform 1504, and tools 1506 on end effector 1508. Movement system 1502 may move assembly system 1400 into a desired area. Motion platform 1504 then may be used to precisely position end effector 1508 with tools 1506 relative to surface 1500 of panel 1202.

Assembly system 1400 may include on-board controller 1510 configured to communicate with system controller 214 in FIG. 2. As assembly system 1400 moves, assembly system 1400 may provide position feedback to system controller 214. Metrology system 212 also may track the position of assembly system 1400.

In this illustrative example, movement system 1502 may comprise wheels that move assembly system 1400 under surface 1500 of panel 1202. These wheels may be retractable once assembly system 1400 is in a desired position.

Motion platform 1504 may provide seven degrees of freedom of movement for tools 1506 in this illustrative example. In an illustrative example, degrees of freedom may refer to the movement of tools 1506 in three-dimensional space.

As illustrated, tools 1506 may be arranged on end effector 1508 attached to motion platform 1504. Tools 1506 may include at least one of an inspection system, a clamping system, a sensor system, a fastener system, a drilling system, a positioning system, or other suitable tools.

When tools 1506 include an inspection system, the inspection system may inspect the holes drilled by assembly system 1400. The inspection system also may inspect the fasteners installed by assembly system 1400. Inspection results may be communicated to system controller 214 in some cases.

In FIG. 16, an illustration of a wing in work cell 224 is depicted in accordance with an illustrative embodiment. In this depicted example, drivable support system 208 with wing assembly 302 has moved into work cell 224 in the direction of arrow 1404 in FIG. 14.

Overhead assembly system 1600 may perform operations on panel 512 in this illustrative example. Overhead assembly system 1600 may be another example of a physical implementation for one of plurality of autonomous tool systems 118 shown in block form in FIG. 1.

In this illustrative example, overhead assembly system 1600 may include motion platform 1602 with tools 1604 on end effector 1606. Motion platform 1602, tools 1604, and end effector 1606 may be implemented in a manner similar to motion platform 1504, tools 1506, and end effector 1508, as described above.

Motion platform 1602 may be roughly positioned above panel 512 using overhead support system 1608 equipped with movement system 1610. More precise positioning of motion platform 1602, as well as end effector 1606, is provided by various other moving components associated with overhead assembly system 1600. Overhead assembly system 1600 also may include on-board controller 1612 that communicates with system controller 214 and other components.

After overhead assembly system 1600 performs its operations on wing assembly 302, operations within manufacturing environment 200 now may be complete. A dolly (not shown in this view) may be positioned under wing assembly 302 to support wing assembly 302 as supports 402 are separated.

Wing assembly 302 may continue with assembly work that does not require precision fixturing until wing assembly 302 is needed for installation in an aircraft. Drivable support system 208, including all or a portion of supports 402, may be moved back to work cell 216 to receive another wing assembly.

Figure 17:
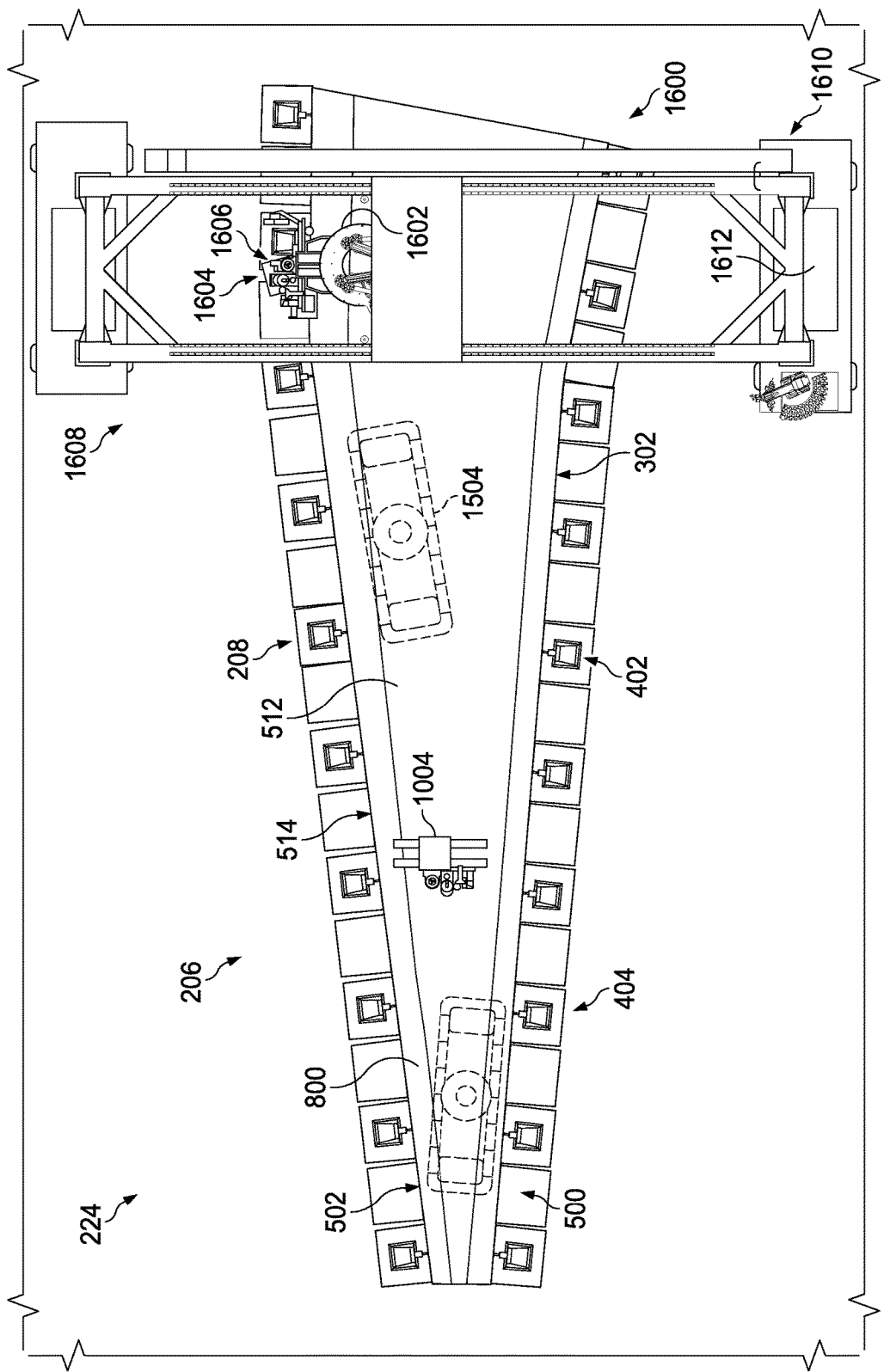
FIG. 17 is an illustration of a top view of a work cell in accordance with an illustrative embodiment.

With reference next to FIG. 17, an illustration of a top view of work cell 224, shown in the direction of lines 17-17 in FIG. 16 is depicted in accordance with an illustrative embodiment. In this view, various autonomous tool systems 210 perform operations simultaneously on wing assembly 302. Under the coordinated control of system controller 214, each of autonomous tool systems 210 may perform operations on wing assembly 302 without colliding with one another and/or falling off of wing assembly 302, and so forth.

Figure 18:
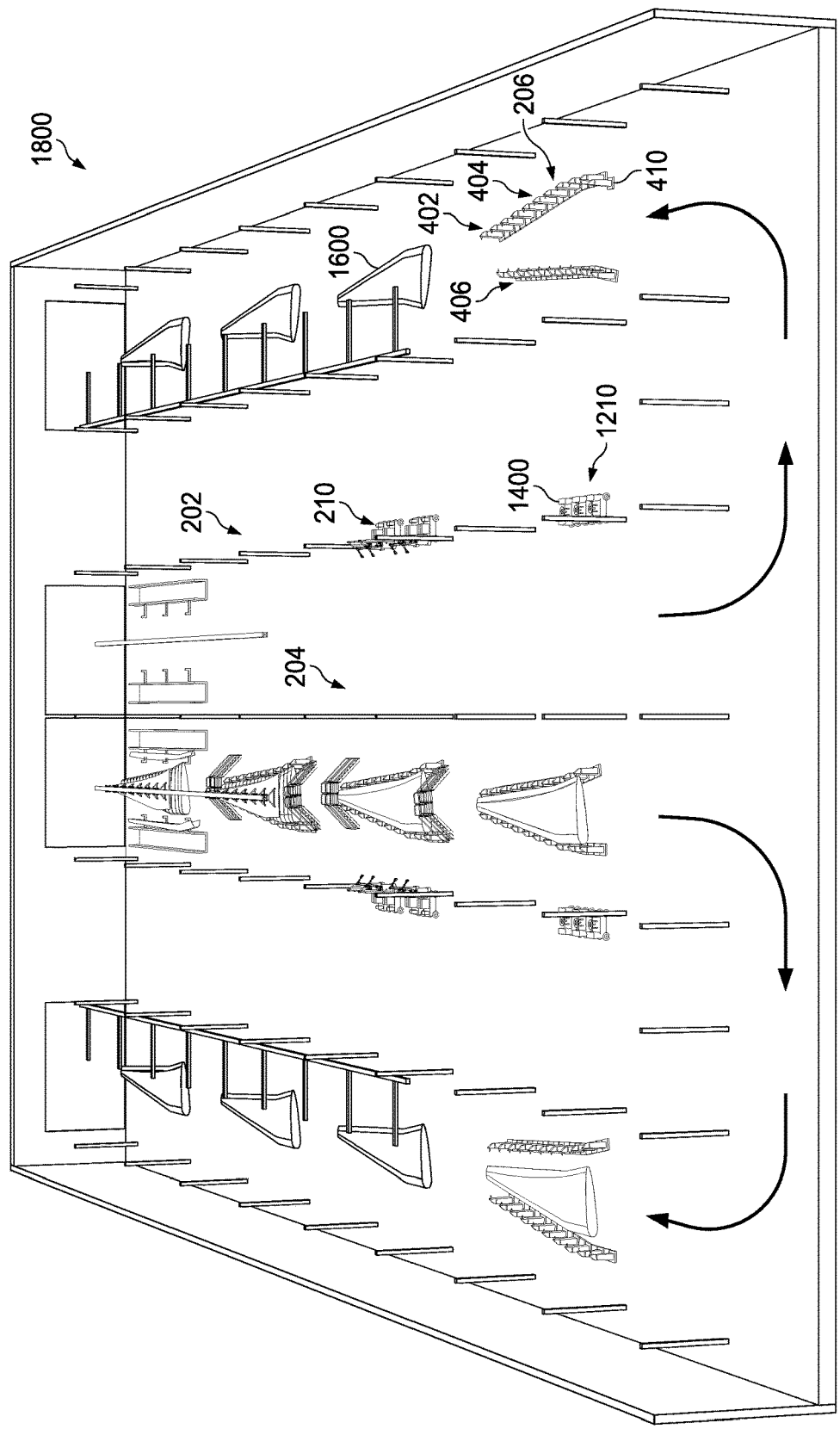
FIG. 18 is an illustration of a manufacturing environment in accordance with an illustrative embodiment.

Referring next to FIG. 18, an illustration of manufacturing environment 200, shown in the direction of lines 18-18 in FIG. 16, is depicted in accordance with an illustrative embodiment. As shown in this view, wing assemblies 204 are being manufactured throughout various work cells 202.

In this illustrative example, work cells 202 are arranged in configuration 1800. Configuration 1800 is a u-shaped configuration in this illustrative example. As depicted, the components within flexible manufacturing system 206 have been rearranged from the configuration shown in FIGS. 2-17 to form configuration 1800. Because no fixed monument fixtures are used, complete reconfiguration of flexible manufacturing system 206 is possible.

Further, because all of autonomous tool systems 210 used to manufacture wing assemblies 204 are drivable and are not fixed to the floor, those tools may drive from work cell to work cell, regardless of what configuration of manufacturing environment 200 is desired. Unlike many existing assembly line solutions, an illustrative embodiment completely alleviates the need for, and requirement for, fixed monument fixtures holding a wing assembly, fixed tooling, tools that are fixed to the manufacturing facility, and other inflexible structures.

In other illustrative examples, the components within flexible manufacturing system 206 may be reconfigured in some other manner. In an example, wing assemblies 204 may be pulsed laterally.

Since autonomous tool systems 210 are free to move about manufacturing environment 200, different autonomous tool systems 210 may be used to manufacture wing assemblies 204 in various work cells 202 at the same time. As a result, multiple wing assemblies 204 may be continuously pulsed through manufacturing environment 200 to increase the efficiency of the manufacturing process. This increase in efficiency leads to a higher production rate than with some currently used systems.

Each of the components within manufacturing environment 200 may be reconfigured in this illustrative example. For instance, when a different type of wing is being manufactured, the type of autonomous tool systems 210 used may be different. Further, some of autonomous tool systems 210 may not be needed.

In still other illustrative examples, supports 402 may hold wing assembly 302 in a vertical configuration. In this case, autonomous tool systems 210 may be configured to function differently to perform operations on wing assembly 302.

As another example, the size of wing assembly 302 may require additional supports 402 to be added to drivable support system 208, additional autonomous tool systems 210 to be used, or a combination thereof. The size of work cells 202 also may be adjusted depending on the length of wing assembly 302. In each case, the components within flexible manufacturing system 206 are reconfigured to meet different manufacturing needs.

Figure 19:
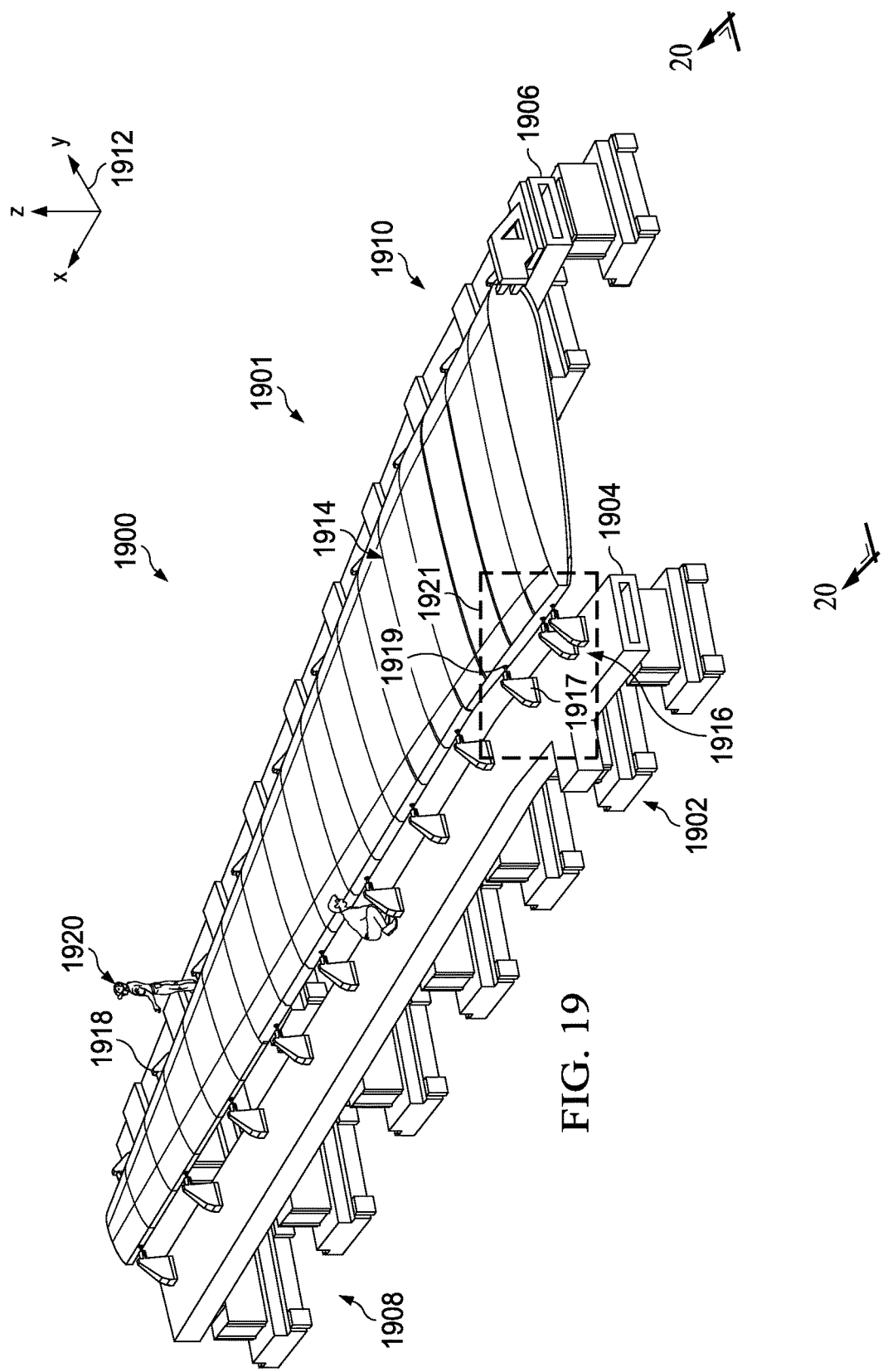
FIG. 19 is an illustration of a drivable support system with elongate platforms in accordance with an illustrative embodiment.
Figure 20:
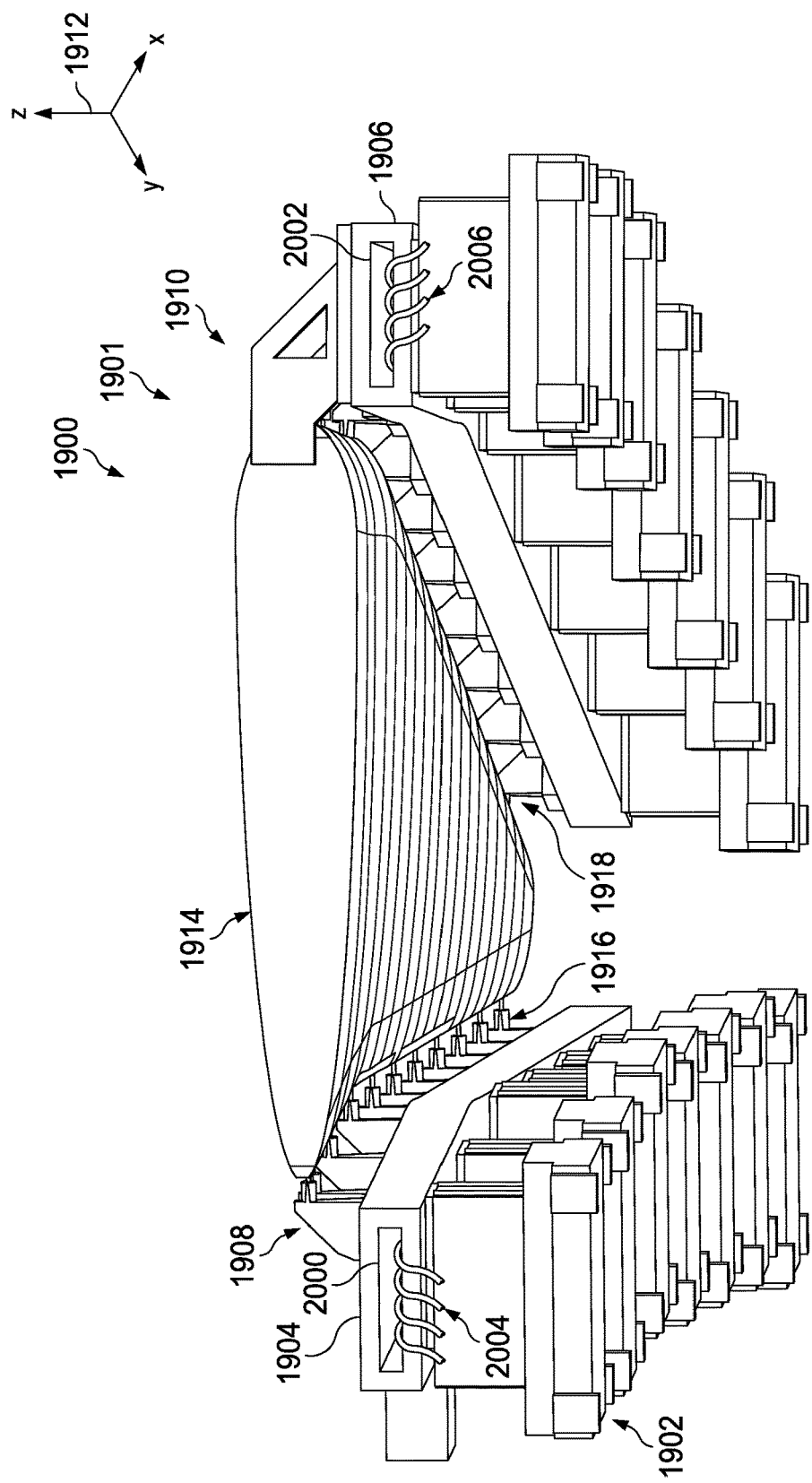
FIG. 20 is an illustration of a drivable support system and a wing assembly in accordance with an illustrative embodiment.
Figure 21:
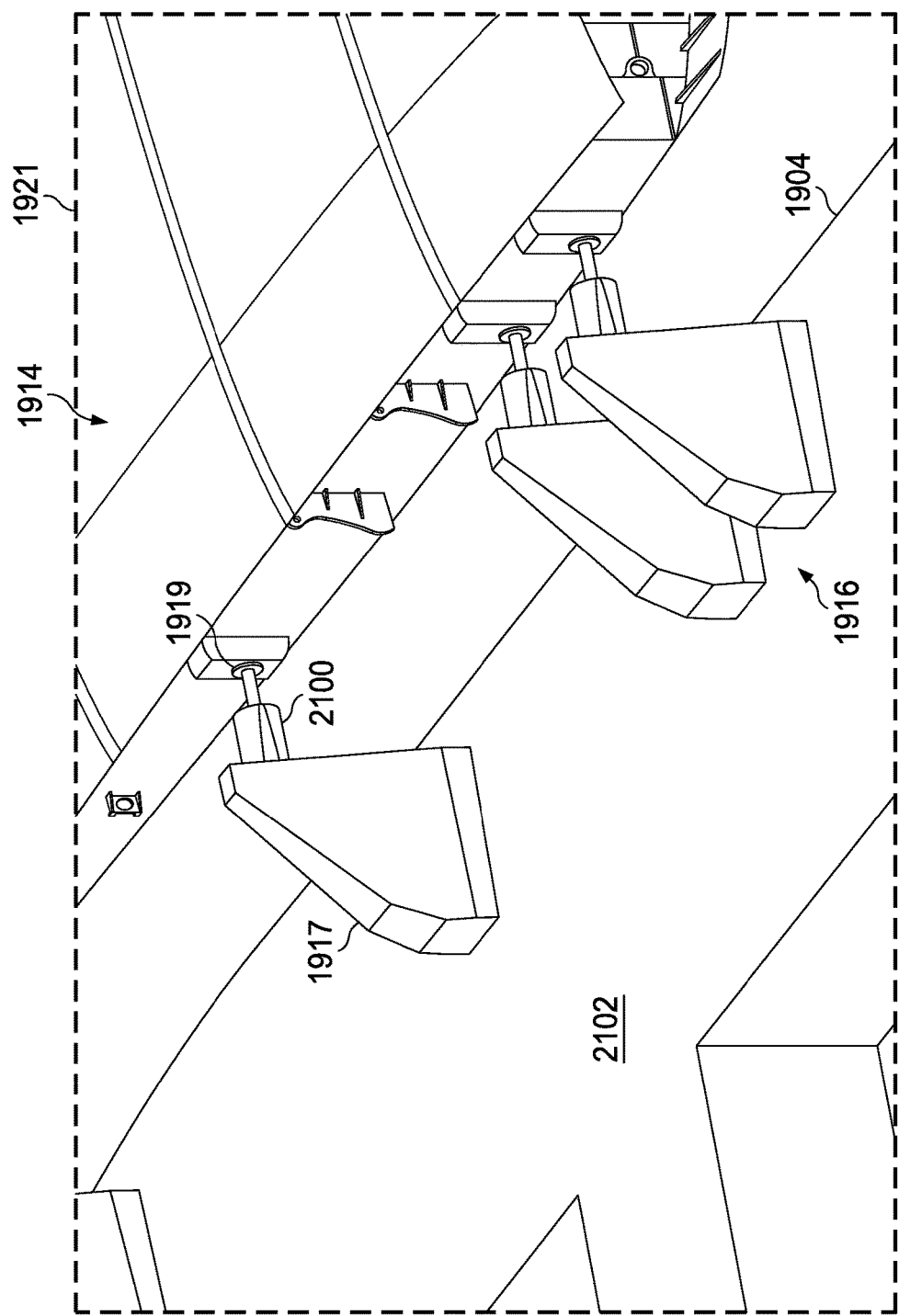
FIG. 21 is an illustration of an enlarged view of a connection device and a point on a wing assembly in accordance with an illustrative embodiment.

FIGS. 19-21 show an alternative implementation for a mobile support system. In FIGS. 19-21, a bridge system with elongate platforms is shown. Instead of being attached to connection devices on each drivable support, the illustrative examples in FIGS. 19-21 employ connection devices positioned along the length of an elongate platform.

Referring to FIG. 19, an illustration of a drivable support system with elongate platforms is depicted in accordance with an illustrative embodiment. In this illustrative example, drivable support system 1900 is shown in work cell 1901. Work cell 1901 may be an example of yet another physical implementation for one of plurality of work cells 112 shown in block form in FIG. 1. Work cell 1901 may be part of manufacturing environment 200, shown in FIG. 2, or may be positioned in a different facility.

As depicted, drivable support system 1900 includes drivable supports 1902, elongate platform 1904, and elongate platform 1906. Drivable support system 1900 and drivable supports 1902 are examples of physical implementations for drivable support system 116 and drivable supports 135, respectively, shown in block form in FIG. 1. Elongate platform 1904 and elongate platform 1906 are both examples of physical implementations for elongate platform 177 in FIG. 1.

As illustrated, first group 1908 of drivable supports 1902 may be connected to elongate platform 1904. Second group 1910 of drivable supports 1902 may be connected to elongate platform 1906. Elongate platform 1904, elongate platform 1906, or both may have a shape that corresponds to a desired shape of a wing.

Each of first group 1908 and second group 1910 of drivable supports 1902 include seven supports evenly spaced underneath a respective elongate platform. Drivable supports 1902 are automated guided vehicles in this example.

In other illustrative examples, other numbers of drivable supports 1902 may be used under each beam, depending on the particular implementation. Spacing between each support also may vary.

In this illustrative example, first group 1908 of drivable supports 1902 may move elongate platform 1904 into a desired position. For example, first group 1908 of drivable supports 1902 may collectively move elongate platform 1904 with respect to a number of axes 1912 to position elongate platform 1904 relative to wing assembly 1914.

In a similar fashion, second group 1910 of drivable supports 1902 may collectively move elongate platform 1906 with respect to axes 1912 to position elongate platform 1904 relative to wing assembly 1914. Wing assembly 1914 is an example of a physical implementation for structure 110 shown in block form in FIG. 1.

In an illustrative example, a first group of connection devices 1916 are associated with elongate platform 1904. Connection devices 1916 may be positioned along a length of elongate platform 1904 as shown in this view.

A second group of connection devices 1918 may be associated with elongate platform 1906. Connection devices 1918 may be positioned along a length of elongate platform 1906 in this illustrative example.

Connection devices 1916 and connection devices 1918 may correspond to connection points (obscured in this view) on wing assembly 1914. Connection devices 1916 and connection devices 1918 hold wing assembly 1914 in a desired position. As an example, connection device 1917 connects to point 1919 on wing assembly 1914.

Point 1919 may be a connection point that is independently movable using connection device 1917. Point 1919 may be a control point as well as a connection point. In other cases, point 1919 may simply be a fixed connection point that only moves as the elongate platform moves. Connection device 1917 is shown in section 1921 in this illustrative example.

As depicted, human operators 1920 move about elongate platform 1904 and elongate platform 1906. In addition, various autonomous tool systems (not shown in this view) may move about drivable support system 1900 to perform operations on wing assembly 1914.

In this depicted example, each of drivable supports 1902 may be equipped with a movement system configured to move its corresponding elongate platform with respect to axes 1912. Such movement may include translation, rotation, or some other suitable movement. Drivable supports 1902 dynamically adjust the elongate platforms to keep wing assembly 1914 in alignment, compensate for uneven terrain in the manufacturing environment, allow autonomous tool systems access to wing assembly 1914, balance the load of wing assembly 1914 at any given point, reduce deflection in the beam, or some combination thereof. For example elongate platform 1904 may be moved using a movement system on at least one drivable support in first group 1908 of drivable supports 1902.

Elongate platform 1904 and elongate platform 1906 are substantially flat beams in this illustrative example. In other words, the upper surface of each beam may be planar with deviations within selected tolerances. Elongate platform 1904 and elongate platform 1906 are manufactured to be substantially flat beams such that misalignments at a point along the beam will reveal misalignments in a corresponding portion of wing assembly 1914 connected to that beam.

Adjustments may be made based on position information collected by a metrology system, such as metrology system 120 described in FIG. 1. With the use of elongate platform 1904 and elongate platform 1906, however, fewer sensors are needed to position wing assembly 1914 as desired. Instead of requiring sensors at each control point, the metrology system may be used to determine flatness of each elongate platform and, from that flatness determination, one or more drivable supports 1902 may be adjusted to bring the entire work plane back into alignment.

Elongate platform 1904 and elongate platform 1906 also allow a greater number of connection devices to be used without increasing the number of drivable supports 1902 needed. Connection devices 1916 and connection devices 1918 may be positioned on elongate platform 1904 and elongate platform 1906, respectively, at desired intervals to meet engineering specifications, while still allowing tools to easily maneuver about wing assembly 1914. By using fewer supports, more space is available for tools to perform operations simultaneously.

Although drivable support system 1900 is shown with two elongate platforms and two portions of drivable supports 1902, more than two are possible. For instance, several smaller beams and corresponding drivable supports 1902 may be arranged to form drivable support system 1900.

In other illustrative examples, a first set of load sensors (not shown) may be connected to elongate platform 1904 and configured to identify a load applied to elongate platform 1904 by wing assembly 1914. A second set of load sensors (not shown) may be connected to elongate platform 1906 and configured to identify a load applied to elongate platform 1906 by wing assembly 1914. These sensors may constantly provide feedback for the system.

Turning now to FIG. 20, an illustration of drivable support system 1900 and wing assembly 1914 shown in the direction of lines 20-20 in FIG. 19 is depicted in accordance with an illustrative embodiment. In this view, channel 2000 in elongate platform 1904 and channel 2002 in elongate platform 1906 are shown. Channel 2000 and channel 2002 are examples of physical implementations for channel 185 in elongate platform 177 shown in block form in FIG. 1.

At least one of channel 2000 and channel 2002 provide a wire raceway in this illustrative example. For instance, cables 2004 may run through channel 2000 and cables 2006 may run through channel 2002 to provide utilities to drivable support system 1900, autonomous tool systems working on wing assembly 1914, human operators 1920 using power tools, or a combination thereof. Cables 2004 and cables 2006 are examples of physical implementations for lines 187 from FIG. 1. In other illustrative examples, air lines or other devices may be run through channel 2000, channel 2002, or both.

In FIG. 21, an illustration of an enlarged view of section 1921 with connection device 1917 and point 1919 on wing assembly 1914 from FIG. 19 is depicted in accordance with an illustrative embodiment. In this depicted example, connection device 1917 may have connector 2100. Connector 2100 directly attaches to point 1919 on wing assembly 1914 in this illustrative example.

In this illustrative example, connector 2100 is rigidly connected to wing assembly 1914 at point 1919. To adjust the position of connector 2100, one or more of drivable supports 1902 (not shown in this view) move to bring surface 2102 of elongate platform 1904, and consequently point 1919 of wing assembly 1914, back into alignment.

In alternative embodiments, connector 2100 and other components in connection device 1917 may move. However, in the embodiments shown in FIGS. 19-21, that type of movement is not required to provide desired alignment for wing assembly 1914.

The illustrations of manufacturing environment 200 and the components within manufacturing environment 200 in FIGS. 2-18, as well as drivable support system 1900 shown in FIGS. 19-21, are not meant to imply physical or architectural limitations to the manner in which an illustrative embodiment may be implemented. Other components in addition to or in place of the ones illustrated may be used. Some components may be optional.

The different components shown in FIGS. 2-21 may be illustrative examples of how components shown in block form in FIG. 1 can be implemented as physical structures. Additionally, some of the components in FIGS. 2-21 may be combined with components in FIG. 1, used with components in FIG. 1, or a combination of the two.

Figure 22:
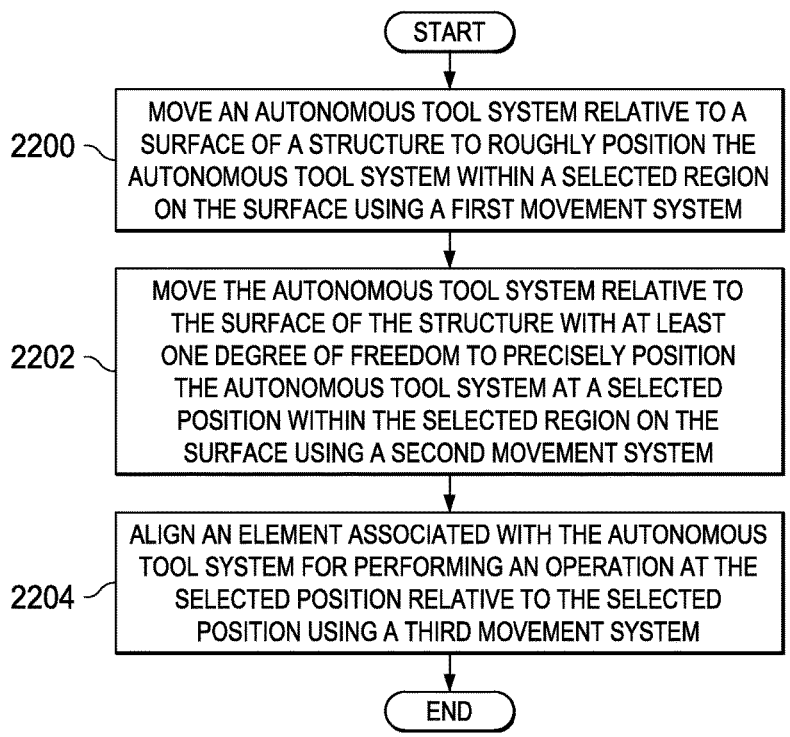
FIG. 22 is an illustration of a flowchart of a process for positioning a tool on a surface in accordance with an illustrative embodiment.

With reference now to FIG. 22, an illustration of a flowchart of a process for positioning a tool on a surface is depicted in accordance with an illustrative embodiment. The process described in FIG. 22 may be implemented to position autonomous tool system 131 and components within autonomous tool system 131 relative to a surface on structure 110. A combination of components including controller 122, various movement systems, and other devices may be used to position autonomous tool system 131. Metrology system 120 may be used to locate autonomous tool system 131 as it is being positioned.

The process may begin by moving autonomous tool system 131 relative to a surface of structure 110 to roughly position autonomous tool system 131 within a selected region on the surface using a first movement system (operation 2200). An example of a first movement system for an autonomous tool system may be movement system 1610 for overhead assembly system 1600 shown in FIG. 16.

Next, the process may move autonomous tool system 131 relative to the surface of structure 110 with at least one degree of freedom to precisely position autonomous tool system 131 at a selected position within the selected region on the surface using a second movement system (operation 2202). For instance, a second movement system may move motion platform 1602 toward surface 800 of panel 512, as shown in FIG. 16.

The process then may align an element associated with autonomous tool system 131 for performing operation 139 at the selected position relative to the selected position using a third movement system (operation 2204), with the process terminating thereafter. The element may be end effector 1508 with tools 1604 as shown in FIG. 16. In this case, motion platform 1504 may be the third movement system configured to precisely position end effector 1508 relative to surface 800 of panel 512 at a desired location to perform an operation.

Figure 23:
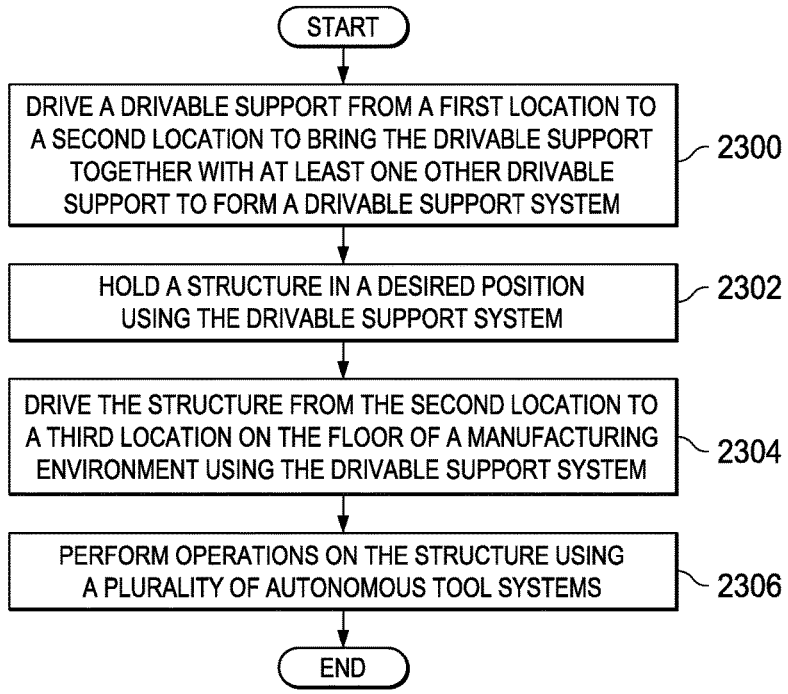
FIG. 23 is an illustration of a flowchart of a process for performing operations on a structure in accordance with an illustrative embodiment.

In FIG. 23, an illustration of a flowchart of a process for performing operations 130 on structure 110 is depicted in accordance with an illustrative embodiment. The process illustrated in FIG. 23 may be implemented by flexible manufacturing system 102 in manufacturing environment 100 shown in FIG. 1.

The process begins by driving drivable support 137 from first location 113 to second location 115 to bring drivable support 137 together with at least one other drivable support to form drivable support system 116 (operation 2300). Next, the process may hold structure 110 in desired position 133 using drivable support system 116 (operation 2302).

Thereafter, the process may drive structure 110 from second location 115 to third location 117 on floor 107 of manufacturing environment 100 using drivable support system 116 (operation 2304). The process may then perform operations 130 on structure 110 using plurality of autonomous tool systems 118 (operation 2306), with the process terminating thereafter.

In operation 2306, operations 130 may be performed on structure 110 while structure 110 is being driven or steered from second location 115 to third location 117. In other words, operations 130 may be performed while structure 110 is being carried by drivable support system 116. Plurality of autonomous tool systems 118 may be driven to third location 117 from various locations 103 in manufacturing environment 100 to perform these operations.

Figure 24:
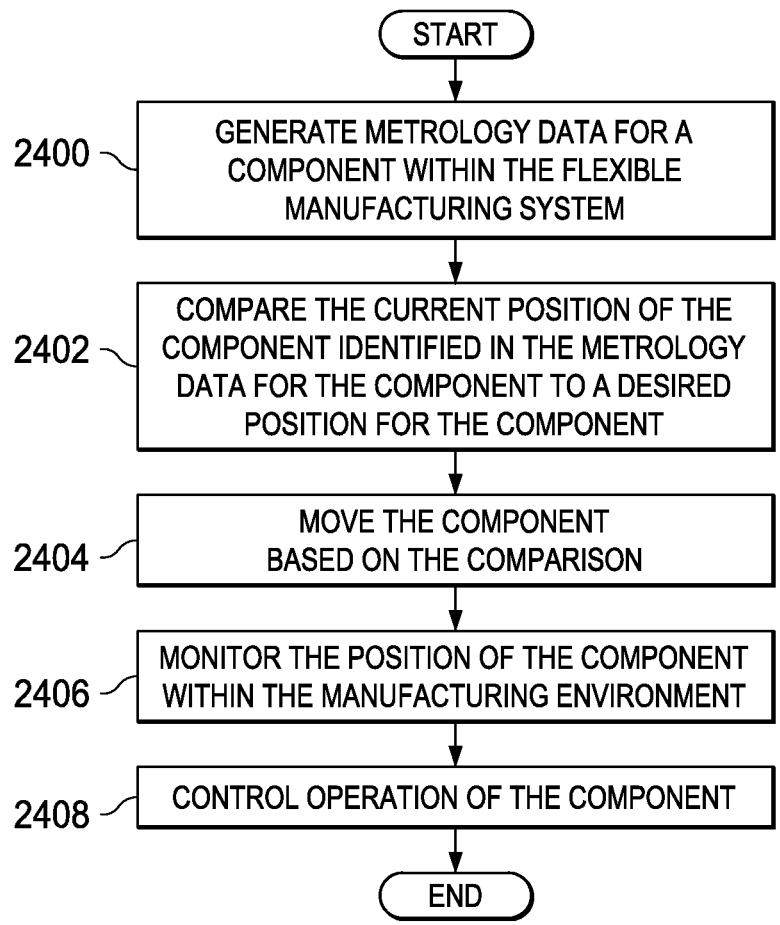
FIG. 24 is an illustration of a flowchart of a process for operating a flexible manufacturing system to perform operations on a structure in accordance with an illustrative embodiment.

Referring next to FIG. 24, an illustration of a flowchart of a process for operating flexible manufacturing system 102 to perform operations on structure 110 is depicted in accordance with an illustrative embodiment. The process may begin by generating metrology data 154 for a component within flexible manufacturing system 102 (operation 2400). For instance, metrology system 120 may be used to identify a current position for at least one of drivable support system 116, plurality of autonomous tool systems 118, or structure 110.

The process then compares the current position of the component identified in metrology data 154 to a desired position for the component (operation 2402). Next, the process moves the component based on the comparison (operation 2404). As an example, controller 122 may command autonomous tool system 131 to drive between locations 103 in manufacturing environment 100. Controller 122 may steer autonomous tool system 131 to avoid collisions with other components in manufacturing environment 100.

As the component moves, the process monitors the position of the component within manufacturing environment 100 (operation 2406). Operation 2406 may be implemented using metrology system 120 to provide feedback control 199.

The process then controls operation of the component (operation 2408), with the process terminating thereafter. For instance, controller 122 may assign and reassign tasks to the component, take the component offline, reposition the component, command the component to perform an action, or a combination thereof.

The operations described in FIG. 24 may occur substantially concurrently for each component in flexible manufacturing system 102. For instance, controller 122 may control operation of plurality of autonomous tool systems 118 throughout operations 130. Moreover, metrology system 120 may continuously generate metrology data 154 to ensure that components within flexible manufacturing system 102 are in a desired position.

Figure 25:
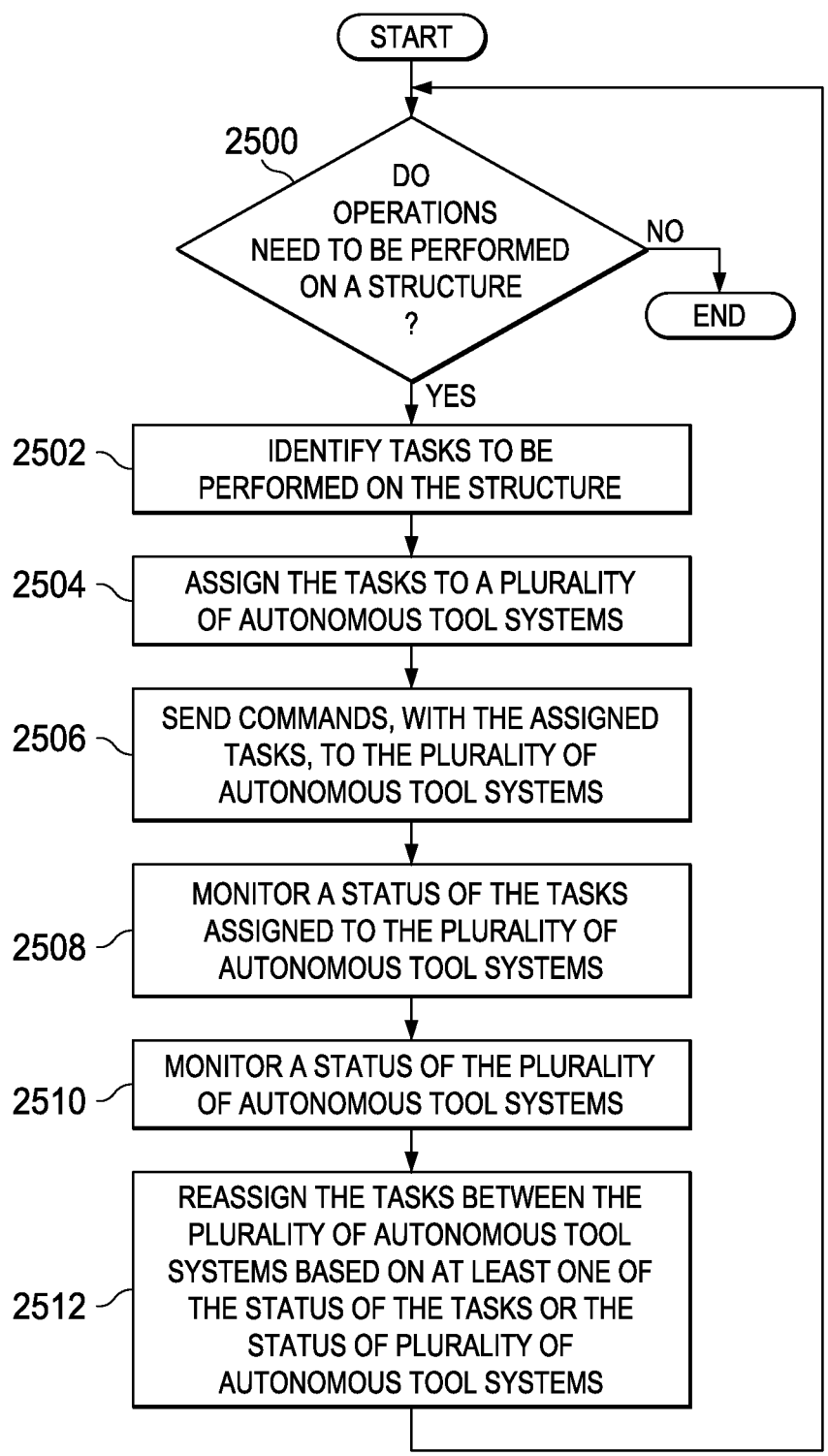
FIG. 25 is an illustration of a flowchart of a process for controlling operation of a plurality of autonomous tool systems in accordance with an illustrative embodiment.

In FIG. 25, an illustration of a flowchart of a process for controlling operation of plurality of autonomous tool systems 118 is depicted in accordance with an illustrative embodiment. The process illustrated in FIG. 25 may be implemented by controller 122 as part of operation 2408 in FIG. 24.

The process begins by determining whether operations 130 need to be performed on structure 110 (operation 2500). If operations need to be performed, the process then identifies tasks 111 to be performed on structure 110 (operation 2502). Controller 122 may prioritize tasks 111 in some cases.

Next, the process assigns tasks 111 to plurality of autonomous tool systems 118 (operation 2504). The process then sends commands 166, with the assigned tasks 111, to plurality of autonomous tool systems 118 (operation 2506).

Thereafter, the process monitors status 170 of tasks 111 assigned to plurality of autonomous tool systems 118 (operation 2508).

The process also monitors status 172 of plurality of autonomous tool systems 118 (operation 2510). The process then reassigns tasks 111 between plurality of autonomous tool systems 118 based on at least one of status 170 of tasks 111 or status 172 of plurality of autonomous tool systems 118 (operation 2512), returning to operation 2500 thereafter.

Returning to operation 2500, if no operations need to be performed on structure 110, the process terminates. In this case, wing 108 may be complete. In another example, when assembly of wing 108 is not complete, the process described in FIG. 25 may temporarily terminate and be reinitiated at a later time.

Figure 26:
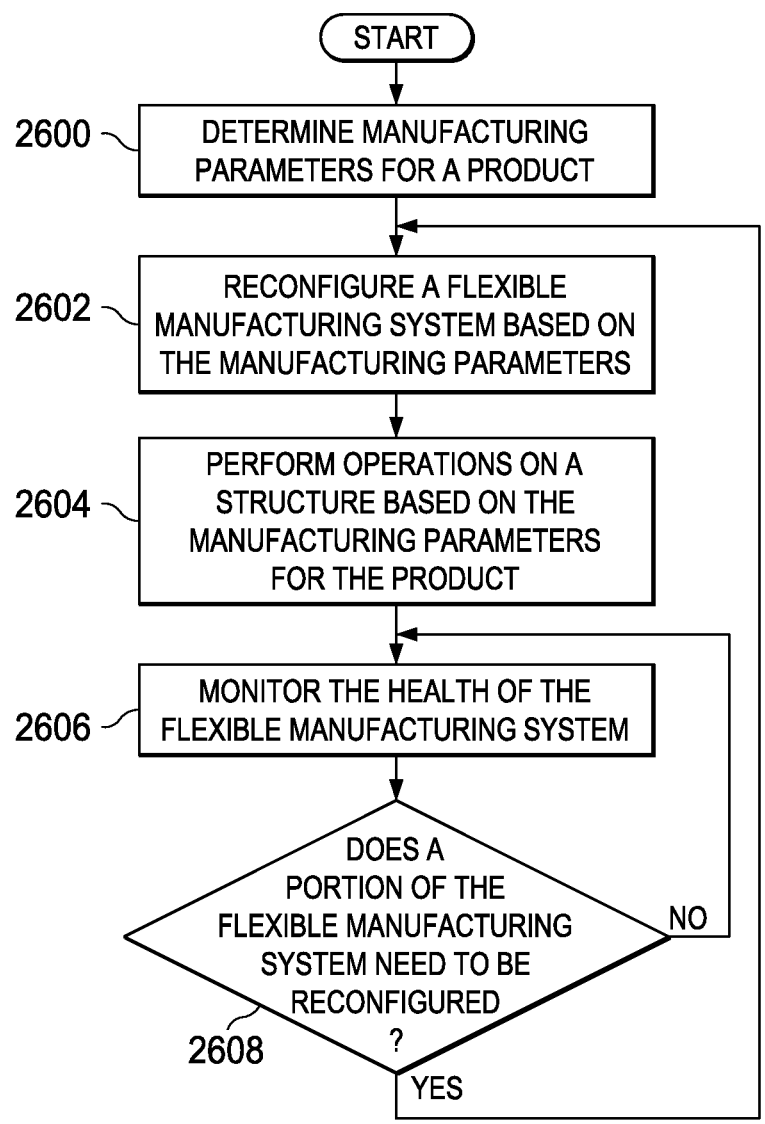
FIG. 26 is an illustration of a flowchart of a process for management of a manufacturing environment in accordance with an illustrative embodiment.

In FIG. 26, an illustration of a flowchart of a process for management of a manufacturing environment is depicted in accordance with an illustrative embodiment. The process illustrated in FIG. 26 may be used to reconfigure manufacturing environment 100 shown in block form in FIG. 1 based on manufacturing needs.

The process begins by determining manufacturing parameters 132 for product 104 (operation 2600). Next, the process reconfigures flexible manufacturing system 102 based on manufacturing parameters 132 (operation 2602). For example, without limitation, at least one of drivable support system 116, plurality of autonomous tool systems 118, or metrology system 120 may be reconfigured based on manufacturing parameters 132 for wing 108.

The process then performs operations 130 on structure 110 based on manufacturing parameters 132 for product 104 (operation 2604). As operations 130 are being performed, the process monitors the health of flexible manufacturing system 102 (operation 2606). The health of flexible manufacturing system 102 may include status 172 of plurality of autonomous tool systems 118, status 129 of operations 130, and the position of human operator 142, among others.

A determination is then made as to whether a portion of flexible manufacturing system 102 may need to be reconfigured (operation 2608). If not, the process returns to operation 2606.

If one or more components within flexible manufacturing system 102 need to be reconfigured, the process returns to operation 2602 as described above. In this manner, flexible manufacturing system 102 is reconfigurable based on manufacturing parameters 132 for wing 108. Flexible manufacturing system 102 is also reconfigurable in real-time based on changes monitored by controller 122.

Figure 27:
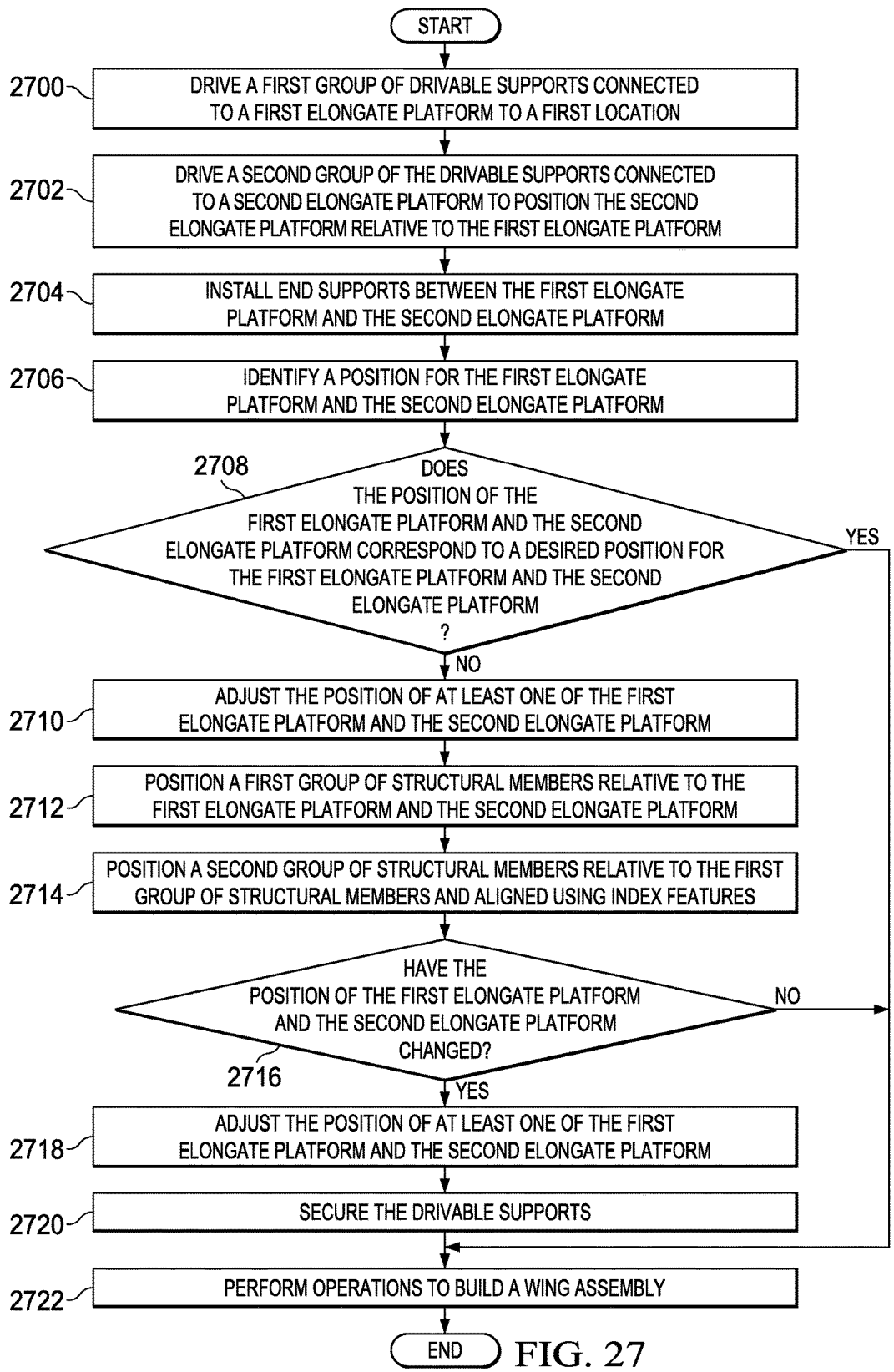
FIG. 27 is an illustration of a flowchart of a process for using a drivable support system to build a wing assembly in accordance with an illustrative embodiment.

Referring now to FIG. 27, an illustration of a flowchart of a process for using a drivable support system to build a wing assembly is depicted in accordance with an illustrative embodiment. The process illustrated in FIG. 27 may be implemented using drivable support system 116 with elongate platform 177 shown in block form in FIG. 1.

The process may begin by driving a first group of drivable supports 135 connected to a first elongate platform from first location 113 to second location 115 to bring the first group of drivable supports together with second group of drivable supports 135 connected to a second elongate platform (operation 2700). The first group of drivable supports 135 with the first elongate platform may be a front spar tooling system in this illustrative example.

The process may then drive a second group of drivable supports 135 connected to a second elongate platform to position the second elongate platform relative to the first elongate platform (operation 2702). The second group of drivable supports 135 with the second elongate platform may be a rear spar tooling system.

Next, end supports may be installed between the first elongate platform and the second elongate platform (operation 2704). End supports may be optional components used to enhance the stability of the system.

Thereafter, the process may identify a position for the first elongate platform and the second elongate platform (operation 2706). For example, metrology data 154 may be generated for each elongate platform using metrology system 120.

The process may then determine whether the position of the first elongate platform and the second elongate platform correspond to a desired position for the first elongate platform and the second elongate platform (operation 2708). If the position and the desired position correspond within selected tolerances, the process may continue to operation 2722. In this illustrative example, the desired position for the elongate platforms is a position that will ensure alignment, within selected tolerances, of parts of the wing assembly.

In operation 2708, if the position and the desired position do not correspond within selected tolerances, the process may adjust the position of at least one of the first elongate platform and the second elongate platform (operation 2710). The position of the elongate platforms is adjusted by moving drivable supports 135 as needed to flatten the work plane.

Thereafter, a first group of structural members may be positioned relative to the first elongate platform and the second elongate platform (operation 2712). For example, without limitation, front and rear spars may be loaded onto each respective elongate platform by attaching the spars to various connection devices along the length of the elongate platforms.

Next, a second group of structural members may be positioned relative to the first group of structural members and aligned using index features (operation 2714). As an example, ribs may be loaded between spars and indexed accordingly to form a ladder assembly.

The process may then determine whether the position of the first elongate platform and the second elongate platform have changed (operation 2716). For instance, metrology system 120 may scan drivable support system 116 again to make sure the first elongate platform and the second elongate platform are substantially flat.

If the position has not changed, the process proceeds to operation 2722. If the position has changed, the process again may adjust the position of at least one of the first elongate platform and the second elongate platform (operation 2718).

Thereafter, the process secures the drivable supports (operation 2720). In operation 2720, drivable supports 135 may be fixed in place such that drivable supports 135 do not move in an undesired manner. For example, without limitation, the wheels attached to drivable supports 135 may be locked or retracted.

The process then may perform operations 130 to build wing assembly 105 (operation 2722), with the process terminating thereafter. As an example, upper skin panel 184 may be loaded and tacked to the structural member. Plurality of autonomous tool systems 118 may move about drivable support system 116 to perform operations 130.

Throughout operations 130, metrology system 120 may be used to confirm proper alignment of the first elongate platform and the second elongate platform. In addition, other sensors, such as load sensors, may provide force sensor feedback to not overload wing assembly 105, drivable support system 116, or both.

After operations 130 are performed as desired, drivable support system 116 may move wing assembly 105 to other locations within manufacturing environment 100. Force sensors, as well as metrology system 120, may be employed to ensure load balancing, as well as precise positioning of the first elongate platform and the second elongate platform.

In some illustrative examples, each group of drivable supports 135 and its respective elongate platform may need to be attached to one another. In such a case, a position of drivable supports 135 relative to structure 110 in manufacturing environment 100 may be determined using metrology system 120.

A number of the drivable supports 135 may be driven to first location 113 to form the first group of drivable supports 135 based on a proximity of the number of drivable supports 135 to structure 110. For example, the four drivable supports 135 that are closest to structure 110 and available for use may be driven to first location 113 to form first group of drivable supports 135. The first group of drivable supports 135 may then be connected to the first elongate platform.

The second group of drivable supports 135 may be formed in a similar fashion and subsequently attached to the second elongate platform. In this manner, drive control system 121 may efficiently allocate drivable support resources within manufacturing environment 100, further expediting the build process for structure 110.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of module, a segment, a function, or a portion a combination thereof of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Figure 28:
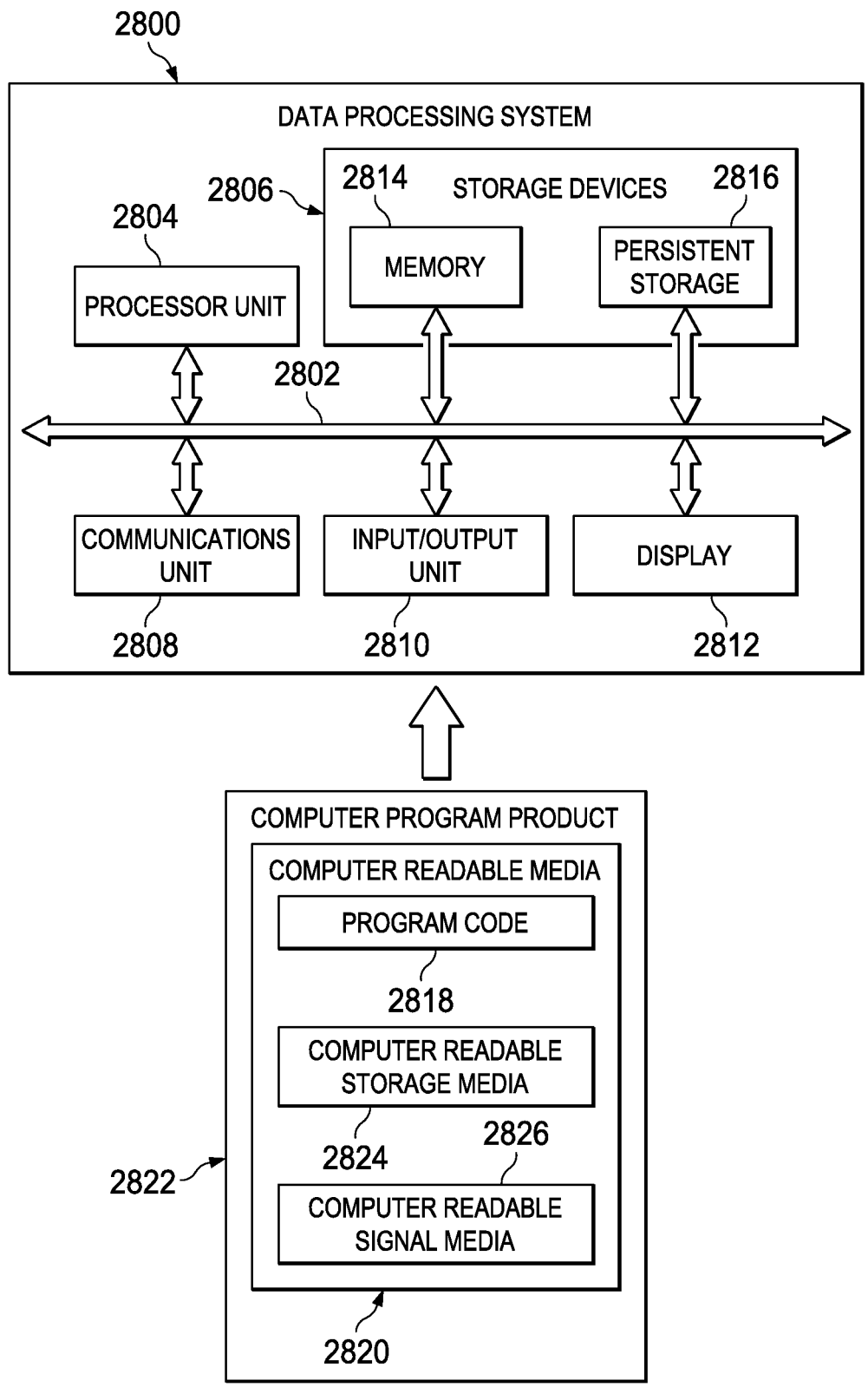
FIG. 28 is an illustration of a data processing system in the form of a block diagram in accordance with an illustrative embodiment.

Turning now to FIG. 28, an illustration of a data processing system in the form of a block diagram is depicted in accordance with an illustrative embodiment. Data processing system 2800 may be used to implement one or more computers in computer system 164 in FIG. 1. As depicted, data processing system 2800 includes communications framework 2802, which provides communications between processor unit 2804, storage devices 2806, communications unit 2808, input/output unit 2810, and display 2812. In some cases, communications framework 2802 may be implemented as a bus system.

Processor unit 2804 is configured to execute instructions for software to perform a number of operations. Processor unit 2804 may comprise a number of processors, a multi-processor core, some other type of processor, or some combination thereof, depending on the implementation. In some cases, processor unit 2804 may take the form of a hardware unit, such as a circuit system, an application specific integrated circuit (ASIC), a programmable logic device, or some other suitable type of hardware unit.

Instructions for the operating system, applications, programs, or both run by processor unit 2804 may be located in storage devices 2806. Storage devices 2806 may be in communication with processor unit 2804 through communications framework 2802. As used herein, a storage device, also referred to as a computer readable storage device, is any piece of hardware capable of storing information on a temporary basis, permanent basis, or both. This information may include, but is not limited to, at least one of data, program code, or other information.

Memory 2814 and persistent storage 2816 are examples of storage devices 2806. Memory 2814 may take the form of, for example, a random access memory or some type of volatile or non-volatile storage device. Persistent storage 2816 may comprise any number of components or devices. For example, persistent storage 2816 may comprise a hard drive, a flash memory, a rewritable optical disk, a rewritable magnetic tape, or some combination of the above. The media used by persistent storage 2816 may or may not be removable.

Communications unit 2808 allows data processing system 2800 to communicate with other data processing systems, devices, or some combination thereof. Communications unit 2808 may provide communications using physical communications links, wireless communications links, or a combination thereof.

Input/output unit 2810 allows input to be received from and output to be sent to other devices connected to data processing system 2800. For example, input/output unit 2810 may allow user input to be received through at least one of a keyboard, a mouse, or some other type of input device. As another example, input/output unit 2810 may allow output to be sent to a printer connected to data processing system 2800.

Display 2812 is configured to display information to a user. Display 2812 may comprise, for example, without limitation, selected from one of a monitor, a touch screen, a laser display, a holographic display, a virtual display device, or some other type of display device.

In this illustrative example, the processes of the different illustrative embodiments may be performed by processor unit 2804 using computer-implemented instructions. These instructions may be referred to as program code, computer usable program code, or computer readable program code and may be read and executed by one or more processors in processor unit 2804.

In these examples, program code 2818 is located in a functional form on computer readable media 2820, which is selectively removable, and may be loaded onto or transferred to data processing system 2800 for execution by processor unit 2804. Program code 2818 and computer readable media 2820 together form computer program product 2822. In this illustrative example, computer readable media 2820 may be computer readable storage media 2824 or computer readable signal media 2826.

Computer readable storage media 2824 is a physical or tangible storage device used to store program code 2818 rather than a medium that propagates or transmits program code 2818. Computer readable storage media 2824 may be, for example, without limitation, an optical or magnetic disk or a persistent storage device that is connected to data processing system 2800.

Alternatively, program code 2818 may be transferred to data processing system 2800 using computer readable signal media 2826. Computer readable signal media 2826 may be, for example, a propagated data signal containing program code 2818. This data signal may be an electromagnetic signal, an optical signal, or some other type of signal that can be transmitted over physical, wireless communications links, or some combination thereof.

The illustration of data processing system 2800 in FIG. 28 is not meant to provide architectural limitations to the manner in which the illustrative embodiments may be implemented. The different illustrative embodiments may be implemented in a data processing system that includes components in addition to or in place of those illustrated for data processing system 2800. Further, components shown in FIG. 28 may be varied from the illustrative examples shown.

Figure 29:
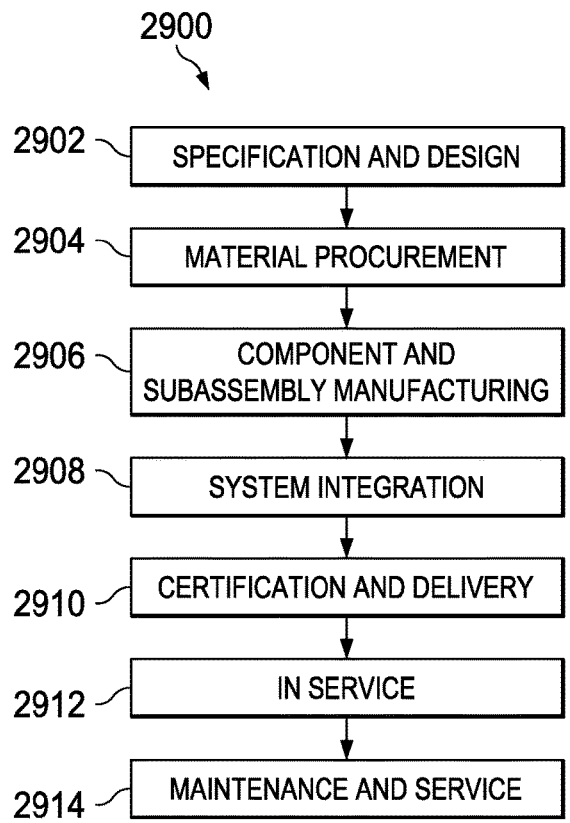
FIG. 29 is an illustration of an aircraft manufacturing and service method in the form of a block diagram in accordance with an illustrative embodiment.
Figure 30:
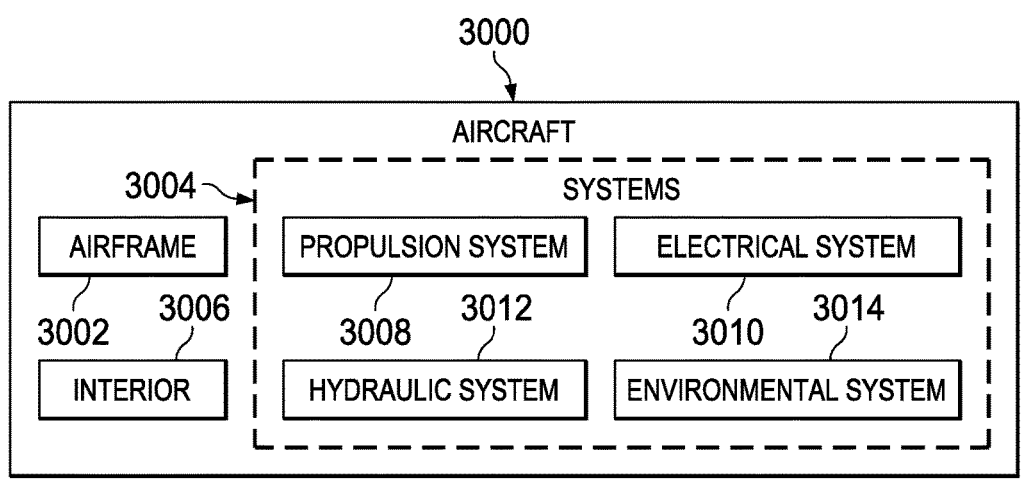
FIG. 30 is an illustration of an aircraft in the form of a block diagram in which an illustrative embodiment may be implemented.

The illustrative embodiments of the disclosure may be described in the context of aircraft manufacturing and service method 2900 as shown in FIG. 29 and aircraft 3000 as shown in FIG. 30. Turning first to FIG. 29, an illustration of an aircraft manufacturing and service method is depicted in the form of a block diagram in accordance with an illustrative embodiment. During pre-production, aircraft manufacturing and service method 2900 may include specification and design 2902 of aircraft 3000 in FIG. 30 and material procurement 2904.

During production, component and subassembly manufacturing 2906 and system integration 2908 of aircraft 3000 in FIG. 30 takes place. Thereafter, aircraft 3000 in FIG. 30 may go through certification and delivery 2910 in order to be placed in service 2912. While in service 2912 by a customer, aircraft 3000 in FIG. 30 is scheduled for routine maintenance and service 2914, which may include modification, reconfiguration, refurbishment, and other maintenance or service.

Each of the processes of aircraft manufacturing and service method 2900 may be performed or carried out by a system integrator, a third party, an operator, or a combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 30, an illustration of an aircraft is depicted in the form of a block diagram in which an illustrative embodiment may be implemented. In this example, aircraft 3000 is produced by aircraft manufacturing and service method 2900 in FIG. 29 and may include airframe 3002 with plurality of systems 3004 and interior 3006. Examples of systems 3004 include one or more of propulsion system 3008, electrical system 3010, hydraulic system 3012, and environmental system 3014. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 2900 in FIG. 29. In particular, flexible manufacturing system 102 from FIG. 1 may be used during various stages of aircraft manufacturing and service method 2900 to perform operations 130 on airframe 3002. For example, without limitation, flexible manufacturing system 102 may be used to perform operations 130 during component and subassembly manufacturing 2906. Components within flexible manufacturing system 102 also may be reconfigured for use during system integration 2908, routine maintenance and service 2914, or some other stage of aircraft manufacturing and service method 2900. For instance, plurality of autonomous tool systems 118 also may be used to rework portions of airframe 3002 during routine maintenance and service 2914.

In one illustrative example, components or subassemblies produced in component and subassembly manufacturing 2906 in FIG. 29 may be fabricated or manufactured in a manner similar to components or subassemblies produced while aircraft 3000 is in service 2912 in FIG. 29. As yet another example, one or more apparatus embodiments, method embodiments, or a combination thereof may be utilized during production stages, such as component and subassembly manufacturing 2906 and system integration 2908 in FIG. 29. One or more apparatus embodiments, method embodiments, or a combination thereof may be utilized while aircraft 3000 is in service 2912, during maintenance and service 2914 in FIG. 29, or a combination thereof. The use of a number of the different illustrative embodiments may substantially expedite the assembly, reduce the cost of aircraft 3000, or both.

Thus, the illustrative embodiments may provide a method and apparatus for performing operations 130 on product 104 for aircraft 109. Product 104 may take the form of wing 108 for aircraft 109. Flexible manufacturing system 102 may comprise drivable support system 116, plurality of autonomous tool systems 118, metrology system 120, and controller 122. Drivable support system 116 may be configured to hold structure 110 in desired position 133 and move with structure 110 between plurality of work cells 112 during performance of operations 130. Plurality of autonomous tool systems 118 may be configured to perform operations 130 on structure 110 and move with drivable support system 116. Metrology system 120 may be configured to generate metrology data 154 for at least one of drivable support system 116, plurality of autonomous tool systems 118, or structure 110 and move with drivable support system 116. Controller 122 may be in communication with metrology system 120 and plurality of autonomous tool systems 118. Controller 122 may be configured to control operation of plurality of autonomous tool systems 118 using metrology data 154. At least one of drivable support system 116, plurality of autonomous tool systems 118, or metrology system 120 may be reconfigurable.

With the use of an illustrative embodiment, wing 108 may be assembled without the use of fixed monument fixtures at different locations within manufacturing environment 100. Flexible manufacturing system 102 is completely reconfigurable to take into consideration changing manufacturing conditions. Components within flexible manufacturing system 102 can be reconfigured to modify the length of the assembly line, perform more operations at a single location, or a combination thereof.

The illustrative embodiments also increase the speed at which wing 108 is assembled. Plurality of autonomous tool systems 118 automate various operations using robotic devices. Plurality of autonomous tool systems 118 are also configured such that structure 110 does not have to be lifted as high as with some currently used systems. For instance, assembly system 1400, as shown in FIG. 14, are designed such that the wing assembly can be set lower.

In addition, flexible manufacturing system 102 includes various safety features and controls features integrated within the system. As an example, bridge system 136 and rail system 138 provide the necessary access for human operators, while also providing fall protection 144. Controller 122 controls each of the components in flexible manufacturing system 102 such that undesired encounters between components, between components and the ground, and between components and human operators, may be reduced or eliminated.

An illustrative embodiment may reconfigure components to support structure 110 in various ways. When bridge system 136 is equipped with elongate platforms, a number of additional connection devices 195 may be used to hold and align parts of structure 110 relative to one another. The implementation of elongate platforms in drivable support system 116 provides additional connections to structure 110 without adding the cost of an additional drivable support. In addition, using fewer drivable supports 135 results in more room to maneuver plurality of autonomous tool systems 118 between drivable supports 135 and promotes greater access to structure 110. Fewer sensors also may be used to accurately track and align the elongate platforms. These features all result in a system that reduces the cost needed to produce and implement an assembly system.

Because drivable support system 116 is freely movable about manufacturing environment 100, no monuments or other fixed structures are needed. With the use of an illustrative embodiment, operators do not have to remove structure 110 from fixed monument fixtures and reposition it in different work cells. Rather, drivable support system 116 moves as structure 110 moves. In this manner, manufacturing time needed for wing 108 is reduced. Further, the number of human operators performing operations also may be reduced. As a result, cost savings may be realized.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for manufacturing a structure, the method comprising:
   independently driving each drivable support in a first plurality of drivable supports from a first location to a second location;
   attaching each drivable support in the first plurality of drivable supports to a different point along a first side of the structure at the second location;
   independently driving each drivable support in a second plurality of drivable supports to the second location;
   attaching each drivable support in the second plurality of drivable supports to a different point along a second side of the structure at the second location, wherein the first plurality of drivable supports attached to the structure and the second plurality of drivable supports attached to the structure form a drivable support system for the structure;
   holding the structure in a desired position using the drivable support system;
   placing first support structures between each of the first plurality of drivable supports to create a first platform at the second location; and
   placing second support structures between each of the second plurality of drivable supports to create a second platform at the second location.
2. The method of claim 1 further comprising:
   driving the structure from the second location to a third location on a floor of a manufacturing environment using the drivable support system.
3. The method of claim 2 further comprising:
   performing operations on the structure using a plurality of autonomous tool systems.
4. The method of claim 3, wherein the operations are performed while the structure is at the third location.
5. The method of claim 4 further comprising:
   steering the plurality of autonomous tool systems.
6. The method of claim 3 further comprising:
   steering the drivable support system.
7. The method of claim 3, wherein the operations are performed while the structure is at the second location.
8. The method of claim 3 further comprising:
   determining a current position for at least one of the drivable support system, the plurality of autonomous tool systems, or the structure, in which the current position is determined using a metrology system.
9. The method of claim 8 further comprising:
   controlling operation of the plurality of autonomous tool systems, the drivable support system, and the metrology system using a controller.
10. The method of claim 8 further comprising:
    removing the structure from the drivable support system;
    separating the plurality of drivable supports in the drivable support system from one another; and
    driving at least one of the plurality of drivable supports to a fourth location.
11. The method of claim 10, wherein the fourth location is the first location.
12. The method of claim 8 further comprising:
    performing the operations on the structure using at least one of a crawler robot, a tack driller, a hexapod, a lower panel driller, or an upper panel driller.
13. The method of claim 12 further comprising:
    pulsing the structure through a plurality of work cells in the manufacturing environment using the drivable support system, wherein the operations are performed on the structure at the plurality of work cells.
14. The method of claim 12 further comprising:
    continuously moving the structure through the manufacturing environment using the drivable support system.
15. The method of claim 3 further comprising:
    positioning the plurality of autonomous tool systems relative to the structure using commands generated by a controller.
16. The method of claim 15 further comprising:
    monitoring a current position of the plurality of autonomous tool systems using a metrology system.
17. The method of claim 3 further comprising:
    reconfiguring at least one of the drivable support system or the plurality of autonomous tool systems based on changes in at least one of dimensions of the manufacturing environment, a status of the structure, or a status of the at least one of the drivable support system or the plurality of autonomous tool systems.
18. The method of claim 3 further comprising:
    generating commands to move the plurality of autonomous tool systems from a current position to a desired position relative to the structure, wherein the commands are generated using a controller.
19. The method of claim 18 further comprising:
    assigning tasks to the plurality of autonomous tool systems in the commands generated by the controller.
20. The method of claim 19 further comprising:
    monitoring a status of the tasks assigned to the plurality of autonomous tool systems;
    monitoring a status of the plurality of autonomous tool systems; and reassigning the tasks between the plurality of autonomous tool systems based on at least one of the status of the tasks or the status of the plurality of autonomous tool systems.

21. The method of claim 3 further comprising:
generating commands for the first plurality of drivable supports to drive from the first location to the second location using a controller.

22. The method of claim 21 further comprising:
assigning tasks to each drivable support in the commands generated by the controller.

23. The method of claim 22 further comprising:
monitoring a status of the tasks assigned to the plurality of drivable supports;
monitoring a status of the plurality of drivable supports; and
reassigning the tasks between the plurality of drivable supports based on at least one of the status of the tasks or the status of the plurality of drivable supports.

24. The method of claim 3 further comprising:
generating a path for a plurality of autonomous tool systems to reach the desired position relative to the structure, wherein the path is generated by a navigator.

25. The method of claim 3 further comprising:
positioning an upper skin panel relative to the structure.

26. The method of claim 25 further comprising:
performing the operations on the upper skin panel using a first portion of the plurality of autonomous tool systems.

27. The method of claim 26 further comprising:
positioning a lower skin panel relative to the structure.

28. The method of claim 27 further comprising:
performing the operations on the lower skin panel using a second portion of the plurality of autonomous tool systems.

29. The method of claim 3 further comprising:
driving the plurality of autonomous tool systems along the floor of the manufacturing environment.

30. The method of claim 29 further comprising:
driving the plurality of autonomous tool systems across the structure.

31. The method of claim 3 further comprising:
operating the plurality of autonomous tool systems simultaneously to perform the operations on the structure.

32. The method of claim 31, wherein an operation in the operations includes at least one of a drilling operation, a fastening operation, an inspecting operation, a sealing operation, a measurement operation, a leveling operation, or a cleaning operation.

33. The method of claim 1 further comprising:
carrying the structure from the second location to a third location using the drivable support system.

34. The method of claim 1 further comprising:
carrying a portion of the structure from the first location to the second location using the drivable support.

35. The method of claim 1, wherein the first plurality of drivable supports are positioned opposite the second plurality of drivable supports.

36. The method of claim 35, wherein the first side of the structure is a side of the leading edge of an aircraft structure and the second side of the structure is a side of a trailing edge of the structure.

* * * * *